US011695298B2

(12) United States Patent
Fife

(10) Patent No.: US 11,695,298 B2
(45) Date of Patent: Jul. 4, 2023

(54) ELECTRICAL SYSTEM CONTROL WITH USER INPUT, AND RELATED SYSTEMS, APPARATUSES, AND METHODS

(71) Applicant: ENEL X S.R.L., Rome (IT)

(72) Inventor: John Michael Fife, Bend, OR (US)

(73) Assignee: Enel X S.R.L., Rome (IT)

( * ) Notice: Subject to any disclaimer, the term of this patent is extended or adjusted under 35 U.S.C. 154(b) by 42 days.

(21) Appl. No.: 17/138,563

(22) Filed: Dec. 30, 2020

(65) Prior Publication Data
US 2022/0209574 A1 Jun. 30, 2022

(51) Int. Cl.
*H02J 13/00* (2006.01)
*G05B 15/02* (2006.01)
*G06Q 10/04* (2023.01)

(52) U.S. Cl.
CPC ........ *H02J 13/00001* (2020.01); *G05B 15/02* (2013.01); *G06Q 10/04* (2013.01); *H02J 13/00002* (2020.01)

(58) Field of Classification Search
None
See application file for complete search history.

(56) References Cited

U.S. PATENT DOCUMENTS

| 10,770,897 | B1 * | 9/2020 | Hertz-Shargel | H02J 3/00 |
| 2017/0286882 | A1 * | 10/2017 | Fife | G05B 13/0265 |
| 2021/0264543 | A1 * | 8/2021 | Walters | G05F 1/66 |

* cited by examiner

*Primary Examiner* — Ryan D. Coyer
(74) *Attorney, Agent, or Firm* — Foley & Lardner LLP

(57) ABSTRACT

The present disclosure is directed to systems and methods for economically optimal control of an electrical system. Some embodiments include an input device to receive input from a user. The site information may include an indication from the user of a site participation preference for a response event for an aggregation opportunity.

20 Claims, 24 Drawing Sheets

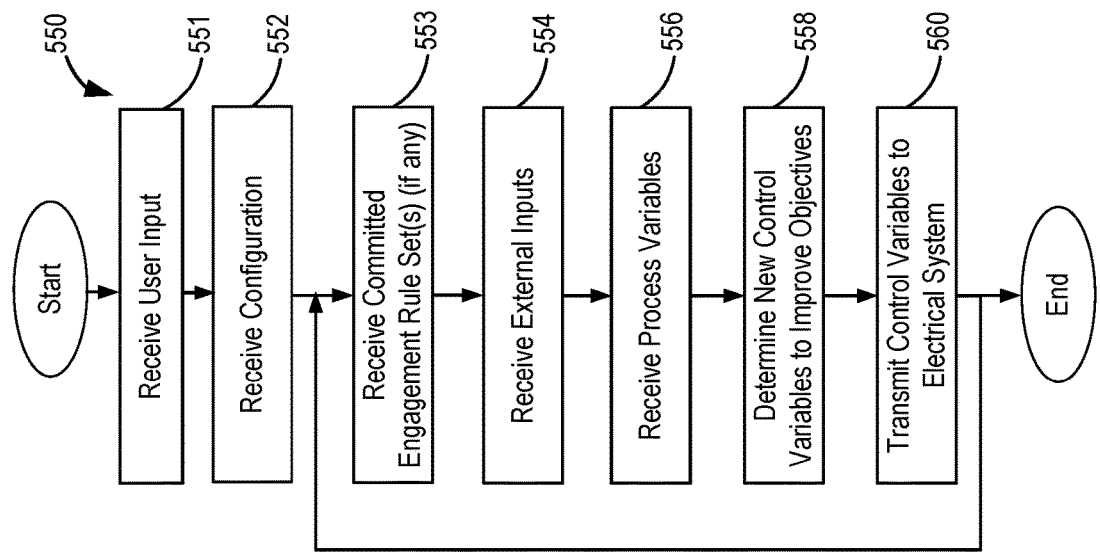
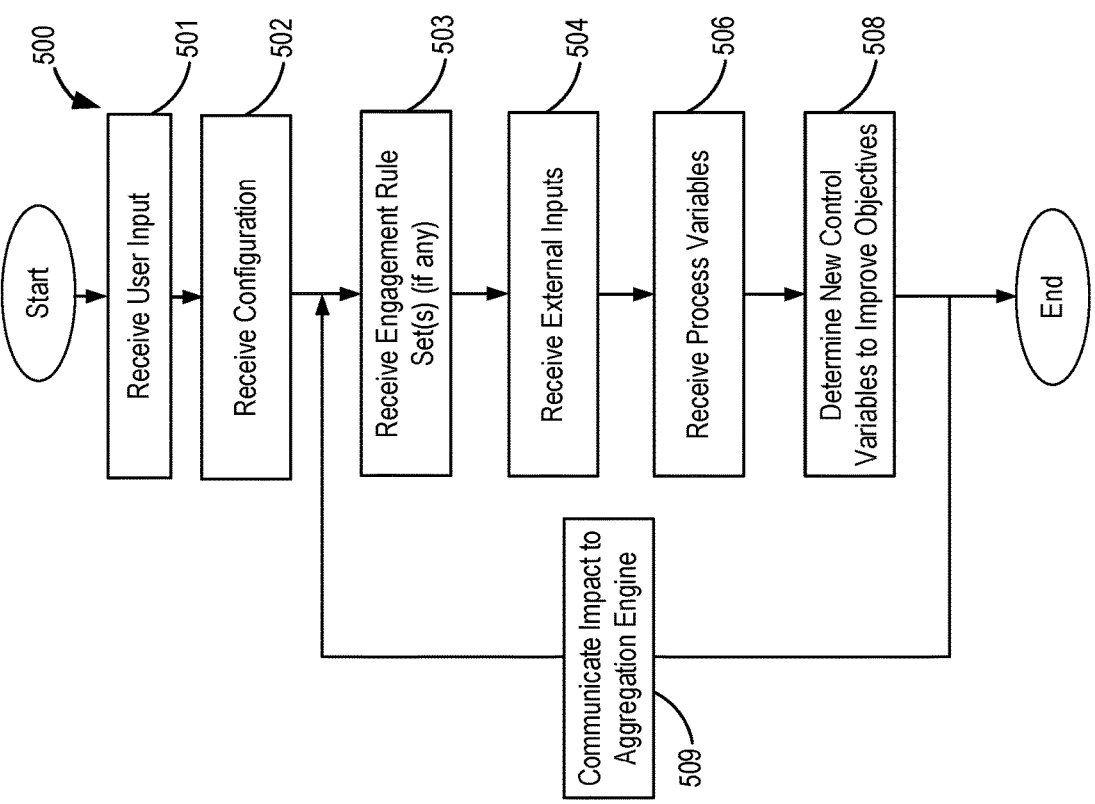

ELECTRICAL SYSTEM CONTROL WITH USER INPUT, AND RELATED SYSTEMS, APPARATUSES, AND METHODS

TECHNICAL FIELD

The present disclosure is directed to systems and methods for control of an electrical system, and more particularly to controllers and methods of controllers for controlling an electrical system.

BACKGROUND

Electricity supply and delivery costs continue to rise, especially in remote or congested areas. Moreover, load centers (e.g., population centers where electricity is consumed) increasingly demand more electricity. Historically in the U.S., energy infrastructure has been organized so that power is mostly produced by resources inland, and consumption of power is increasing at load centers along the coasts. Transmission and distribution (T&D) systems have been used to move the power from where it's generated to where it's consumed at the load centers. As the load centers demand more electricity, additional T&D systems are needed, particularly to satisfy peak demand. However, T&D systems are expensive and construction of additional T&D systems may be unwise and/or undesirable because full utilization of this additional infrastructure is really only necessary during relatively few peak demand periods, and would otherwise be unutilized or underutilized. Justifying the significant costs of constructing additional T&D resources may make little sense when actual utilization may be relatively infrequent.

Distributed energy resources (DER) are increasingly viewed as a viable means for minimizing costs of constructing additional T&D by storing, generating, or refraining from consuming electricity at or closer to the load centers for use during the peak demand times. A DER may refer to one or more of a variety of modular electricity-generating, storage, or consuming technologies, individually or in combination, that is positioned at or close to a load served by or including the DER. Many DER applications are interconnected with a local electrical utility distribution system (the "grid").

A DER may include an energy storage system (ESS) that can enable a consumer of energy to reduce or otherwise control a net consumption from an energy supplier.

A DER may include a generation system that can be activated to produce energy for consumption by the load center and/or for storage by the ESS for later consumption.

An individual DER (e.g., behind-the-meter) can provide a consumer of energy significant ability to control costs. However, this behind-the-meter ability to control costs eludes the electricity provider (e.g., utility) on the grid side of electrical distribution. An electricity provider can offer incentives and other encouragement to consumers to use behind-the-meter DERs, but remains at the mercy of consumers to deploy a DER and to use the DER in a manner to provide desired behavior. For example, during a "demand peak," the grid may remain unimpacted by a plurality of DERs that are not put into a state for the consumer to use electricity from the DER rather than from the electricity provider. Electricity providers simply cannot rely upon independent DERs to deliver power in a coordinated manner on short notice to maintain grid stability.

Attempts to leverage the cost savings enabled by DERs for the benefit of an electricity provider have included efforts to aggregate DERs in a coordinated manner to provide a response to a demand on the grid (e.g. a coordinated or aggregate demand response). A plurality of DERs can be linked together by an electronic communication network and remotely controlled at a centralized system to operate as a virtual power plant (VPP), to reduce customer energy demand at peak hours, and provide reliable energy generation for electricity providers to offset some of the needs for more conventional sources of electricity to meet consumer demands. An aggregation engine (e.g., a centralized controller) that functions as a centralized optimization engine to coordinate and optimize aggregation of DERs to implement VPPs are coming on line to more effectively utilize DERs. Further, electricity providers in the U.S. and Europe are increasingly experimenting with VPPs to help manage and harness the value of DERs scattered across the grid.

While the concept of VPPs, especially implemented through centralized control accessible to input from the utility, is enticing in theory, implementation to effectively aggregate DERs is challenging. Leveraging DERs in a manner to provide a utility-requested power level response without adversely affecting an electricity consumer service, including an electricity consumer's DER resource(s) is extremely difficult.

One challenge with a centralized optimization control model is a decrease in the consumer's or site's involvement and/or control over power consumption. The consumer or site lacks input regarding participation and/or cooperation with an event (e.g., an aggregation to provide a demand response). This loss of control and/or ability to provide input can prove problematic is some scenarios. For example, if a consumer of power is planning to have a gathering at an unusual time (e.g., evening hours at an office space), an automated centralized controller may not take into consideration such unpredictable or unusual activity.

Presently available centralized controllers and VPPs would not take into consideration activities planned at the sites where the DERs are located, DER size, and expected operating costs on a particular day. For example, a site in a VPP group may have already committed a DER to another service and may therefore have a high cost of participation. As another example, a site in a VPP group may have a larger DER and therefore may have more capacity available than the other sites and can therefore participate at a lower cost. Traditional VPPs do not take into consideration these specific factors of the individual DERs and sites.

An aggregation engine (e.g., a centralized controller) that functions as a centralized optimization engine to economically optimize aggregation of DERs may be beneficial and may be desirable to enable intelligent actions to be taken in order to more effectively utilize DERs such as by minimizing the total electricity-related cost of the group, without the aforementioned drawbacks.

BRIEF DESCRIPTION OF THE DRAWINGS

Additional aspects and advantages will be apparent from the following detailed description of preferred embodiments, which proceeds with reference to the accompanying drawings, in which:

FIG. 5A is a flow diagram of a method or process of controlling a DER, according to one embodiment of the present disclosure.

FIG. 5B is a flow diagram of a method or process of controlling a DER, according to another embodiment of the present disclosure.

DETAILED DESCRIPTION

Figure 1:
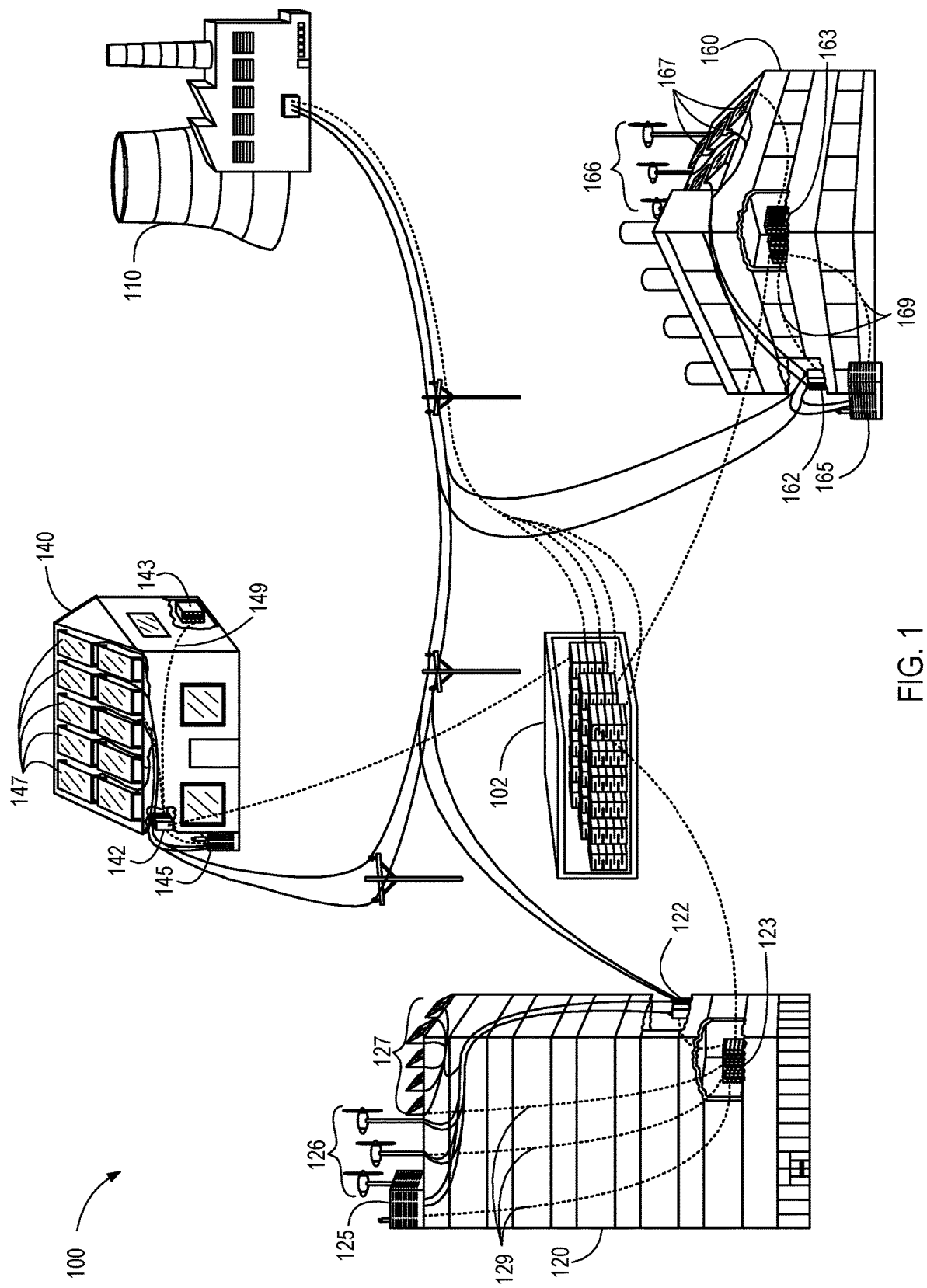
FIG. 1 is a diagrammatic representation of a system of aggregating distributed energy resources (DERs), according to one embodiment of the present disclosure.

As electricity supply and delivery costs increase, especially in remote or congested areas, distributed energy resources (DERs) are increasingly seen as a viable means for reducing those costs. DERs are fast becoming more prevalent as more and more consumers are installing local generation and/or energy storage systems behind the meter.

The reasons for the proliferation of DERs are numerous, but primarily because of programs and products that enable an energy storage system (ESS) to provide consumers an ability to control net consumption and delivery of electrical energy, which can provide value in multiple ways.

A site may include an ESS that can enable a consumer of energy to reduce or otherwise control a net consumption from an energy supplier. For example, if electricity supply and/or delivery costs are high at a particular time of day, an ESS, which may include one or more batteries or other storage devices, can generate/discharge electrical energy at that time when costs are high in order to reduce the net consumption from the supplier. Likewise, when electricity rates are low, the ESS may charge so as to have reserve energy to be utilized in a later scenario as above when supply and/or delivery costs are high. The ESS of a site can be used or otherwise made available as a DER.

The approach of charging the ESS (e.g. of a DER) when rates are low and discharging when rates are high can provide value by reducing time-of-use (ToU) supply charges, reducing demand charges, improving utilization of local generation, and leveraging incentive maneuvers.

ToU supply charges are typically pre-defined in a utility's tariff document by one or more supply rates and associated time windows. ToU supply charges may be calculated as the supply rate multiplied by the total energy consumed during the time window. An ESS can be discharged to reduce ToU supply charges.

Demand charges are electric utility charges that are based on the rate of electrical energy consumption (also called "demand") during particular time windows (which we will call "demand windows"). An ESS can be discharged to lower peak demand and thereby reduce demand charges.

Improved utilization of local generation can be achieved with an ESS by: (a) aiding to maximize self-consumption of renewable energy, and (b) reducing fluctuations of a renewable generator such as during cloud passage on solar PV arrays.

An ESS can also be charged and discharged in a manner to leverage programs that offer benefits (e.g., a statement credit) or other incentives for consumers to cooperate with the local utility(ies) by taking actions (e.g., reducing consumption or discharging power onto the grid) that may enhance grid stability, reduce peak loads, or the like.

A site may also include a generation system that can be activated to produce energy for consumption by the load center, for storage by the ESS for later consumption, and/or for providing power back to the grid. For example, any of a PV system, a wind farm, or a fuel powered generator may generate electrical energy to be supplied to the load, stored by the ESS, or provided back to the grid. The generation system of a site can be used or otherwise made available as a DER.

A site may include an energy consuming technology, such as a load, that may be deactivated during peak demand periods to alleviate the demand on the grid. For example, an air conditioning system may be deactivated during a particular demand period to alleviate the net consumption of electrical power from the grid at a site. In this example, an element of energy storage could also be leveraged. Specifically, prior to the demand period it may be possible to run the air conditioning system to cool a space to below a target temperature, which would reduce a peak temperature that the space would rise to during the peak demand period when the air conditioning system is deactivated. This example makes apparent that anything that consumes electrical power could be used or otherwise made available as a DER, but not all of these things would involve an energy storage element as discussed with reference to the air conditioning system.

An individual DER can provide a consumer of energy significant ability to control costs. However, this ability to control costs eludes the electricity provider or distributor (e.g., utility) on the grid side of electrical distribution. An electricity provider or distributor can offer incentives and other encouragement to consumers to use DERs, but remains at the mercy of consumers to deploy a DER and to use or otherwise make available the DER in a manner to provide behavior that supports cost reduction for the electricity provider or distributor. For example, during a "demand peak," the grid may remain unimpacted by a plurality of DERs that are not put into a state for the consumer to provide electricity to or reduce consumption of electricity from the grid. Electricity providers simply cannot rely upon independent DERs to deliver power in a coordinated manner on short notice to maintain grid stability.

Attempts to leverage the cost savings enabled by DERs for the benefit of an electricity provider have included efforts to aggregate DERs in a coordinated manner to provide a response to a demand on the grid. A plurality of DERs can be linked together by an electronic network and remotely controlled at a centralized system to operate as a virtual power plant (VPP), to reduce customer energy demand at peak hours, and provide reliable energy generation for electricity providers to offset some of the needs for more conventional sources of electricity to meet consumer demands. Electricity providers in the U.S. and Europe are increasingly experimenting with VPPs to help manage and harness the value of DERs scattered across the grid.

To illustrate, on any given day, an individual site may have a DER that is controlled by an optimal controller. For this site, the optimal controller has scheduled the DER to optimize the total energy-related costs for a particular building or site. Now, consider a group of such sites, all using optimal controllers to manage electricity-related costs using DERs at each site. If this group of sites is part of a VPP group, a VPP orchestrator may request a specific energy delivery profile from each site in the VPP group to achieve an aggregate goal. For example, if the goal is 1 MWh of energy delivery between 6 pm and 7 pm of a given day, and the group includes five sites, each site may be requested to deliver 2 kWh from 6:00 p.m. to 7:00 p.m. This would achieve the VPP goal. This approach, however, does not consider each site's planned activities, DER size, and expected operating costs on that particular day. For example, a site in a VPP group may have already committed a DER to another service or maneuver and may therefore have a high cost of participation in the additional service or maneuver of the VPP group. In addition, a site in a VPP group may have a relatively large DER and therefore may have a relatively large capacity available, as compared to the other sites, and can therefore participate at a lower cost than the other sites.

An improvement to presently available VPP approaches would be to achieve an aggregate goal at minimum total electricity-related cost. Such an approach disclosed herein considers user input (e.g., a participation preference) for the site or an individual DER that may indicate or otherwise represents an impact, such as a cost level (e.g., a perceived cost level) for that consumer.

The present embodiments provide systems, controllers, and methods that can function to economically optimize DERs by enabling intelligent actions to be taken in order to more effectively utilize DERs. These systems, controllers, and methods consider user input that may indicate or otherwise represent an impact, such as a cost of participation of a DER, as perceived by that user The present disclosure includes aggregation systems, controllers, and methods directed to aggregating DERs, and more particularly to systems and methods for intelligent and/or automated aggregation of automatically controlled self-optimizing sites with one or more DERs. These systems and methods of aggregating DERs consider user input that may indicate or otherwise represent an impact, such as a cost of participation of a DER, as perceived by that user.

FIG. 1 is a diagrammatic representation of a system 100 to aggregate DERs, including an aggregation engine 102 (or other similar system or aggregation controller) to aggregate a plurality of site controllers 122, 142, 162 configured to control operation a plurality of DERs at a plurality of sites 120, 140, 160, according to one embodiment of the present disclosure. The system 100 may operate as, or similar to, a VPP to provide a power level for a period of time of an aggregation opportunity (e.g., to participate in a response event). In FIG. 1, a centralized aggregation engine 102 may be networked with (or otherwise in communication with) the plurality of site controllers 122, 142, 162, each of which controls one or more DERs at one of the sites 120, 140, 160, respectively. The sites 120, 140, 160 include a plurality of disparate locations, including, for example, a high-rise building 120, a single-family residence 140, and a factory 160 or other industrial location or operation. Each of these sites 120, 140, 160 includes one or more DERs, which in turn include storage, power generation, and/or load resources. As can be appreciated, any variation of DER and quantity or combination of DERs can be controlled by a site controller 122, 142, 162 that is in communication with the aggregation engine 102 to participate in one or more maneuvers (e.g., a demand response maneuver) to provide a net change in power (e.g., provide power generation, provide stored power, reduce power consumption by throttling or deactivating a load, etc.). The aggregation engine 102 may further be in communication with a local electrical utility 110 to receive requests for maneuvers and to communicate the ability to respond to such requests. The aggregation engine 102 may, in response to a utility request, coordinate the plurality of site controllers 122, 142, 162 to control the DERs at the sites 120, 140, 160 to provide a change in net power (e.g., generate power that can be provided to the grid of the utility 110).

The aggregation engine 102 may include circuitry, one or more processors, and/or other computing devices to perform operations for aggregating the optimal control of the DERs at the plurality of sites 120, 140, 160. The aggregation engine 102 may further include one or more communication interfaces to facilitate communications with the site controllers 122, 142, 162 and with the utility 110. The aggregation engine 102 may receive an aggregation opportunity to participate in a response event. The aggregation opportunity may be received from the utility 110. The aggregation opportunity may specify a requested net change in power over a period of time of the response event and an upshot for providing the requested net change in power for the period of time. As used herein the term "net change in power" refers to a total change of power consumed at the sites 120, 140, 160, and may include electrical power production or provision (e.g., by generators and/or ESSs), reduction or cessation in electrical power consumption (e.g., by loads), or combinations thereof. The upshot specified by the aggregation opportunity may be a benefit (e.g., a monetary or other economic incentive) to be received for providing the requested net change in power over the period of time of the response event and/or a penalty (e.g., a monetary or other economic penalty) to be received or imposed for failing to provide the requested net change in power over the period of time.

The aggregation engine 102 may, based on the aggregation opportunity, determine whether to aggregate the specified net change in power from the DERs at one or more of the sites 120, 140, 160 or otherwise perform a maneuver to fulfill the aggregation opportunity in order to receive the specified benefit and/or avert any specified penalty. The aggregation engine 102 may determine the response that is economically optimized for the sites 120, 140, 160.

As part of determining whether to perform a maneuver to fulfill an aggregation opportunity, the aggregation engine 102 may determine how to apportion the burden of the maneuver among the sites 120, 140, 160 in an economically efficient way.

The aggregation engine 102 may provide, via the communication interface, a proposed set of engagement rules (e.g., apportionment values ($P_p$)) to the site controllers 122, 142, 162 that control the operation of the plurality of DERs at the sites 120, 140, 160. As used herein the term "engagement rule set" refers to information that defines, to a site controller (e.g., the site controllers 216), how a maneuver should be performed on a site basis. One specific non-limiting example of an engagement rule set is an apportionment value. As used herein, an apportionment value refers to a quantity related to a site's performance of a portion of a maneuver. It will be apparent to those of ordinary skill that although an "apportionment value" includes a quantity, other examples of engagement rule sets may not include quantities (e.g., an instruction to turn off equipment such as an air conditioning unit or other maneuver). A non-limiting example of an apportionment value is a site change in power. As used herein the term "site change in power" refers to: a provision, by a site, of electrical power (e.g., from a generator and/or an ESS); a reduction, by the site, of consumption of electrical power from the grid (e.g., by one or more loads); or combinations thereof. Each proposed apportionment value of the set $P_p$ may be intended for a single site controller of one of the sites 120, 140, 160. Each proposed apportionment value may indicate the corresponding site 120, 140, 160 participation in the response event to provide the requested net change in power for the period of time. In some embodiments, an apportionment value may be a change in power (e.g., power production, reduction in consumption, or combinations thereof) value (e.g., 100 kWh), which may be a discrete amount of power the site is requested to provide during a period of an aggregation response period. An apportionment value may also be an energy production value (e.g., 100 kWh). In other embodiments, an apportionment value may also be communicated as a ratio and production pair (e.g., 0.3, 600 kWh), where the production value is the net change in power of the aggregation request, and the ratio is a portion requested of the given site. As can be appreciated, other combinations of the foregoing elements of an apportionment value may be utilized (e.g., an apportionment set including a ratio, a change rate, and a duration).

The aggregation engine 102 may receive from each of the site controllers 122, 142, 162 a local impact (e.g., a site impact) on the corresponding sites 120, 140, 160 of participating in the aggregation opportunity event according to the set $P_p$, versus not participating in the aggregation opportunity event. The local impact may be optimized by the site controllers 122, 142, 162, including considering user input (e.g., a participation preference) corresponding to the site or an individual DER that indicates or otherwise represents a cost level (e.g., a perceived cost level) of that site or DER participating in an event, as will be discussed more fully below. Based on the set of received local impacts, the aggregation engine 102 may determine a final set of apportionment values ($P_f$), each for a site controller 122, 142, 162 and corresponding to one of the sites 120, 140, 160. The aggregation engine 102 may determine the set $P_f$ by the one or more processors utilizing an optimization algorithm. The aggregation engine 102 may repeatedly poll each given site controller 122, 142, 162 according to the optimization algorithm to determine the set $P_f$. The local impacts for each of the sites 120, 140, 160 may be received, calculated, or otherwise obtained based on the set of apportionment values ($P_p$ and $P_f$). In other words, during the repetitions of the polling, intermediate local impacts are totaled into intermediate total impacts until an optimal total impact is identified, at which point final optimal local and total impacts have been identified.

In some embodiments, the aggregation engine 102 may receive from each of the site controllers 122, 142, 162 user input that provides an indication of a site participation preference. The site participation preference may be entered manually by an operator of a site to indicate a level of willingness and/or ability of the site to participate in a response event. The site participation preference can enable an operator or user of a site to provide a quantitative or nonquantitative input that a site controller 122, 142, 162 and/or the aggregation engine 102 can consider in optimizing operation of a site and/or a plurality of sites. For example, the site participation preference may represent an actual or a figurative downtime cost during a period of time. The site participation preference may be entered as a non-numeric value. For example, the operator may indicate whether power to operate equipment at the site is critical, average, or low. For example, if an operator is attempting to fulfill an order and there is a penalty if the order is not completed that day, the operator may select that full operation of the site is critical for the day. In some embodiments, the operator may indicate desired operability of specific equipment on the site for a period of time. In some embodiments, the site participation preference may be included in the local impact.

The aggregation engine 102 may utilize an aggregate cost function to optimize apportionment of site changes in power to the sites 120, 140, 160. By way of non-limiting example, the aggregation engine 102 may generate an aggregate cost function as a sum of the local impacts and site participation preferences to obtain a total participation impact and then determine whether to participate in the aggregation opportunity by comparing the total participation impact with the upshot specified by the aggregation opportunity. In this example the cost function may be:

$$C_{agg} = \sum_i C_i$$

where $C_{agg}$ is the aggregate cost function and $C_i$ is local impact (e.g., a predicted cost of performing the apportioned site change in power, or a change or delta in cost of providing the site change in power vs. not providing the site change in power) of a site. Also by way of non-limiting example, the aggregation engine 102 may generate an aggregate cost function as a sum of the local impacts minus the upshot specified by the aggregation opportunity. In this example the cost function may be:

$$C_{agg} = -B_{upshot} + \sum_i C_i$$

where $B_{upshot}$ is the upshot specified by the aggregation opportunity. As a further non-limiting example, the aggregation engine 102 may generate an aggregate cost function as a sum of the local impacts minus the upshot and minus payments to the sites 120, 140, 160 to perform their apportioned performances. In this example the cost function may be:

$$C_{agg} = -B_{upshot} + \sum_i (C_{payment,i} + C_i)$$

where $C_{payment,i}$ is the payment that is made to a site to perform the apportioned site change in power. The aggregation engine 102 may optimize (e.g., minimize) the aggregate cost function. In some embodiments the aggregation engine 102 may treat the total net change in power provided by the sites 120, 140, 160 as a continuous variable that is determined as the sum of the apportionment values. As a result, the aggregation engine 102 may use the above formulas for aggregate cost functions $C_{agg}$ to optimize how to apportion the net change in power, and also how much of the aggregation opportunity to perform (e.g., 5 MW or 10 MW) based on the total cost and benefit and the programs terms.

If the aggregation engine 102 determines to have the system 100 participate in the aggregation opportunity (e.g., have one or more of the sites 120, 140, 160 provide a site changes in power), then the aggregation engine 102 may provide, via the communication interface, the set $P_f$ and instructions to the plurality of site controllers 122, 142, 162 to schedule the sites 120, 140, 160 for participation in the aggregation opportunity.

The aggregation engine 102 of FIG. 1 is a centralized and/or dedicated entity, according to one embodiment. In other embodiments, the aggregation engine 102 may be a virtual machine (e.g., on a cloud computing system), operative on a plurality of distributed resources, and/or integrated with or otherwise included on one or more site controllers of the sites 120, 140, 160.

The site controllers 122, 142, 162 of FIG. 1 are local controllers located at the sites 120, 140, 160, respectively, according to one embodiment. In other embodiments, one or more of the site controllers 122, 142, 162 may be remotely located from their corresponding sites and communicate with electrical components of their corresponding sites 120, 140, 160 through one or more communication networks (e.g., the Internet). In some embodiments, a single site controller may be configured to operate as the site controller for more than one site, each site having one or more DERs that can be leveraged to provide a portion of a net change of power (e.g., store, generate, or refrain from consuming electrical power) to participate in an aggregation opportunity. The site controllers 122, 142, 162 may have an interface or an input device to receive site information from a user including an indication from the user of a site participation preference for a response event for an aggregation opportunity.

The high-rise building 120 may be an office building, an apartment building, or another multiple-unit facility. The type of the building may be unimportant. The high-rise building 120 may include a local electrical system that includes the site controller 122 and DERs including an energy storage system (ESS) 123, and one or more electricity production devices (e.g., generators), such as a combustion engine generator 125, wind turbines 126, and photovoltaic (PV) cells 127 (e.g., solar panels). The high-rise building 120 may also include communication lines 129 to interconnect the site controller 122 with other components (e.g., the ESS 123, the generator 125, the wind turbines 126, and the PV cells 127). The electrical system of the high-rise building 120 naturally includes one or more electrical loads. Stated differently, the electrical system of the high-rise building 120 may include loads, generators, and/or ESSs, in varying numbers and combinations of these components. For example, an electrical system may have loads and an ESS, but no local generators (e.g., photovoltaic, wind). The electrical system may or may not be connected to an electrical utility distribution system (or "grid"). If not connected to an electrical utility distribution system, it may be termed "off-grid."

The ESS 123 of the electrical system of the high-rise building 120 may include one or more energy storage devices and any number of power conversion devices. The power conversion devices are able to transfer energy between an energy storage device and the main electrical power connections that in turn connect to the electrical system loads and, in some embodiments, to the grid. The energy storage devices may be different in various implementations of the ESS 123. A battery is a familiar example of a chemical energy storage device. For example, in one embodiment of the present disclosure, one or more electric vehicles with batteries may be connected to the electrical system (e.g., in a parking garage) and may be used to store energy for later use by the electrical system. A flywheel is an example of a mechanical energy storage device.

The electrical system of the high-rise building 120 may provide to the site controller 122, over the communication lines 129, inputs in the form of information, or feedback, as to a status of the building electrical system and/or one or more components (e.g., loads, generators, ESSs) therein. The site controller 122 may determine from the inputs one or more outputs (e.g., control variables) to send to one or more components of the electrical system to accomplish one or more site objectives (e.g., minimize demand (kW) over a prescribed time interval; minimize demand charges ($) over a prescribed time interval; minimize total electricity charges ($) from the grid; reduce demand (kW) from the grid by a prescribed amount during a prescribed time window; maximize the life of the energy storage device(s)). The site controller 122 may also receive as inputs a configuration of the electrical system (e.g., a set of configuration elements), which may specify one or more constraints of the electrical system. The site controller 122 may also receive external inputs (e.g., weather reports, changing tariffs, fuel costs, event data), which may inform the determination of the values of the control variables. A set of external inputs may be received by the site controller 122. The set of external inputs may provide indication of one or more conditions that are external to the site controller 122, the high-rise building 120, and/or the electrical system.

The site controller 122 may receive from the aggregation engine 102 an apportionment value and/or production requirement for an aggregation opportunity, which may be processed as a configuration and/or constraint on the electrical system of the high-rise building 120. The site controller 122 may determine outputs for efficient operation of the electrical system, taking into consideration the apportionment value and/or production requirement for an aggregation opportunity as one or more constraint(s) on the electrical system. The site controller 122 may then provide to the aggregation engine 102 a differential value indicating a delta (i.e., a change) of a local impact (or site impact) on the high-rise building 120 of participating in the response event versus not participating in the response event. The site controller 122, according to one embodiment, may provide a delta value indicating a difference in cost of participating in the response event versus not participating in the response event. The site controller 122, according to another embodiment, may provide a participation cost and a nonparticipation cost, such that a calculation can determine a difference in cost of participating in the response event versus not participating in the response event.

The single-family residence 140 may be analogous to the high-rise building 120, with a similar or different mix of components as part of the electrical system of the residence 140. The residence 140 may include a local electrical system that includes a site controller 142, an ESS 143, and one or more electricity production devices (e.g., generators), such as a combustion engine generator 145, and photovoltaic (PV) cells 147 (e.g., solar panels). The residence 140 may also include communication lines 149 to interconnect the site controller 142 with other components (e.g., the ESS 143, the generator 145, and the PV cells 147).

The electrical system of the residence 140 may provide to the site controller 142, over the communication lines 149, inputs in the form of information, or feedback, as to a status of the electrical system and/or one or more components (e.g., loads, generators, ESSs) thereof. The site controller 142 may determine from the inputs one or more outputs (e.g., control variables) to send to one or more components of the electrical system to accomplish one or more objectives, similar to the site controller 122 of the high-rise building 120. The site controller 142 may also receive as inputs a configuration of the electrical system (e.g., a set of configuration elements), which may specify one or more constraints of the electrical system. The site controller 142 may also receive external inputs (e.g., weather reports, changing tariffs, fuel costs, event data), which may inform the determination of the values of the control variables. A set of external inputs may be received by the site controller 142. The set of external inputs may provide indication of one or more conditions that are external to the site controller 142 and the electrical system of the residence 140.

The site controller 142 may receive from the aggregation engine 102 an apportionment value and/or production requirement for an aggregation opportunity, which may be processed as a configuration and/or constraint on the electrical system of the residence 140. The site controller 142 may determine outputs for efficient operation of the electrical system, taking into consideration the apportionment value and/or production requirement for an aggregation opportunity as one or more constraint(s) on the electrical system. The site controller 142 may then provide to the aggregation engine 102 a differential value indicating a delta of a local impact (or site impact) on the residence 140 of participating in the aggregation opportunity versus not participating in the aggregation opportunity. The site controller 142, according to one embodiment, may provide a delta value indicating a difference in cost of participating in the aggregation opportunity versus not participating in the aggregation opportunity. The site controller 142, according to another embodiment, may provide a participation cost and a nonparticipation cost, such that a calculation can determine a difference in cost of participating in the aggregation opportunity versus not participating in the aggregation opportunity.

The factory 160 may be analogous to the high-rise building 120 and/or the residence 140, with a similar or different mix of components as part of the electrical system. The factory 160 may include a local electrical system that includes a site controller 162, an ESS 163, and one or more electricity production devices (e.g., generators), such as a combustion engine generator 165, wind turbines 166, photovoltaic (PV) cells 167 (e.g., solar panels). The factory 160 may also include communication lines 169 to interconnect the site controller 162 with other components (e.g., the ESS 163, the generator 165, the wind turbines 166, and the PV cells 167).

The electrical system of the factory 160 may provide to the site controller 162, over the communication lines 169, inputs in the form of information, or feedback, as to a status of the electrical system and/or one or more components (e.g., DERs including loads, generators, ESSs) thereof. The site controller 162 may determine from the inputs one or more outputs (e.g., control variables) to send to one or more components of the electrical system to accomplish one or more objectives. The site controller 162 may also receive as inputs a configuration of the electrical system (e.g., a set of configuration elements), which may specify one or more constraints of the electrical system. The site controller 162 may also receive external inputs (e.g., weather reports, changing tariffs, fuel costs, event data), which may inform the determination of the values of the control variables. A set of external inputs may be received by the site controller 162. The set of external inputs may provide indication of one or more conditions that are external to the site controller 162 and the electrical system of the factory 160.

The site controller 162 may receive from the aggregation engine 102 an apportionment value and/or production requirement for an aggregation opportunity, which may be processed as a configuration and/or constraint on the electrical system of the factory 160. The site controller 162 may determine outputs for efficient operation of the electrical system, taking into consideration the apportionment value and/or production requirement for an aggregation opportunity as one or more constraint(s). The site controller 162 may then provide to the aggregation engine 102 a differential value indicating a delta of a local impact (or site impact) on the factory 160 of participating in the aggregation opportunity versus not participating in the aggregation opportunity. The site controller 162, according to one embodiment, may provide a delta value indicating a difference in cost of participating in the aggregation opportunity versus not participating in the aggregation opportunity. The site controller 162, according to another embodiment, may provide a participation cost and a nonparticipation cost, such that a calculation can determine a difference in cost of participating in the aggregation opportunity versus not participating in the aggregation opportunity.

Figure 2:
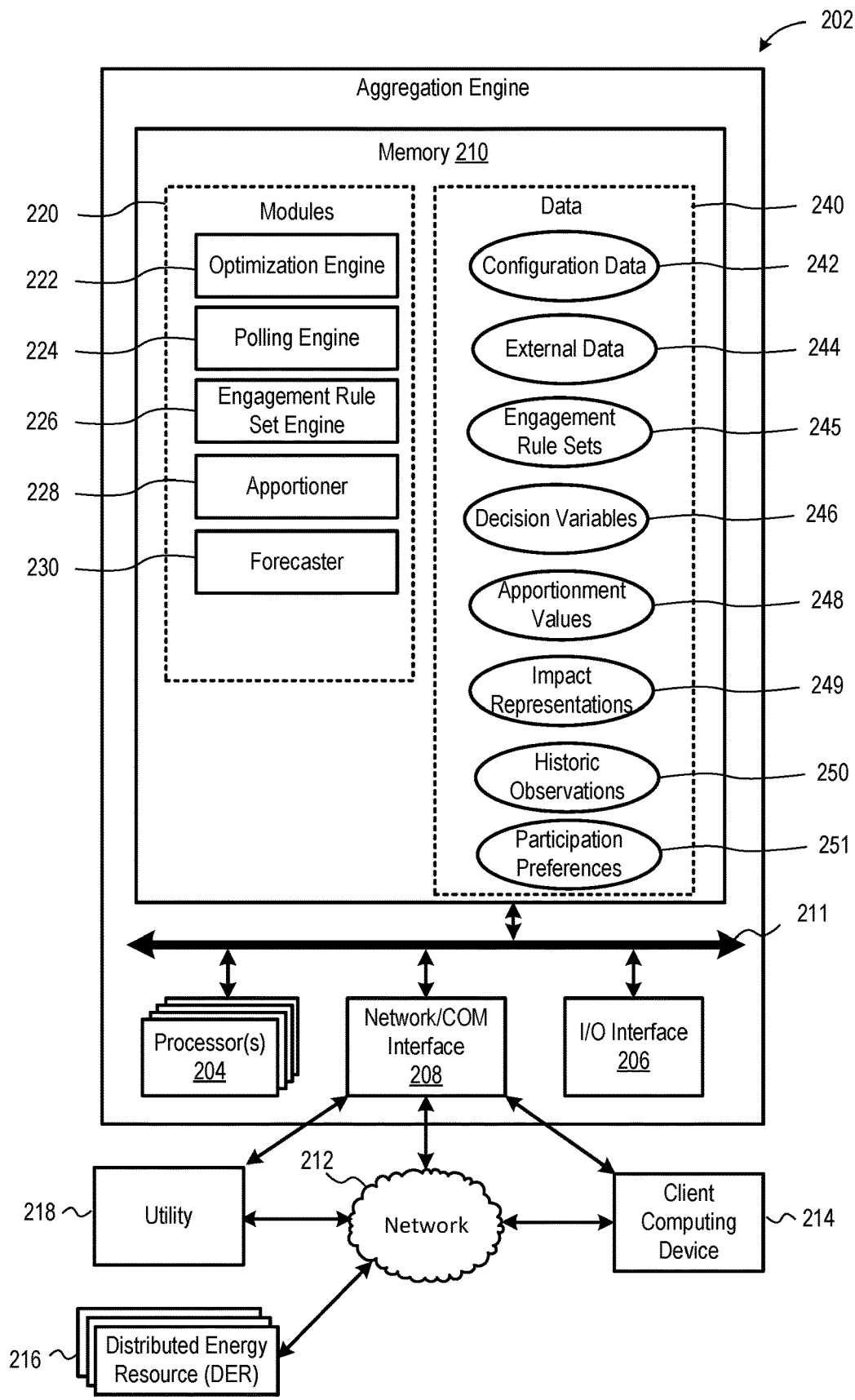
FIG. 2 is a block diagram of an aggregation engine (e.g., a centralized optimization engine, an aggregation controller), according to one embodiment of the present disclosure.

FIG. 2 is a block diagram of an aggregation engine 202 (e.g., a centralized optimization engine), according to one embodiment of the present disclosure. The aggregation engine 202 may be the same or similar to the aggregation engine 102 of FIG. 1 and perform similar operations and/or provide similar functionality. For example, the aggregation engine 202 may perform operations for aggregating a plurality of site controllers 216, such as to provide demand response. The aggregation engine 202 may receive (e.g., from a utility 218) an aggregation opportunity to participate in a response event. The aggregation engine 202 may, based on the aggregation opportunity and impact values received from the plurality of site controllers 216, determine whether to aggregate net change in power (e.g., power generation) from the plurality of site controllers 216 or otherwise perform a maneuver (e.g., apportion all of the net change of power to fulfill the aggregation opportunity to one of the sites) to fulfill the aggregation opportunity, in order to receive a specified benefit and/or avert any specified penalty. The aggregation engine 202 may determine the response (e.g., maneuver) that is economically optimized for the plurality of site controllers 216 and communicate commands, instructions, and/or other data to the plurality of site controllers 216 over a communication network 212. The aggregation engine 202 of FIG. 2 includes one or more processors 204, an input/output interface 206, a network or other communication (COM) interface 208, memory 210 and/or other computer readable storage medium, and a system bus 211.

The one or more processors 204 may include one or more general purpose devices, such as an Intel®, AMD®, or other standard microprocessor. The one or more processors 204 may include a special purpose processing device, such as ASIC, SoC, SiP, FPGA, PAL, PLA, FPLA, PLD, or other customized or programmable device. The one or more processors 204 perform distributed (e.g., parallel) processing to execute or otherwise implement functionalities of the present embodiments. The one or more processors 204 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The input/output interface 206 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 208 may facilitate communication with other computing devices 214 and/or networks 212, such as the Internet and/or other computing and/or communications networks. The network/COM interface 208 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 208 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 211 may facilitate communication and/or interaction between the other components of the system, including the one or more processors 204, the memory 210, the input/output interface 206, and the network/COM interface 208.

The memory 210 may include, but is not limited to, static RAM, dynamic RAM, flash memory, one or more flip-flops, ROM, CD-ROM, DVD, disk, tape, or magnetic, optical, or other computer storage medium. The memory 210 may include a plurality of program modules 220 and program data 240.

The program modules 220 may include all or portions of other elements of the aggregation engine 202. The program modules 220 may run multiple operations concurrently or in parallel by or on the one or more processors 204. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, causes a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The system memory 210 may also include data 240. Data generated by the aggregation engine 202, such as by the program modules 220 or other modules, may be stored on the system memory 210, for example, as stored program data 240. The stored program data 240 may be organized as one or more databases.

The modules 220 may include an optimization engine 222, a polling engine 224, an engagement rule set engine 226, and an apportioner 228.

The optimization engine 222 may utilize an optimization algorithm to determine if and how to participate in an aggregation opportunity. The aggregation opportunity may be an opportunity to participate in a demand response event. Stated otherwise, the aggregation engine 202 may determine if and how to perform a maneuver to aggregate the plurality of site controllers 216 to provide a requested change net power or energy (e.g., a requested power or energy level production) according to the aggregation opportunity.

To determine if and how to participate in the aggregation opportunity, the optimization engine 222 may determine an engagement rule set with proposed performance values for each of the plurality of site controllers 216 to participate in the aggregation opportunity and then in essence test the engagement rule set and proposed performance values with the plurality of site controllers 216 to learn an impact of participating versus not participating in the aggregation opportunity. The engagement rule set defines to the site controllers 216 how the maneuver should be performed on a local basis. The engagement rule set may or may not have numerical values associated therewith. For a first example, the engagement rule set may specify delivery of a certain amount of minimum power for a specified time period. Or, as a second example, the engagement rule set may specify delivery of a certain energy over a specified time period. Or, as a third example, the engagement rule set may specify a reduction in consumed energy from a baseline (e.g., non-participation) value over a specified time period. The engagement rule set may also specify multiple time periods. Each engagement rule set may have some number of parameterized values associated with it. In the first example, the amount of minimum power delivery may be a parameterized value. In the second example above, the amount of energy may be a parameterized value. In the third example, the amount of power reduction may be a parameterized value. Engagement rules may also have multiple parameterized values. For example, an engagement rule may specify two different energy reductions in a building's power consumption to be accomplished during two upcoming time periods. In general, the engagement rule set may provide parameters, constraints, rules, or the like, for guiding participation of a site controller in the aggregation opportunity. The engagement rule set is a set of instructions that specifies how each site must participate in the aggregation opportunity, and the parameterized values specify how much each site should participate. As an, the engagement rule set for an aggregation opportunity may be a reduction in power consumption compared to a baseline (e.g., non-participation) for a specific upcoming period of time. The parameterized value may be the amount of power reduction in kW. In this example, the optimization engine 222 may determine a set of parameterized values for each of the plurality of site controllers 216 to participate in the aggregation opportunity and then in essence test the set of parameters with the plurality of site controllers 216 to inquire or otherwise learn an impact (e.g., a cost differential) of participating versus not participating in the aggregation opportunity. Determining the engagement rule set may include determining values for a set of decision variables for each site controller of the plurality of site controllers 216. In the demand response example, the optimization engine 222 may define a set of decision variables that indicates one or more of an amount of performance of power reduction and a period of time for each corresponding site controller to participate in the aggregation opportunity. Other engagement rule sets are possible. For example another engagement rule set may specify that a site controller must follow a specific consumption or production profile for a given time period. This type of engagement rule set could be valuable for renewables firming for example where a utility prefers predictable power generation, or where there is the potential for significant intermittency in a load, a utility may prefer a more predictable or guaranteed load profile.

The values for the decision variables may be determined by polling the site controllers 216 with candidate values. The optimization engine 222 may employ the polling engine 224 to provide or otherwise perform the polling function. According to an optimization algorithm, the optimization engine 222 may repeatedly poll the site controllers 216 to find an optimized set of values. The optimization engine 222 may utilize the polling engine 224 to repeatedly poll each given site controller for an impact (e.g., a cost differential) based on a permutation or other variation of values (e.g., proposed or candidate values) for the corresponding set of decision variables. An impact representation (which may include optimized cost differential information) may be received from each of the plurality of site controllers 216, and the optimization engine 222 may determine whether an optimized set of values (within a threshold level) has been achieved. The optimized set of values for the set of decision variables may be a set of values that minimizes a cost and/or maximizes a benefit (e.g., optimizes a result) of participating in the aggregation opportunity, within a threshold level of optimization.

The impact representation (e.g., cost differential) returned by each of the site controllers 216 may include or otherwise consider any incentives, award payments, or other incentives applicable to the given site controller apart from an incentive of the aggregation opportunity. The impact representation may also include or otherwise consider user input, such as a site participation preference.

The set of values for the decision variables may include apportionment values, each indicating a portion of the requested change in power to be provided by a corresponding site controller 216. The optimization engine 222 may utilize the apportioner 228 to provide apportionment values. During repeated polling, proposed apportionment values may be provided to the site controllers 216 until committed apportionment values can be determined through the optimizing algorithm of the optimization engine 222. A similar result to that of repeated polling may be obtained by providing a set of multiple apportionment values to the site controllers 216 and receiving a set of multiple impact values corresponding to the multiple apportionment values back from the site controllers 216.

Table 1 below illustrates a specific, non-limiting example of repeated polling or provision of multiple apportionment values for impact representations (e.g., site change in cost) with a total change in power of 6 megawatts (MW).

TABLE 1

| Site A | | Site B | | Site C | | |
|---|---|---|---|---|---|---|
| Apportionment Value | Change in cost | Apportionment Value | Change in Cost | Apportionment Value | Change in Cost | Total Change in Cost |
| 2 MW | $5,000 | 2 MW | $4,000 | 2 MW | $6,500 | $15,500 |
| 2 MW | $5,000 | 3 MW | $6,000 | 1 MW | $3,000 | $14,000 |
| 1 MW | $2,000 | 4 MW | $8,000 | 1 MW | $3,000 | $13,000 |
| 0 MW | $0 | 6 MW | $13,500 | 0 MW | $0 | $13,500 |
| ½ MW | $800 | 5 MW | $11,000 | ½ MW | $1,000 | $12,800 |
| 1 MW | $2,000 | 5 MW | $11,000 | 0 MW | $0 | $12,000 |

In this example of Table 1 three different sites (Site A, Site B, and Site C) are polled. As shown in the table, apportionment values for six different scenarios of apportionment between the sites were polled. As previously discussed, in some embodiments, an aggregate cost function may be given by:

$$C_{agg} = \sum_i C_i$$

The minimum-cost polled scenario in this specific example of the Table 1 apportions 1 MW to Site A, 5 MW to Site B, and 0 MW to site C. In this example, the minimum polled $C_{agg}$ is $12,000. In some embodiments, the apportionment values corresponding to this minimum polled $C_{agg}$ may be used as committed apportionment values to implement the lowest-cost apportionment scenario. In some embodiments, however, functions of the impact (e.g., change in cost) versus proposed apportionment values may be estimated for each site (e.g., using least squares regressions or interpolations). For example, changes in cost for the sites based on various proposed apportionment values may be given by $f_A(\Delta Power_A)$, $f_B(\Delta Power_B)$, and $f_C(\Delta Power_C)$, where $\Delta Power_A$, $\Delta Power_B$, and $\Delta Power_C$ are proposed site changes in power for the sites. In some embodiments, the apportionment may be optimized by taking a minimum of the sum of these estimated functions:

$$\min(f_A(\Delta Power_A) + f_B(\Delta Power_B) + f_C(\Delta Power_C)),$$

where $\Delta Power_A + \Delta Power_B + \Delta Power_C = \Delta Power_{total}$, and $\Delta Power_{total}$ is the net change in power requested in the aggregation opportunity. In the example illustrated by the table, $\Delta Power_{total}$ is 6 MW. This approach of using estimated site change functions for the site may enable optimization of the total cost of apportioning the net change in power among the sites without polling the site controllers 216 for every possible apportionment value. In some instances it may be possible to construct estimated functions for the changes in cost for the sites using relatively few polled engagement rule set/impact representation pairs (e.g., two, three, four, or five apportionment value/change in cost pairs).

Using impact representations received from the plurality of DERs 216, as derived from or based on the optimized set of values for the set of decision variables, the optimization engine 222 may determine whether to participate (or not participate) in the aggregation opportunity. The optimization engine 222 may determine whether to participate in the aggregation opportunity by comparing a total impact with an upshot for participation. The total impact may be a total change in cost, which can be a sum of cost differentials received from the plurality of DERs 216 for participation in the maneuver to respond to the aggregation opportunity. The upshot for participation may be specified according to the aggregation opportunity. The upshot may include one or both of a benefit (e.g., an economic benefit) for participating in the aggregation opportunity and/or a penalty (e.g., an economic penalty) for not participating in the aggregation opportunity. For example, the upshot may be a rate reduction, a statement credit, or even a payment or other tangible benefit. The upshot may also be a function of power level production (e.g., actual power level production) above one of a baseline (e.g., participation) level and/or an expected level. The upshot can be a function of the requested power level production (e.g., as requested by the aggregation opportunity). The upshot may also consider any incentives, award payments, or other incentives applicable to individual sites beyond an incentive specified by the aggregation opportunity.

The optimization engine 222 may also determine, based on the impact representations, which of the plurality of DERs 216 to include in participation of a maneuver in response to an aggregation opportunity. Participation of a site in a maneuver to meet an aggregation opportunity may include providing at least a portion of requested change in power for at least a portion of the period of time of the aggregation opportunity. Producing or otherwise providing a portion of the requested change in power can comprise a reduction in consumed power (e.g., through control of loads, generators, batteries). Alternatively, or in addition, producing or otherwise providing a portion of the requested change in power can comprise original generation of electricity (e.g., via generator, photovoltaic panel).

Upon determining whether to participate in the aggregation opportunity and/or determining which of the plurality of site controllers 216 to include in participation, the optimization engine 222 may provide instructions to the plurality of site controllers 216. For example, the optimization engine 222 may transmit, via the network/COM interface 208, a command to selected controllers 216 to schedule participation in the aggregation opportunity. As another example, the optimization engine 222 may transmit, via the network/COM interface 208, a committed parameter set (e.g. a set of decision variables, which may include committed apportionment values), which the site controllers 216 may incorporate to control operation of their DERs during the period of an event responding to the aggregation opportunity.

Participation in the event comprises producing a portion of the requested power level reduction for at least a portion of the period of time of the aggregation opportunity. For example, the optimization engine 222 may provide, via the network/COM interface 208, committed apportionment values and instructions to the plurality of site controllers 216 to schedule participation in the aggregation opportunity. Each so instructed site controller 216 may then respond to the instruction to participate in the aggregation opportunity, such as by reducing power consumption or generating excess power to provide a portion of the change in power according to the corresponding committed apportionment value of the site controller 216.

As can be appreciated, in other embodiments, some or all of the functionality of the optimization engine 222 may be provided by additional modules 220 or sub-modules of the aggregation engine 202. The optimization engine 222 may orchestrate other modules 220 to perform operations for aggregating power of from a plurality of site controllers 216.

The polling engine 224 may poll, via the network/COM interface 208, each of the plurality of site controllers 216 to inquire a cost differential of the given site controller 216 participating in the aggregation opportunity versus not participating. In some embodiments, polling each site controller 216 may include providing an engagement rule set and associated apportionment value(s) for participating in an aggregation opportunity and then receiving an impact representation (e.g., a differential value) from the site controller 216 that is derived based on if the site controller 216 were to operate according to the engagement rule set. For example, polling each site controller 216 may include providing proposed apportionment values for participating in an aggregation opportunity to provide a corresponding change in power over a period of time, and then receiving a differential value (e.g., a cost differential value) from the site controller 216. Each differential value received may indicate a delta of a cost on the corresponding site controller 216 of participating in the aggregation opportunity versus not participating in the aggregation opportunity. The cost on the corresponding site controller 216 may also consider any incentives, award payments, or other incentives applicable to individual site controllers 216 beyond an incentive specified by the aggregation opportunity.

In some embodiments, the polling engine 224 may poll, via the network/COM interface 208, each of the plurality of site controllers 216 to inquire a preference to participate in an aggregation engine. The preference to participate in the aggregation engine may be a site user defined variable that indicates a desire to participate in aggregation opportunities. The preference to participate may be included in the optimization engine's determination as a cost element and/or an impact representation. In some embodiments, the preference to participate may change the apportionment values. For example, site's unwilling to participate in the aggregation opportunity may be withdrawn from the apportionment calculation. In some embodiments, the preference to participate may be ignored if certain criteria exist. For example, if a site has not participated in any aggregation opportunities over a threshold period of time or if there is an insufficient number of willing participant sites, the site's preference may be ignored.

In some embodiments, polling an individual site controller 216 may include requesting a participation cost for the site controller 216 to participate in the aggregation opportunity and requesting a baseline (e.g., non-participation) cost for the site controller 216 without participation in the aggregation opportunity. Accordingly, receiving the cost differential may comprise receiving the participation cost and the baseline (e.g., non-participation) cost and then calculating the cost differential. The polling engine 224 may calculate the cost differential based on the received participation cost and the received baseline (e.g., non-participation) cost.

The polling engine 224 may poll the plurality of site controllers 216 by polling corresponding site controllers 216 for a plurality of sites. Each site may include a site controller 216 that may perform optimization of operation of one or more DERs of the corresponding site. Accordingly, the site controller 216 of a given site can generate and provide cost differential information back to the polling engine 224 in response to an inquiry for a cost differential based on an apportionment value and/or values of decision variables. The polling engine 224 polls a site controller 216 to inquire a cost differential of the corresponding site participating in the aggregation opportunity versus not participating. A site controller 216 for a site may be onsite (e.g., located proximate to the site), or may be located remote from the site, such as in a cloud-based computing environment or other remote server for servicing or otherwise controlling the DERs of the site.

The engagement rule set engine 226 may determine rules, parameters, control variables, or the like for preparing an engagement rule set to indicate to a site controller 216 an amount of power production or reduction and a period of time for the site controller 216 to participate in the aggregation opportunity. The period may be all or a portion of a time period of an aggregation opportunity. In other words, the period indicated in an engagement rule set may be a fractional portion of the total period for an aggregation opportunity. The engagement rule set engine 226 may determine that a given site controller 216 is needed for only a portion of the entire period of the aggregation opportunity, because other site controllers 216 of the plurality of site controllers 216 can handle power production or reduction during other portions of the period of the aggregation opportunity. An indication of an amount of power production or reduction may be an apportionment value, such as an apportionment in units of power (e.g., kW) or units of energy (e.g., kWh). An indication of an amount of power production or reduction may be an apportionment value, such as in terms of a fraction or a ratio of a total requested power production or reduction. An indication of an amount of power production may be in terms of a participation benefit, such as a unit value per unit power (e.g., value in dollars ($) per unit power—$/kW). Stated otherwise, the engagement rule set may indicate an amount of power production in terms of offering a participation benefit ("I [the utility company] will pay you [the aggregation of DERs] $40 for every kW generated [produced, saved, or otherwise provided back to the grid] during the period of the aggregation opportunity."). In another example, an aggregation engine's optimization engine 222 may consider, as part of the total cost of participation, any payments to be made by the aggregator to each site for the proposed apportioned participation, even if the payment rates are different for each site. In this example, the optimization engine 222 can correctly consider sites to be paid by the aggregator for participation, even if each site's benefit or cost of participation is different from that of other sites. This may be useful in cases where an aggregator has different compensation contracts with each site. For example, one site may be paid $0.50 per kWh for participation, and another may be paid $0.30 per kWh for participation. Another way to consider payments to be made by the aggregator to the sites is for each site to include payments to be made by the aggregator to the site as part of its cost when polled for the cost of participation. Combinations of these two approaches are also possible.

The apportioner 228 may determine proposed and/or committed apportionment values for each given site controller 216. The determination of the apportioner 228 may be made based on a total quantity of the plurality of site controllers 216. The determination of the apportioner 228 may be made based on a capacity of a battery of an energy storage system of the given site controller relative to a capacity of all batteries of the energy storage systems of the plurality of site controllers 216. The determination of the apportioner 228 may be made based on a power output of a battery of the energy storage system of the given site controller relative to a total power output of all batteries of the energy storage systems of the plurality of site controllers 216. The determination of the apportioner 228 may be made based on assigning the total requested power level production as the proposed apportionment value. The apportioner 228 may consider a configuration (e.g., configuration data 242) of each site controller 216 of the plurality of site controllers 216. The apportioner 228 may consider external conditions (e.g., external data 244). The apportioner 228 may also consider previously determined and proposed apportionment values (e.g., apportionment values 248) and/or values of decision variables (e.g., decision variables 246). The apportioner 228 may consider historical data (e.g., historic observations 250), so as to consider a totality of circumstances and the apportionment value(s) that were determined to be effective toward optimization. In some embodiments, the engagement rule set engine 226 may utilize the apportioner 228 to determine proposed apportionment values of an engagement rule set.

The data 240 stored on the memory 210 may include configuration data 242, external data 244, engagement rule sets 245, decision variables 246, apportionment values 248, impact representations 249, and/or historic observations 250.

The configuration data 242 may be received from each site controller 216 to communicate constraints and characteristics of the site controller 216. For example, the configuration data 242 may communicate a size or other capacity information of one or more batteries of an energy storage system of the site controller 216. The configuration data 242 may include tariff information for a given site controller 216, which may provide time of use rate and/or demand rate for any given day and/or time. In some embodiments the configuration data 242 may include market data (e.g., data associated with changes in the benefit for participation). In some embodiments the configuration data 242 includes information indicating a historic distribution system load to help the optimizer determine when an aggregation opportunity event may be called in advance of the call. The modules 220 may, in turn, include a forecaster 230 configured to forecast and begin planning an aggregation opportunity before it is even called.

The external data 244 may include information such as weather forecasts, changing tariffs, fuel costs, event data, and market value of resources (e.g., costs of site components such as a battery), which may inform or otherwise impact determination of an optimal set of apportionment values and/or values for the decision variables.

The engagement rule sets 245, decision variables 246, apportionment values 248, and impact representations 249 may be a record of previously proposed and/or final values as determined by the optimization engine 222, the polling engine 224, the engagement rule set engine 226, and/or the apportioner 228 and recorded in the memory 210.

The impact representations 249 may be values returned to the aggregation engine 202 by site controllers 216. The impact representations 249 may include information indicating an impact on a site controller 216 of that site participating in an event to respond to an aggregation opportunity. For example, the impact representations 249 may include cost information, differential values (e.g., cost differentials), or the like. The impact representations 249 may be referenced or otherwise utilized by one or more of the optimization engine 222, the polling engine 224, the engagement rule set engine 226, and/or the apportioner 228. In some embodiments, a site participation preference may be included in the impact representations 249. In some embodiments, site participation preferences 251 may be values or non-numerical indicators returned to the aggregation engine 202 by site controllers 216.

The historic observations 250 may be continuously recorded and stored in memory 210 to inform future optimizations and/or determinations of engagement rule sets 245 and values for decision variables 246 and/or apportionment values 248.

As can be appreciated, the aggregation engine 202 may store other types of data 240 in memory 210. The other types of data 240 may be generated by and/or utilized by the optimization engine 222, the polling engine 224, the engagement rule set engine 226, and/or the apportioner 228.

The aggregation engine 202, or the components of the aggregation engine 202 in combination, can receive an aggregation opportunity (e.g., a demand response call to participate in an aggregation opportunity), for example, from the utility 218. The aggregation opportunity may specify a requested power level production over a period of time (in the future). The aggregation opportunity may also specify an upshot for providing the requested net change in power for the period of time. The aggregation engine 202 can poll each of a plurality of site controllers 216 to inquire an impact of a corresponding site participating in the aggregation opportunity versus not participating. The aggregation engine 202 receives, via the network/COM interface 208, impact representations 249 (e.g., a cost differential) from the plurality of site controllers 216. The aggregation engine 202 can determine, based on the impact representations 249 (and potentially the upshot specified by the aggregation opportunity), whether to participate in the aggregation opportunity. The aggregation engine 202 can determine which of the plurality of site controllers 216 will participate in the aggregation opportunity. Then the aggregation engine 202 can transmit, via the network/COM interface 208, a command, instructions, and/or control variables to selected site controllers 216 of the plurality of site controllers 216 to schedule participation in the aggregation opportunity by producing a portion of the requested power level production for at least a portion of the period of time of the aggregation opportunity.

The aggregation engine 202 may also determine whether and how an upshot of participation in the aggregation opportunity may be divided or otherwise distributed among the different site controllers 216 in exchange for the participation of the site controllers 216. The aggregation engine 202 may, according to one embodiment, allocate the upshot according to a proportion of power to be produced by the site relative to the total power requested.

Figure 3:
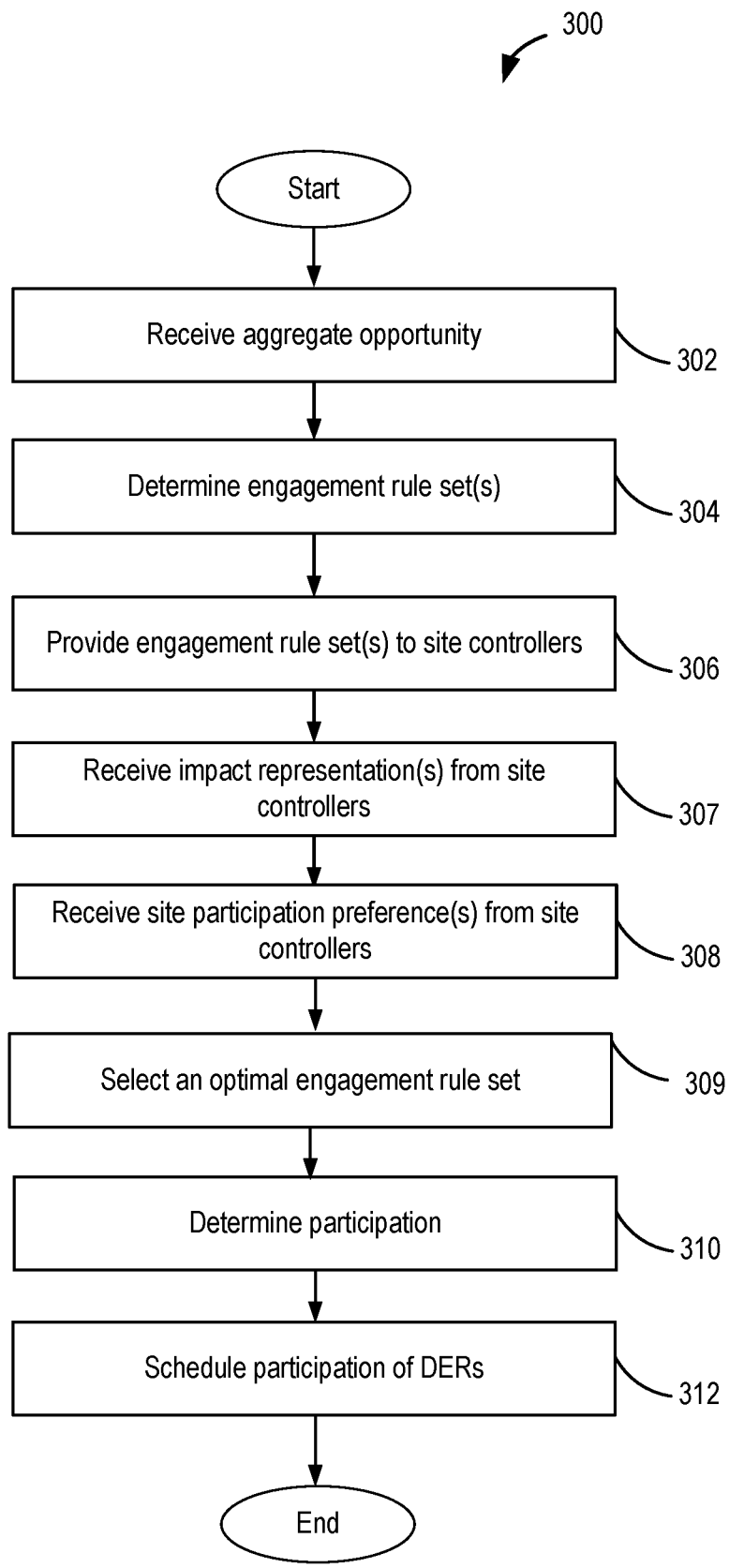
FIG. 3 is a flow diagram of a method of aggregating power of DERs, according to one embodiment of the present disclosure.

FIG. 3 is a flow diagram of a method 300 of aggregating power of sites including DERs, according to one embodiment of the present disclosure. The method 300 may be performed by an aggregation engine, such as the aggregation engine 102 of FIG. 1 or the aggregation engine 202 of FIG. 2. The method 300 includes operations for aggregating power of a plurality of sites including DERs to produce a requested or otherwise desired power level for a period of time.

An aggregation opportunity (e.g., a demand response call) is received 302. The aggregation opportunity may be received 302 from a utility, or from some other entity that may be aware of a need for additional power or reduction in power consumption. The aggregation opportunity may provide a request or other opportunity for a recipient to participate in an aggregation opportunity by providing a requested net change in power for a period of time. The aggregation opportunity specifies a requested net change in power over a period of time. The net change in power and/or the period of time may be such that a single energy resource may have considerable difficulty participating. By contrast, an aggregation engine with the ability to aggregate participation of a plurality of sites, each having one or more DERs, in a maneuver may be able to meet the request of an aggregation opportunity. The received 302 aggregation opportunity may also provide or otherwise specify an upshot for providing a requested net change in power for the period of time. The upshot may be a benefit (e.g., a monetary or other economic incentive, such as a statement credit, a payment, or the like) to be received for providing the requested net change in power over the period of time of the aggregation opportunity, and/or a penalty (e.g., a monetary or other economic penalty, such as a fine, increase rate, or the like) to be received for failing to provide the requested net change in power over the period of time of the aggregation opportunity. The upshot of the aggregation opportunity may be a function of actual power level production above one of a baseline (e.g., non-participation) level and/or an expected level. The upshot of the aggregation opportunity may be a function of the requested net change in power.

One or more proposed engagement rule sets are determined 304 for a plurality of sites. An engagement rule set may be determined 304 for each of the plurality of site controllers to provide parameters, guidelines, or the like for the sites to participate in an event that is responsive to the aggregation opportunity. The engagement rule set(s) may include indication of an amount of a site change in power and a period over which the indicated amount of the site change in power is to be provided.

For example, an engagement rule set may include a proposed apportionment value that indicates a portion of the requested net change in power to be provided by a corresponding site for participation in an event responsive to the aggregation opportunity. The proposed apportionment value of each given site may be determined based on a total quantity of available DERs at each site. The proposed apportionment value of each given site may be determined based on a capacity of a battery of the energy storage system of the given site relative to a capacity of all batteries of the energy storage systems of the plurality of sites. The proposed apportionment value of each given site may be determined based on a power output of a battery of the energy storage system of the given site relative to a total power output of all batteries of the energy storage systems of the plurality of sites. The proposed apportionment value of each given site may be an assignment of the total requested net change in power as the proposed apportionment value. An apportionment value may be expressed in units of power (e.g., kW) or units of energy (e.g., kWh). An apportionment value may be expressed in terms of a fraction or a ratio of a total requested net change in power.

In other embodiments, the indicated amount of site change in power (of an engagement rule set) may be provided in terms of a participation benefit, such as a unit value per unit power (e.g., value in dollars ($) per unit power —$/kW). Stated otherwise, the engagement rule set may indicate an amount of site change in power in terms of offering a participation benefit ("I [the utility company] will pay you [the aggregation of sites] $40 for every kW generated [produced, saved, or otherwise provided back to the grid] during the period of the aggregation opportunity."). In one example, a demand response (DR) program may enlist an aggregator to commit to reducing aggregate power consumption compared to a baseline (e.g., a non-participation level) when called upon to do so a limited number of times per year. In this scenario, the aggregator may be pre-paid for the participation and penalized if the performance does not meet agreed-upon levels. In this case the upshot is the negative penalty cost as determined by the contract between the utility and the aggregator.

The period of an engagement rule set may be all or a portion of a time period of an aggregation opportunity. In other words, the period indicated in an engagement rule set may be a fractional portion of the total period for an aggregation opportunity. The engagement rule set may indicate that a given site is needed for only a portion of the entire period of the aggregation opportunity, because other sites of the plurality of sites can handle the requested net change in power during other portions of the period of the aggregation opportunity.

The engagement rule sets and apportioned participation levels are transmitted or otherwise provided 306 to the plurality of site controllers. For example, an aggregation engine may communicate engagement rule set(s) and apportioned participation levels to the plurality of site controllers via a communication network. Each of the individual site controllers can utilize the engagement rule set(s) and apportioned participation levels to determine an impact for the site to participate in the aggregation opportunity.

An impact representation is received 307 from each of the plurality of site controllers. The impact representation indicates an impact on the site of participating in the aggregation opportunity versus not participating in the aggregation opportunity. For example, the impact representation may include cost information, such as a cost differential or information for determining a cost differential. A cost differential indicates a difference in cost of participating (e.g., participating optimally) in the aggregation opportunity versus not participating (e.g., participating optimally) in the aggregation opportunity. The individual site controllers may directly communicate a cost differential, or may communicate both a cost of participation and a cost of nonparticipation, which can be used to determine a cost differential. In other words, a cost differential may be received 307 from a site controller in various ways including at least: 1) directly as a differential value (resulting from the site controller comparing an anticipated cost of participating in a maneuver versus a cost of not participating in a maneuver) and 2) as a pair of cost values, namely a participation cost and a non-participation cost, from which a comparison can be made to derive a differential value.

In other embodiments, an impact representation may include an optimized participation, such as in units of power (kW). The optimized participation would indicate a quantity of participation (e.g., an amount of site change in power) the site controller can optimally provide or reduce, within a threshold level of optimization. For example, a given site controller may be able to easily (e.g., efficiently, or optimally) provide a site change in power of 50 kW from stored power in a battery charged to store 80 kW. However, discharging the battery below 30 kW may significantly degrade the battery, such that providing additional power production beyond the 50 kW may prove to increase the cost significantly. Accordingly, an impact representation can indicate both the cost information and the optimized participation. Optimized participation may be included in an impact representation that is derived based on an engagement rule set that includes a participation benefit. The optimized participation is determined based at least in part on the participation benefit.

In still other embodiments, an impact representation may include a marginal cost of participation, such as in units of value per units of power (e.g., dollars per kW). The marginal cost of participation may indicate additional cost incurred in the production or reduction of consumption of one or more additional units of power. An impact representation that includes a marginal cost of participation may be derived based on an engagement rule set that includes a participation benefit. The marginal cost of participation can be determined based at least in part on the participation benefit.

In still other embodiments, an impact representation may include a nominal cost of participation and a first derivative of the cost of participation with respect to the level of participation. The advantage of this form of impact representation may be to provide useful information to the aggregate optimization engine 222 (FIG. 2) to accelerate finding the optimal aggregate apportionment. This is because many numerical optimizers benefit from having the first derivative of the cost function with respect to each decision variable. This may also result in determination of the optimal aggregate apportionment with a smaller number of iterations and less communication traffic. In these examples, the cost and derivative may be based on the optimal optimized cost or unoptimized cost. In still other embodiments, an impact representation may include a nominal cost of participation for a set of participation parameter values. The advantage of this form of impact representation may be to further accelerate convergence to a minimum-cost apportionment of the total aggregate maneuver. As can be appreciated, other embodiments of impact representations are possible.

A site participation preference is received 308 from each of the plurality of site controllers. The site participation preference indicates input from an operator of a site of a willingness to participate in the aggregation opportunity versus not participating in the aggregation opportunity. This site participation preference allows the operator to provide the system with cost input that the system may not know otherwise. For example, the operator may know certain devices at the site are critical to complete an on time order. The system may not know of penalties for delivering the order late and may therefore under evaluate the cost of the site downtime. The site participation preference can allow the user to compensate the impact representation for these situational events.

In some embodiments, providing 306 the engagement rule set(s), receiving 307 impact representations from the plurality of site controllers, and receiving 308 site participation preferences from the plurality of site controllers may be an example of polling for an impact representation (e.g., a cost differential). In some embodiments, providing 306 the engagement rule set(s), receiving 307 impact representations from the plurality of site controllers, and receiving 308 site participation preferences from the plurality of site controllers may be repeated using a plurality of different engagement rule sets. This repetition enables the aggregation engine to obtain impact representations from the plurality of site controllers for multiple variations on apportioning the requirements of the aggregation opportunity among the various sites. In some embodiments, rather than repeat the providing 306 and the receiving 307 for a plurality of different engagement rule sets, the plurality of engagement rule sets may all be provided at once at the providing 306 operation. By extension, the site controllers may provide multiple impact representations corresponding to the multiple engagement rule sets, and the aggregation engine receives 307 these multiple engagement rule sets.

Based on the impact representations received 307 from the site controllers, and the site participation preferences received 308 from the plurality of site controllers, the aggregation engine selects 309 an optimal engagement rule set. In embodiments where the aggregation engine has received 307 multiple impact representations corresponding to multiple variations of the apportionment (e.g., repetition of 306 and 307, providing a plurality of engagement rule sets, etc.), the aggregation engine may select the engagement rule set that corresponds to the lowest total impact representation. In some embodiments, the aggregation engine may interpolate between the multiple impact representations and engagement rule sets to attempt to further optimize the aggregation (e.g., to reduce the computation performed by the local controllers to determine a large number of optimal impact responses to a large number of engagement rule sets). For example, the aggregation engine may deviate from the engagement rule set that corresponds to the lowest total impact representation based on the interpolations between the multiple impact representations. In some embodiments, the site participation preference may be used to determine which sites are currently available to participate in an aggregation opportunity. In some embodiments, the site participation preference may be associated with a value and that value may be combined with the impact representation.

Based on a total impact of all the sites corresponding to a selected engagement rule set, participation in the aggregation opportunity is determined 310. This determination 310 is made in embodiments where participation in the aggregation opportunity is optional. Some programs offer optional participation, but some programs require mandatory participation with a penalty for non-performance. The determination 310 of participation may include determining whether to participate in the aggregation opportunity. It will be apparent that the selected engagement rule set may, in some instances, include participation of some of the plurality of sites in and exclude others of the sites from participation in meeting the aggregation opportunity. Determining 310 whether to participate may include comparing the upshot of the aggregation opportunity to a total impact (e.g., a total cost differential) of the selected engagement rule set, which may be a summation (or other compilation) of the selected impact representations (e.g., cost differentials) received 307 from the site controllers. For example, if the upshot is a benefit (e.g., a monetary incentive) that exceeds the total impact (e.g., a total cost differential) of the selected engagement rule set, the determination 310 may be to participate in the aggregation opportunity. By contrast, if the benefit (e.g., including compensation and avoidance of penalties) is less than the total impact (e.g., a total cost differential) of the selected engagement rule set, the determination 310 may be to not participate. As another example, if the upshot of participation is an avoidance of a penalty and the avoided penalty is greater than a total impact (e.g., a total cost differential) of the selected engagement rule set, the determination 310 may be to participate in the aggregation opportunity. However, if the avoided penalty is less than the total impact (e.g., a total cost differential) of the selected engagement rule set, the determination 310 may be to not participate in the aggregation opportunity (i.e., to suffer the penalty rather than the additional cost for participating to respond to the aggregation opportunity). As yet another example, the upshot may include a benefit and an avoidance of a penalty. If the combined benefit and avoided penalty is greater than the total impact, the determination 310 may be to participate in the aggregation opportunity. Otherwise, the determination 310 may be to not participate in the aggregation opportunity. The upshot of the aggregation opportunity may be a function of actual net change in power above one of a baseline (e.g., non-participation) level and/or an expected level. The upshot of the aggregation opportunity may be a function of the requested net change in power.

As previously discussed, it will be apparent that the selected engagement rule set may, in some instances, include participation of some of the sites and exclusion of others of the sites from participation. For example, if a first site could provide a site change in power of 50 kWh toward an aggregation opportunity for a cost differential valued at or equivalent to $50, and a second site could also provide a site change in power of 50 kWh toward the same aggregation opportunity for a cost differential valued at or equivalent to $40, selecting 309 an optimal engagement rule set may include selecting the second site for participation and deselecting the first DER based on the optimal engagement rule set. As can be appreciated, the selected engagement rule set may, in some instances, include participation of all the plurality of sites to contribute net change in power to the aggregation opportunity.

In some embodiments the aggregation engine has different compensation contracts with each site. For example, one site may be paid $0.50 per kWh for participation, and another may be paid $0.30 per kWh for participation. Another way to consider payments to be made by the aggregator to the sites is for each site to include payments to be made by the aggregator to the site as part of its cost when polled for the cost of participation. Combinations of these two approaches are also possible.

If the determination 310 is to participate, then participation of selected sites is scheduled 312 for performing a maneuver to meet the net change in power requested by the aggregation opportunity. The selected sites may be scheduled 312 by transmitting, via the communication network, a command, signal, or the like to the selected site controllers of the plurality of sites to schedule participation in the aggregation opportunity. The command, signal, or the like may schedule 312 the selected sites to provide a portion of the requested net change in power for at least a portion of the period of time of the aggregation opportunity. The command may include a committed apportionment value and timing for applying the committed apportionment value to provide a corresponding portion of the overall requested net change in power for at least a portion of the period of time of the aggregation opportunity. The requested net change in power may be an amount relative to a baseline (e.g., non-participation) level. The requested net change in power may be an amount relative to an expected level. The site controllers may in turn provide a portion of the requested net change in power by a reduction in consumed power, such as through control of loads, generators, and batteries. The site controllers may produce a portion of the requested net change in power through original generation of electricity, such as by photovoltaic generation, wind generation, fuel cells, and/or other electricity generation mechanisms.

In some cases, the site controllers may not be able to fulfill their requested site change in power. For this possibility, the total net change in power for the aggregate maneuver may be increased over the amount requested by the utility. With this approach, the likelihood of penalty due to non-performance can be reduced. Furthermore, during execution of the aggregate maneuver, if some sites under-produce compared to the requested production $P_f$ or if the total production falls below the required level, the scheduling participation may dynamically increase the requested amount of site change in power from some or all of the site controllers to compensate. Again, this can help minimize the possibility of under-delivering the contracted aggregate maneuver and associated penalties.

As previously mentioned, in some embodiments the polling the plurality of site controllers, such as through determining 304 engagement rule set(s), providing 306 engagement rule set(s) to the site controllers, and receiving 307 impact representations from the site controllers, may be repeatedly performed according to an optimization algorithm to, in essence, repeatedly test the apportionment values and determine an optimized final set of apportionment values. The optimization algorithm may be a continuous optimization algorithm. The optimization algorithm may be a constrained optimization algorithm. The optimization algorithm may be a generalized optimization algorithm. The optimization algorithm may be a multivariable optimization algorithm.

Distributed Energy Resources and Local Control Thereof

Figure 4:
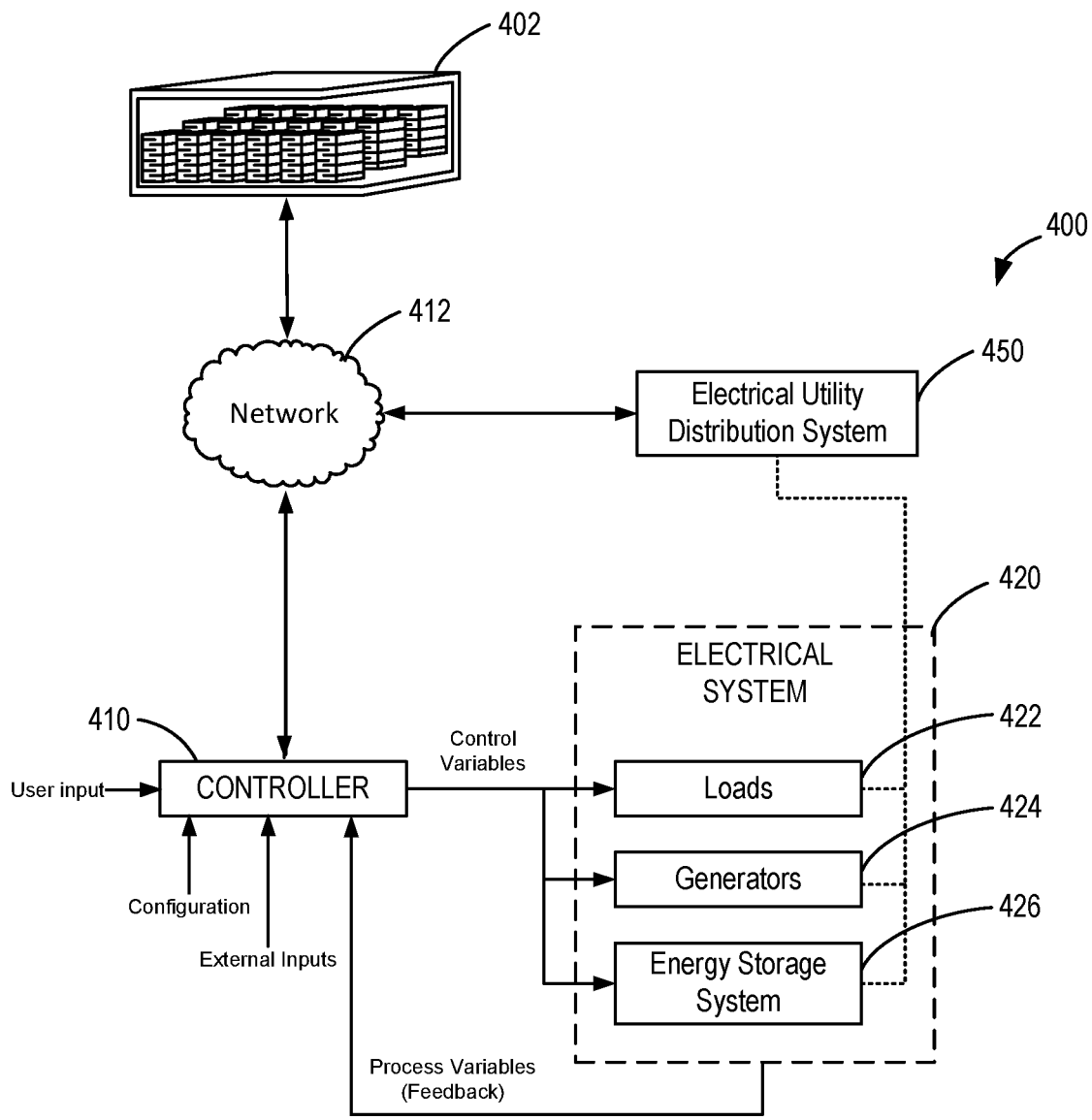
FIG. 4 is block diagram illustrating a system architecture of a site including a DER, according to one embodiment of the present disclosure.

FIG. 4 is block diagram illustrating a system architecture of a site 400, according to one embodiment of the present disclosure. FIG. 4 also provides a control diagram of site 400, according to one embodiment of the present disclosure. Stated otherwise, FIG. 4 is a representative diagram of a system architecture of a site 400 including a controller 410, according to one embodiment. The site 400 comprises an electrical system 420 that is controlled by the controller 410. The electrical system 420 includes DERs including one or more loads 422, one or more generators 424, and an energy storage system (ESS) 426. The electrical system 420 is coupled to an electrical utility distribution system 450, and therefore may be considered on-grid. Similar electrical systems exist for other applications, such as a photovoltaic generator plant, an off-grid building, etc.

In the diagram of FIG. 4, the controller 410 is shown on the left-hand side and the electrical system 420, sometimes called the "plant," is shown on the right-hand side. An aggregation engine 402 interconnects with the controller 410 (e.g., a site controller) of the site 400 and the electrical utility distribution system 450, such that the aggregation engine 402 can receive aggregation opportunities from the electrical utility distribution system 450 and can communicate with the site controller 410 of the site 400 to coordinate a maneuver of an aggregation opportunity. The aggregation engine 402 may interconnect with controllers of a plurality of sites.

The controller 410 may be a site controller of the site 400 and can include electronic hardware and software in one embodiment. In one example arrangement, the controller 410 includes one or more processors and suitable storage media, which stores programming in the form of executable instructions which are executed by the processors to implement the control processes. The controller 410 is in communication over a network 412 with the aggregation engine 402, which may be similar to the aggregation engine 102 of FIG. 1 or the aggregation engine 202 of FIG. 2.

The electrical system 420 includes a combination of all local loads 422, local generators 424, and the ESS 426 of the site 400. The electrical system 420 may provide local energy distribution or connectivity from the electrical utility distribution system 450 to or between the local loads 422, the local generators 424, and/or the ESS 426 of the site 400.

Loads are consumers of electrical energy within an electrical system. Examples of loads are air conditioning systems, motors, electric heaters, etc. The sum of the loads' electricity consumption rates can be measured in units of power (e.g. kW) and simply called "load" (e.g., a building load).

Generators may be devices, apparatuses, or other means for generating electrical energy within an electrical system. Examples are solar photovoltaic systems, wind generators, combined heat and power (CHP) systems, and diesel generators or "gen-sets." The sum of electric energy generation rates of the generators 424 can be measured in units of power (e.g., kW) and simply referred to as "generation."

As can be appreciated, loads may also generate at certain times. An example may be an elevator system that is capable of regenerative operation when the carriage travels down. Accordingly, this load may, at times, serve as a DER similar to a generator. Distributed Energy Resource (DER) in this context is any device that can produce or consume energy and are often controllable in some way. In one embodiment, electrically connected DERs (simplified to DERs here) can generate or consume electrical energy. Almost all DERs are controllable to some extent. PV generators, wind turbines, and diesel gensets are DERs, as are energy storage systems (ESSs). Even loads are DERs, and most of them (such as lights) can be controlled in limited ways by turning them off or using other means such as changing the setting on a thermostat. The net load of a DER or collection of DERs is the load (power consumption) minus generation (power generation). Net load may be positive or negative.

Unadjusted net power or unadjusted net load may refer herein to net load in the absence of active control by the site controller 410. For example, if at a given moment a building has loads consuming 100 kW, and a solar photovoltaic system generating at 25 kW, the unadjusted net power is 75 kW. Similarly, if at a given moment a building has loads consuming 70 kW, and a solar photovoltaic system generating at 100 kW, the unadjusted net power is −30 kW. As a result, the unadjusted net power is positive when the load energy consumption exceeds generation, and negative when the generation exceeds the load energy consumption.

ESS power refers herein to a sum of a rate of electric energy consumption of an ESS. If ESS power is positive, an ESS is charging (consuming energy). If ESS power is negative, an ESS is generating (delivering energy).

Adjusted net power refers herein to unadjusted net power plus the power contribution of any controllable elements such as an ESS. Adjusted net power is therefore the net rate of consumption of electrical energy of the electrical system considering all loads, generators, and ESSs in the system, as controlled by a controller described herein.

Unadjusted demand is electricity demand as defined by the locally applicable tariff, but only based on the unadjusted net power. In other words, unadjusted demand does not consider the contribution of any ESS.

Adjusted demand or simply "demand" is demand as defined by the locally applicable tariff, based on the adjusted net power, which includes the contribution from any and all controllable elements such as ESSs. Adjusted demand is the demand that can be monitored by the utility and used in the demand charge calculation.

Referring again to FIG. 4, the electrical system 420 may provide information to the controller 410, such as by providing process variables. The process variables may provide information, or feedback, as to a status of the electrical system 420 and/or one or more components (e.g., loads, generators, ESSs) therein. For example, the process variable may provide one or more measurements of a state of the electrical system 420. The controller 410 receives the process variables for determining values for control variables to be communicated to the electrical system 420 to effectuate a change to the electrical system 420 toward meeting a controller objective for the electrical system 420. For example, the controller 410 may provide a control variable to adjust the load 422, to increase or decrease generation by the generator 424, and to utilize (e.g., charge or discharge) the ESS 426.

The controller 410 may receive a configuration (e.g., a set of configuration elements), which may specify one or more constraints of the electrical system 420. The configuration may inform the determination of the values of the control variables.

The controller 410 may also receive external inputs (e.g., weather reports, changing tariffs, fuel costs, event data), which may inform the determination of the values of the control variables. A set of external inputs may be received by the controller 410. The set of external inputs may provide indication of one or more conditions that are external to the controller 410 and the electrical system 420.

The controller 410 may also receive user input. The user input may be manually entered via a user interface. The user interface may be a graphical user interface (GUI) or a physical control. For example, in some embodiments, the controller may comprise a screen with a GUI that allows user input. In some embodiments, the GUI may a personal electronic application that may facilitate input to the controller 410. The user input may include a site participation preference that defines the user's willingness to have the site participate in an aggregation opportunity. In some embodiments, the site participation preference may define a period of time for the site participation preference. In some embodiments, the site participation preference may default to a specific value at the beginning of a specified interval. For example, the site participation preference may reset to a value that indicates a willingness to participate in an aggregation opportunity at the beginning of every day.

The controller 410 may receive (e.g., from the aggregation engine 402) an engagement rule set, which may provide to the site 400 an amount of power production and a period of time for the site 400 to participate in an aggregation opportunity. For example, the engagement rule set may provide one or more apportionment values, constraints, rules, instructions, and/or commands from the aggregation engine 402 for participating in a maneuver (e.g., an aggregation opportunity) for an aggregation opportunity. The controller 410 may utilize the engagement rule set to inform determination of the values of the control variables.

An engagement rule set may be utilized to evaluate a hypothetical scenario, such that the site controller 410 and/or the aggregation engine 402 can determine an impact of participation in an aggregation opportunity. In some embodiments, engagement rule sets provide proposed values. In some embodiments, engagement rule sets provide committed values (e.g., values to which the site 400 is committed to abide). In some embodiments, a committed value such as an apportionment value may be communicated separately from an engagement rule set.

As can be appreciated, proposed apportionment values may be provided to a site controller 410 of a site 400 in an engagement rule set, a configuration, external inputs, or any suitable input and/or communication. Similarly, committed apportionment values may be provided to a site controller 410 of a site 400 in an engagement rule set, a configuration, external inputs, or any suitable input and/or communication.

As noted, the controller 410 may attempt to meet certain objectives by changing a value associated with one or more control variables, if necessary. The objectives may be pre-defined, and may also be dependent on time, any external inputs, any engagement rule sets, any process variables that are obtained from the electrical system 420, and/or the control variables themselves. Some examples of controller objectives for different applications are:

Provide a level of power proportional to a received apportionment value over a prescribed period of time;
Reduce consumption of power proportionally to a received apportionment value over a prescribed period of time;
Minimize demand (kW) over a prescribed time interval;
Minimize demand charges ($) over a prescribed time interval;
Minimize total electricity charges ($) from the grid;
Reduce demand (kW) from the grid by a prescribed amount during a prescribed time window; and
Maximize the life of the energy storage device.

Objectives can also be compound—i.e., a controller objective can comprise multiple individual objectives. One example of a compound objective is to minimize demand charges while maximizing the life of the energy storage device. Another example of a compound objective is providing a level of power for at least a portion of a maneuver of an aggregation opportunity while minimizing demand charges. Other compound objectives including different combinations of the individual objectives are possible.

The inputs that the controller 410 may use to determine (or otherwise inform a determination of) the control variables can include configuration, external inputs, engagement rule sets, apportionment values, and process variables.

Process variables may typically be measurements of the state of the electrical system 420 and are used by the controller 410 to, among other things, determine how well its objectives are being met. These process variables may be read and used by the site controller 410 of the site 400 to generate new control variable values. The rate at which process variables are read and used by the controller 410 depends upon the application, and may typically range from once per millisecond to once per hour. For battery energy storage system applications, the rate is often between 10 times per second and once per 15 minutes. Examples of process variables may include:

- Unadjusted net power
- Unadjusted demand
- Adjusted net power
- Demand
- Load (e.g., load energy consumption for one or more loads)
- Generation for one or more loads
- Actual ESS charge or generation rate for one or more ESSs
- Frequency
- Energy storage device state of charge (SoC) (%) for one or more ESSs
- Energy storage device temperature (deg. C.) for one or more ESSs
- Electrical meter outputs such as kilowatt-hours (kWh) or demand A configuration received by the controller 410 (or input to the controller 410) may include or be received as one or more configuration elements (e.g., a set of configuration elements). The configuration elements may specify one or more constraints associated with operation of the electrical system 420. The configuration elements may define one or more cost elements associated with operation of the electrical system 420. Each configuration element may set a status, state, constant or other aspect of the operation of the electrical system 420. The configuration elements may be values that are typically constant during the operation of the controller 410 and the electrical system 420 of the site 400. The configuration elements may specify one or more constraints of the electrical system and/or specify one or more cost elements associated with operation of the electrical system.

Examples of configuration elements may include:
- ESS type (for example if a battery: chemistry, manufacturer, and cell model)
- ESS configuration (for example, if a battery: number of cells in series and parallel) and constraints (such as maximum charge and discharge powers)
- ESS efficiency properties
- ESS degradation properties (as a function of SoC, discharge or charge rate, and time)
- Electricity supply tariff (including ToU supply rates and associated time windows)
- Electricity demand tariff (including demand rates and associated time windows)
- Electrical system constraints such as minimum power import
- ESS constraints such as SoC limits or power limits
- Historic data such as unadjusted net power or unadjusted demand, weather data, and occupancy
- Operational constraints such as a requirement for an ESS to have a specified minimum amount of energy at a specified time of day
- A maximum potential revenue over a period of time External inputs are variables that may be used by the controller 410 and that may change during operation of the controller 410. Examples are weather forecasts (e.g., irradiance for solar generation and wind speeds for wind generation) and event data (e.g., occupancy predictions). In some embodiments, tariffs (e.g., demand rates defined therein) may change during the operation of the controller 410, and may therefore be treated as an external input. In some embodiments, the engagement rule set (e.g., an apportionment value) may be received by the controller 410.

The outputs of the site controller 410 include the control variables that can affect the electrical system behavior. Examples of control variables are:
- ESS power command (kW or %). For example, an ESS power command of 50 kW would command the ESS to charge at a rate of 50 kW per unit time, and an ESS power command of −20 kW would command the ESS to discharge at a rate of 20 kW per unit time.
- Building or subsystem net power increase or reduction (kW or %).
- Renewable energy increase or curtailment (kW or %). For example, a photovoltaic (PV) system curtailment command of −100 kW would command a PV system to limit generation to no less than −100 kW. Again, the negative sign is indicative of the fact that the value is generative (non-consumptive).

In some embodiments, control variables that represent power levels may be signed, e.g., positive for consumptive or negative for generative.

The outputs of the site controller 410 may also include an impact representation, which may indicate or otherwise represent an impact on the site 400 of participating in an aggregation opportunity versus not participating in the aggregation opportunity.

In some embodiments, the impact representation may include a cost differential, which indicates or otherwise represents a difference in cost of participation in the aggregation opportunity versus not participating in the aggregation opportunity. The impact representation and/or the outputs of the site controller 410 may also include a baseline (e.g., non-participation) cost and a participation cost, from which a cost differential may be calculated or otherwise derived.

The objective of the site controller 410 may be compounded by receiving an engagement rule set from the aggregation engine 402, which may include an inquiry as to the impact (e.g., cost) to the site 400 of providing a proposed portion of the net change in power for a period of time. The power level may be a portion of a requested net change in power of an aggregation opportunity, and may be based on an apportionment value provided by the aggregation engine 402. The site controller 410 would then determine the control variable value(s) to provide the power level, and maintain the objectives of reducing demand charges while preserving battery life.

As will be described more fully below, the site controller 410 may utilize an optimization algorithm to optimize a cost function, and thereby may determine the control variables in advance of a time period of using those control variables. The site controller 410 has the ability to receive user input and incorporate that user input into the cost function and/or the optimization.

For example, the cost function may be:

$$\text{Economic Cost of Site} = \text{Cost of Demand Capping} + \text{Cost of Energy Arbitrage} + \text{Cost of Demand Response} + \text{Cost of Battery Degradation} \times \text{CLAF}$$

where CLAF is a capacity loss adjustment factor.

Advance determination of the control variables may enable repeated inquiry or polling of the site by the aggregation engine 402 to test different engagement rule sets to determine an optimized set of apportionment values, and thereby minimize a cost of participation in an aggregation opportunity. In certain embodiments, the different engagement rule sets may include proposed apportionment values.

FIG. 5A is a flow diagram of a method 500 or process of controlling a site (e.g., the site 400 of FIG. 4), according to one embodiment of the present disclosure. The method 500 may be implemented by a controller of an electrical system, such as the controller 410 that is controlling the electrical system 420 of the site 400 of FIG. 4. The controller may read or otherwise receive 501 user input corresponding to a DER and/or the electrical system of the site. The user input may include a site participation preference. The user input, such as a site participation preference, can enable an operator or user of a site to provide a quantitative or nonquantitative input that can be considered during later optimizing operations. For example, the site participation preference may represent an actual or a figurative downtime cost during a period of time. The site participation preference may be entered as a non-numeric value. For example, the operator may indicate whether power to operate equipment at the site is critical, average, or low. If an operator is attempting to fulfill an order and there is a penalty if the order is not completed that day, the operator may select that full operation of the site is critical for the day. In some embodiments, the operator may indicate desired operability of specific equipment on the site for a period of time.

As can be appreciated, existing controllers that may automate control and/or operation of an electrical system of a site tend to remove user involvement with operation of the electrical system. The automation puts more control with the controller, which may be ineffective at recognizing special and/or outlier situations. If the controller operates with considerable reliance on load prediction, a schedule, typical scenarios, machine learning, and the like, then unanticipated scenarios are not handled well by automated controllers. Presently available controllers that seek to optimize operation of an electrical system may tend to heavily automate and/or may rely heavily on machine learning. Such presently available controllers are not capable of receiving user input regarding an upcoming unpredictable situation or circumstance. Therefore, such presently available controllers can tend to produce undesirable outcomes when unpredictable situations and circumstances arise. The embodiments of the present disclosure provide an improved approach by enabling receiving 501 user input and considering that user input in an automated manner in the optimization and/or control of the operation of the electrical system of a site.

The controller may read or otherwise receive 502 a configuration (e.g., a set of configuration elements) of the electrical system of the site. As previously described, the configuration elements may provide information as to the configuration of the electrical system.

The controller may also read or otherwise receive 503 one or more engagement rule sets from a remote aggregation engine (e.g., the aggregation engine 402 of FIG. 4). The engagement rule set(s) may be received in connection with an aggregation opportunity promulgated to the remote aggregation engine by a utility, or other entity desiring to obtain additional net change in power. For example, a utility or other entity may desire to obtain additional power resources and may seek power from an aggregation of power provided through use of DERs of a plurality of sites. The one or more engagement rule set(s) may indicate a portion of a total requested power level of an aggregation request, the portion indicating an amount that the aggregation engine can expect the site to provide toward meeting the aggregation opportunity. The portion of power may be indicated by an apportionment value. Multiple apportionment values may be included in an engagement rule set in some situations, such as where an amount of power requested changes during a time period. For example, the aggregation request may specify a total requested power level of 100 MW for 60 minutes of a 90-minute total time period and 75 MW for a remaining 30 minutes of the 90-minute total time period. Accordingly, the engagement rule set(s) may provide multiple apportionment values, such that the apportionment allocated to the site may change or be adjusted to accommodate the changes to the total requested power level. Further, or alternatively, apportionment values may include or otherwise be accompanied by an amount of time corresponding to a given apportionment value. Stated otherwise, apportionment values may be included in a "quantity" and "timing" pair, with a quantity apportionment value specifying a change in power (e.g., production level or reduction of power consumption), and a timing value specifying a duration or period over which that quantity apportionment value is to be provided. When an aggregation opportunity is not available, engagement rule set(s) may not be available and/or read 503.

The controller may also read or otherwise receive 504 external inputs, such as weather reports (e.g., temperature, solar irradiance, wind speed), changing tariffs, event data (e.g., occupancy prediction, sizeable gathering of people at a location or venue), and the like.

The controller may also read or otherwise receive 506 process variables, which may include measurements of a state of the electrical system and indicate, among other things, how well objectives of the controller are being met. The process variables provide feedback to the controller from the electrical system of the site as part of a feedback loop.

Using the user input, the configuration, any available engagement rule set(s), the external inputs, and/or the process variables, the controller determines 508 new control variables that can be used to improve achievement of objectives of the controller, including meeting the aggregation opportunity. Stated differently, the controller determines 508 new values for each control variable that would effectuate a change to the electrical system toward meeting one or more controller objectives for the electrical system, and the one or more controller objectives may include participation in a maneuver (providing a portion of power in an aggregation opportunity) to respond to the aggregation opportunity. A controller, according to the present disclosure, determines the new control variables with consideration of the user input, such as a site participation preference, as compared to other controllers that are not able to accommodate or consider user provided input.

In the method 500, the new values may be used in simulation (rather than by the actual electrical system) as part of determining the impact or as part of an optimization algorithm. Stated otherwise, the new values determined 508 for each control variable may not be communicated to the electrical system.

If the optimization is continuing, the engagement rule set(s) may have been proposed engagement rule set(s), and an impact may be communicated 509 to the aggregation engine. The impact may be communicated 509 as an impact representation, which may comprise, for example, a participation cost or other mechanism to communicate a cost differential of participation versus non-participation in the aggregation opportunity. The aggregation engine may then provide new or otherwise revised engagement rule set(s) to the site controller and other site controllers being aggregated by the aggregation engine.

An optimization algorithm of the aggregation engine may include repeated polling of the DER, such that the method 500 is executed repeatedly by a site controller of the DER as the aggregation engine seeks to optimize participation of a plurality of DERs (including the instant DER) in an aggregation opportunity.

FIG. 5B is a flow diagram of a method 550 or process of controlling a site, according to one embodiment of the present disclosure. The method 550 is closely similar to the method 500 of FIG. 5A described above, but handles committed apportionment values (e.g., a finalized engagement rule set) to implement participation in an aggregation opportunity. Stated otherwise, the method 550 of FIG. 5B may be executed alternatively to the method 500 of FIG. 5A. The methods 500 and 550 may also be executed as separate processes working in parallel. The site controller may detect whether the engagement rule sets are at a proposal stage or at a final stage and trigger 500 or 550 accordingly (e.g., 500 if at the proposal stage, 550 if at the final stage). The method 550 may be implemented by a controller of an electrical system, such as the controller 410 that is controlling the electrical system 420 of the site 400 of FIG. 4.

The controller may read or otherwise receive 551 user input from the electrical system of the site. The user input may include a site participation preference. The controller may read or otherwise receive 552 a configuration (e.g., a set of configuration elements) of the electrical system of the site. As previously described, the configuration elements may provide information as to the configuration of the electrical system.

The controller may also read or otherwise receive 553 one or more committed engagement rule sets from a remote aggregation engine (e.g., the aggregation engine 402 of FIG. 4). The committed engagement rule sets relate to aggregation opportunity and may indicate a portion of a total requested net change in power of an aggregation request that the site is committed to provide. Stated differently, the portion indicates an amount of site change in power that the aggregation engine can expect the site to provide toward meeting or responding to the aggregation opportunity. The committed engagement rule set may comprise, or otherwise indicate the portion of power by, one or more committed apportionment values. Multiple apportionment values may be included in an engagement rule set in some situations, such as where an amount of site change in power requested changes during a time period. When an aggregation opportunity is not available, engagement rule set(s) may not be available and/or received 553.

The controller may also read or otherwise receive 554 external inputs, such as weather reports (e.g., temperature, solar irradiance, wind speed), changing tariffs, event data (e.g., occupancy prediction, sizeable gathering of people at a location or venue), and the like.

The controller may also read or otherwise receive 556 process variables, which may include measurements of a state of the electrical system and indicate, among other things, how well objectives of the controller are being met. The process variables provide feedback to the controller from the electrical system of the site as part of a feedback loop.

Using user input, the configuration, any available committed engagement rule set(s), the external inputs, and/or the process variables, the controller determines 558 new control variables to improve achievement of objectives of the controller, including meeting the aggregation opportunity. Stated differently, the controller determines 558 new values for each control variable to effectuate a change to the electrical system toward meeting one or more controller objectives for the electrical system, and the one or more controller objectives may include participation in a maneuver (providing a portion of power in an aggregation opportunity) to respond to the aggregation opportunity. A controller, according to the present disclosure, determines the new control variables with consideration of the user input, such as a site participation preference, as compared to other controllers that are not able to accommodate or consider user provided input.

The new values determined 558 for each control variable are transmitted 560 or otherwise communicated to the electrical system. The control variables may be transmitted 560 as part of implementing site participation in a maneuver to respond to an aggregation response request. The transmission 560 of the control variables to the electrical system allows the electrical system to process the control variables to adjust and change states, thereby effectuating the objective(s) of the controller for the electrical system.

Optimization

In some embodiments, a site controller of a site uses an algorithm (e.g., an optimization algorithm) to determine (e.g., determine 508, 558 of FIGS. 5A and 5B) control variables, for example, to improve performance of the electrical system of the site. Optimization can be a process of finding a variable or variables at which a function f(x) is minimized or maximized. In some embodiments, a controller objective is to minimize cost, and accordingly the optimization algorithm minimizes a cost function to achieve the objective. (Examples of simple cost functions are provided below in reference to FIG. 10.)

An optimization may be made with reference to such global extrema (e.g., global maximums and/or minimums). Given that an algorithm that finds a minimum of a function can generally also find a maximum of the same function by negating it, the present disclosure may sometimes use the terms "minimization," "maximization," and "optimization," interchangeably.

An objective of optimization by a site controller of an electrical system of a DER may be economic optimization, or determining economically optimal control variables to effectuate one or more changes to the electrical system to achieve economic efficiency (e.g., to operate the electrical system at as low a cost as may be possible, given the circumstances). A more complex objective of optimization may be economic optimization while also providing a requested portion of a requested net change in power level production of an aggregation opportunity. In some embodiments, an apportionment value may be an input to and/or a consideration of the optimization, such that economic optimization is aspired to with a constraint of providing the requested site change in power of an aggregation opportunity. As can be appreciated, other objectives may be possible as well (e.g., prolonging equipment life, system reliability, system availability, fuel consumption, etc.).

The present disclosure includes embodiments of site controllers of sites that optimize a single parameterized cost function (or objective function) for effectively utilizing controllable components of an electrical system of the site in an economically optimized manner. In certain embodiments and/or scenarios, the cost function may include or otherwise account for an apportionment value or other request to provide a portion of a total requested net change in power of an aggregation opportunity. Various forms of optimization may be utilized to economically optimize an electrical system of a site.

Continuous Optimization

A site controller of a DER, according to some embodiments of the present disclosure, may use continuous optimization to determine the control variables. More specifically, the site controller may utilize a continuous optimization algorithm, for example, to find economically optimal control variables to effectuate one or more changes to the electrical system of the site to achieve economic efficiency (e.g., to operate the electrical system at as low a cost as may be possible, given the circumstances). The controller, in one embodiment, may operate on a single objective: optimize overall system economics. Since this approach has only one objective, there can be no conflict between objectives. And by specifying system economics appropriately in a cost function (or objective function), all objectives and value streams can be considered simultaneously based on their relative impact on a single value metric. The cost function may include or otherwise account for an apportionment value or other request to provide a portion of a total requested power level production of an aggregation opportunity. The cost function may be continuous in its independent variables x, and optimization can be executed with a continuous optimization algorithm that is effective for continuous functions. Continuous optimization differs from discrete optimization, which involves finding the optimum value from a finite set of possible values or from a finite set of functions.

As can be appreciated, in another embodiment, the cost function may be discontinuous in x (e.g., discrete or finite) or piecewise continuous in x, and optimization can be executed with an optimization algorithm that is effective for discontinuous or piecewise continuous functions.

Constrained Optimization

In some embodiments, the site controller of an electrical system of a site utilizes a constrained optimization to determine the control variables. In certain embodiments, the controller may utilize a constrained continuous optimization to find a variable or set of variables $x_{opt}$ at which a continuous function $f(x)$ is minimized or maximized subject to constraints on the allowable x. Possible constraints may be an equation or inequality. An apportionment value may impose a possible constraint.

As an example, consider:

$$f(x)=100(x_2-x_1^2)^2+(1-x_1)^2.$$

The set x includes the independent variables $x_1$, $x_2$. Constraints may be defined by:

$$x_2^2+x_1^2 \leq 1.$$

A curve of ln (1+f(x)) vs. $x_1$ and $x_2$ would reflect the constraint within an outlined unit disk and a minimum at (0.7864, 0.6177).

Constrained continuous optimization algorithms are useful in many areas of science and engineering to find a "best" or "optimal" set of values that affect a governing of a process. They are particularly useful in cases where a single metric is to be optimized, but the relationship between that metric and the independent (x) variables is so complex that a "best" set of x values cannot easily be found symbolically in closed form. For example, consider a malignant tumor whose growth rate over time is dependent upon pH and on the concentration of a particular drug during various phases of growth. The equation describing growth rate as a function of the pH and drug concentration is known and can be written down but may be complex and nonlinear. It might be very difficult or impossible to solve the equation in closed form for the best pH and drug concentration at various stages of growth. It may also depend on external factors such as temperature. To solve this problem, pH and drug concentration at each stage of growth can be combined into an x vector with two elements. Since the drug concentration and pH may have practical limits, constraints on x can be defined. Then the function can be minimized using constrained continuous optimization. The resulting x, where the growth rate is minimized, contains the "best" pH and drug concentration to minimize growth rate. Notably, this approach can find an optimum pH and drug concentration (to machine precision; i.e. within a threshold) from a continuum of infinite possibilities of pH and drug concentration, not just from a predefined finite set of possibilities.

Generalized Optimization

A site controller according to some embodiments of the present disclosure may use generalized optimization to determine the control variables. More specifically, the controller may utilize a generalized optimization algorithm, for example, to find economically optimal control variables to effectuate one or more changes to the electrical system to achieve economic efficiency (e.g., to operate the electrical system at as low a cost as may be possible, given the circumstances).

An algorithm that can perform optimization for an arbitrary or general real function f(x) of any form may be called a generalized optimization algorithm. An algorithm that can perform optimization for a general continuous real function f(x) of a wide range of possible forms may be called a generalized continuous optimization algorithm. Some generalized optimization algorithms may be able to find optimums for functions that may not be continuous everywhere, or may not be differentiable everywhere. Some generalized optimization algorithm may also account for constraints, and therefore be a generalized constrained optimization algorithm.

Nonlinear Optimization

A controller according to some embodiments of the present disclosure may use nonlinear optimization to determine the control variables. More specifically, the controller may utilize a nonlinear optimization algorithm, for example, to find economically optimal control variables to effectuate one or more changes to the electrical system to achieve economic efficiency (e.g., to operate the electrical system at as low a cost as may be possible, given the circumstances). Nonlinear continuous optimization or nonlinear programming is similar to generalized continuous optimization and describes methods for optimizing continuous functions that may be nonlinear, or where the constraints may be nonlinear.

Multi-Variable Optimization

A controller according to some embodiments of the present disclosure may use multi-variable optimization to determine the control variables. More specifically, the controller may utilize a multivariable optimization algorithm, for example, to find economically optimal control variables to effectuate one or more changes to the electrical system to achieve economic efficiency (e.g., to operate the electrical system at as low a cost as may be possible, given the circumstances, including an apportionment value to designate a portion of a net change in power requested by the aggregation opportunity).

Again, consider the equation $$f(x)=100(x_2-x_1^2)^2+(1-x_1)^2,$$

which is a multi-variable equation. In other words, x is a set comprised of more than one element. Therefore, the optimization algorithm is "multivariable." A subclass of optimization algorithms is the multivariable optimization algorithm that can find the minimum of $f(x)$ when x has more than one element. Thus, a generalized constrained continuous multi-variable optimization may be an approach, according to some embodiments.

Economically Optimizing Electrical System Controller

A site controller of an electrical system of a site, according to one embodiment of the present disclosure, is now described to provide an example of using optimization to control an electrical system of a site. An objective of using optimization may be to minimize the total electrical system operating cost during a period of time, taking into account providing a site change in power according to an apportionment value indicating a portion of a net change in power requested by an aggregation opportunity.

For example, the approach of the site controller may be to minimize the operating cost during an upcoming time domain, or future time domain, which may extend from the present time by some number of hours (e.g., integer numbers of hours, fractions of hours, or combinations thereof). As another example, the upcoming time domain, or future time domain, may extend from a future time by some number of hours. Costs included in the total electrical system operating cost may include electricity supply charges, electricity demand charges, a battery degradation cost, equipment degradation cost, efficiency losses, etc. Benefits, such as incentive payments, which may reduce the electrical system operating cost, may be incorporated (e.g., as negative numbers or values) or otherwise considered. Other costs may be associated with a change in energy in the ESS such that adding energy between the beginning and the end of the future time domain is valued. Other costs may be related to reserve energy in an ESS such as for backup power purposes. Other costs may arise according to any engagement rule set(s), which may be handled as imposing a constraint of providing a site change in power that is a portion of a total net change in power requested by the aggregation opportunity. For example, costs or penalties related to not providing a net change in power may be incorporated. In some embodiments, some fraction of the upshot may be incorporated. All of the costs and benefits can be summed into a net cost function, which may be referred to as simply the "cost function."

In certain embodiments, a control parameter set X can be defined (in conjunction with a control law) that is to be applied to the electrical system, how they should behave, and at what times in the future time domain they should be applied. In some embodiments, the cost function can be evaluated by performing a simulation of electrical system operation with a provided set X of control parameters. The control laws specify how to use X and the process variables to determine the control variables. The cost function can then be prepared or otherwise developed to consider the control parameter set X.

For example, a cost $f_c(X)$ may consider the control parameter values in X and return the scalar net cost of operating the electrical system with those control parameter values. All or part of the control parameter set X can be treated as a variable set $X_x$ (e.g., x as described above) in an optimization problem. The remaining part of X, $X_{logic}$, may be determined by other means such as logic (for example, logic based on constraints, inputs, other control parameters, mathematical formulas, etc.). Any constraints involving $X_x$ can be defined, if so desired. Then, an optimization algorithm can be executed to solve for the optimal X. We can denote $X_{opt}$ as the combined $X_x$ and $X_{logic}$ values that minimize the cost function subject to the constraints, if any. Since $X_{opt}$ represents the control parameters, this example process fully specifies the control that will provide minimum cost (e.g., optimal) operation during the future time domain. Furthermore, to the limits of computing capability, this optimization can consider the continuous domain of possible $X_x$ values, not just a finite set of discrete possibilities. This example method continuously can "tune" possible control sets until an optimal set is found. We may refer to these certain example embodiments of a controller as an economically optimizing electrical system controller (EOESC).

Some of the many advantages of using an EOESC, according to certain embodiments, compared to other electrical system controllers are significant:

1) Any number of value streams may be represented in the cost function, giving the EOESC an ability to optimize on all possible value streams and costs simultaneously. As an example, generalized continuous optimization can be used to effectively determine the best control given both ToU supply charge reduction and demand charge reduction simultaneously, all while still considering battery degradation cost.

2) With a sufficiently robust optimization algorithm, only the cost function, control law, and control parameter definitions need be developed. Once these three components are developed, they can be relatively easily maintained and expanded upon.

3) An EOESC can yield a true economically optimum control solution to machine or processor precision limited only by the cost function, control laws, and control parameter definitions.

4) An EOESC may yield not only a control to be applied at the present time, but also the planned sequence of future controls. This means one execution of an EOESC can generate a lasting set of controls that can be used into the future rather than a single control to be applied at the present. This can be useful in case a) the optimization algorithm takes a significant amount of time to execute, or b) there is a communication interruption between the processor calculating the control parameter values and the processor interpreting the control parameters and sending control variables to the electrical system.

Figure 6:
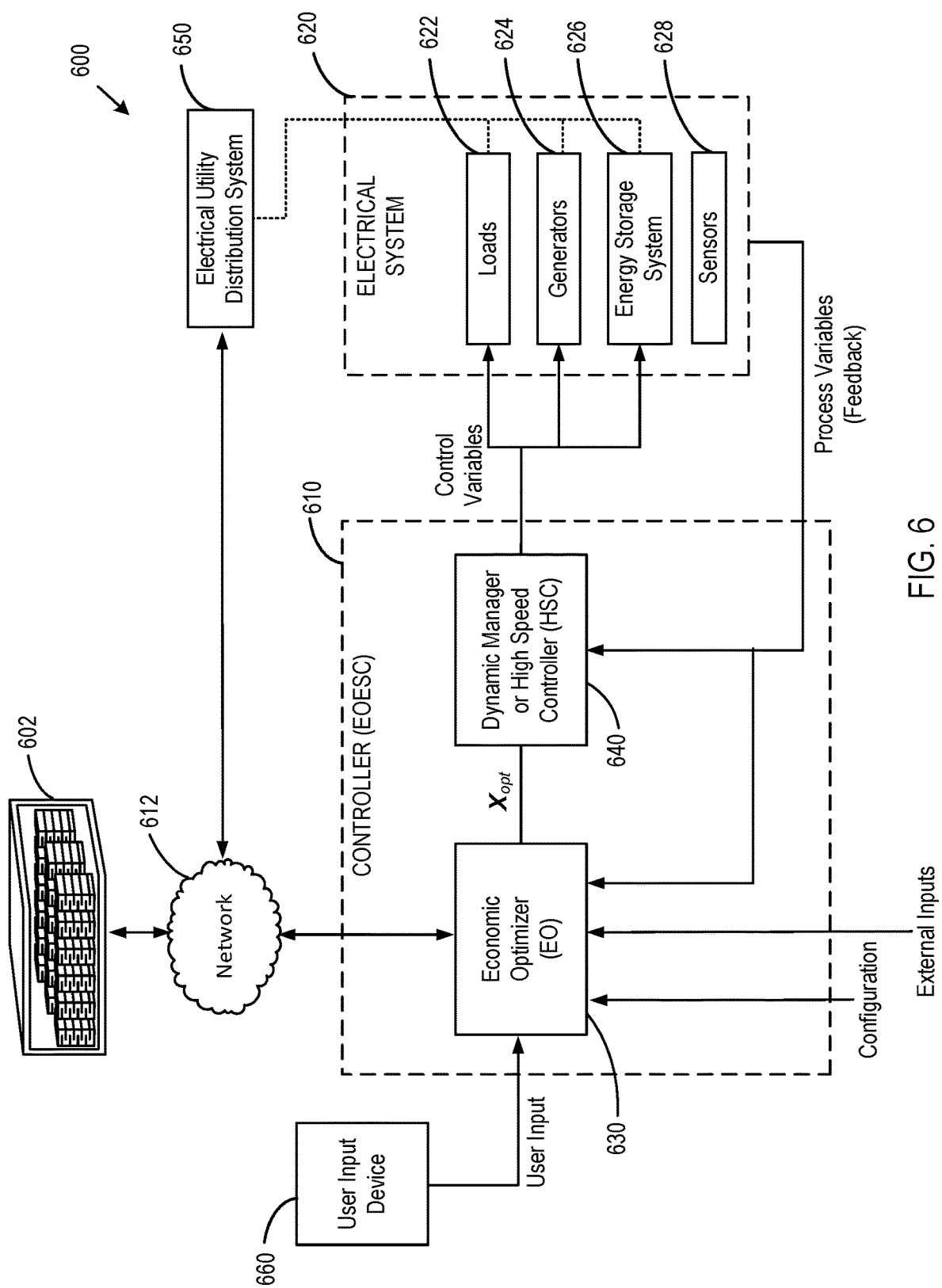
FIG. 6 is a block diagram illustrating a system architecture of a DER, according to another embodiment of the present disclosure.

FIG. 6 is a control diagram illustrating a system architecture of a site 600, according to one embodiment of the present disclosure. The site 600 includes an EOESC 610. The site 600 comprises an electrical system 620 that is controlled by the EOESC 610. The electrical system 620 of the site 600 can include any of one or more loads 622, one or more generators 624, an energy storage system (ESS) 626, and one or more sensors 628 (e.g., meters) to provide measurements or other indication(s) of a state of the electrical system 620 of the DER 600. The electrical system 620 of the site 600 is coupled to an electrical utility distribution system 650, and therefore may be considered on-grid. A user input device 660 is included to enable user input to be provided to the EOESC. Similar diagrams can be drawn for other applications, such as a photovoltaic generator plant and an off-grid building.

An aggregation engine 602 interconnects with the EOESC 610 and the electrical utility distribution system 650. Through this interconnection, the aggregation engine 602 can receive aggregation opportunities from the electrical utility distribution system 650 and can communicate with the EOESC 610 of the DER 600 to coordinate an aggregation maneuver (for responding to an aggregation opportunity). The aggregation engine 602 may provide apportionment values as inputs to the EOESC 610.

The EOESC 610 receives or otherwise obtains user input, a configuration of the electrical system 620, external inputs, engagement rule sets, apportionment values, and/or process variables, and produces control variables to be sent to the electrical system 620 of the site 600. The control variables are sent to the electrical system 620 to effectuate a change to the electrical system 620 toward meeting a controller objective for economical optimization of the electrical system 620, for example during an upcoming time domain. The EOESC 610 can determine the new control variables with consideration of the user input, as compared to other controllers that are not able to accommodate or consider user provided input. The control variables may effectuate a change to the electrical system 620 to provide a site change in power that corresponds to an apportionment value requested by an aggregation opportunity. The EOESC 610 may include electronic hardware and software to process the inputs to determine values for each of the control variables. The EOESC 610 may include one or more processors and suitable storage media which store programming in the form of executable instructions, which are executed by the processors to implement control processes.

In the embodiment of FIG. 6, the EOESC 610 includes an economic optimizer (EO) 630 and a dynamic manager 640 (or high speed controller (HSC)). The EO 630 according to some embodiments is presumed to have an ability to measure or obtain a current date and time. The EO 630 may determine a set of values for a control parameter set X and provide the set of values and/or the control parameter set X to the HSC 640. The EO 630 uses a generalized optimization algorithm to determine an optimal set of values for the control parameter set $X_{opt}$. The EO 630 determines the optimal control parameter set $X_{opt}$ by optimizing a cost function that includes cost elements and can consider the configuration, external inputs, and user input. The HSC 640 utilizes the set of values for the control parameter set X (e.g., an optimal control parameter set $X_{opt}$) to determine the control variables to communicate to the electrical system 620 of the DER 600. The HSC 640 in some embodiments is also presumed to have an ability to measure or obtain a current date and time. The two-part approach of the EOESC 610—namely the EO 630 determining control parameters and then the HSC 640 determining the control variables—enables generation of a lasting set of controls, or a control solution (or plan) that can be used into the future, rather than a single control to be applied at the present. Preparing a lasting control solution can be useful if the optimization algorithm takes a significant amount of time to execute. Preparing a lasting control solution can also be useful if there is a communication interruption between calculating the control parameter values and the processor interpreting the control parameters and sending control variables to the electrical system 620 of the site 600. The two-part approach of the EOESC 610 also enables the EO 630 to be disposed or positioned at a different location from the HSC 640. In this way, intensive computing operations that optimization may require can be performed by resources with higher processing capability that may be located remote from the electrical system 620 of the site 600. These intensive computing operations may be performed, for example, at a data center or server center (e.g., in the cloud).

In some embodiments, a future time domain begins at the time the EO 630 executes and can extend any amount of time. In certain embodiments, analysis and experimentation suggest that a future time domain extent of 24 to 48 hours generates sufficiently optimal solutions in most cases.

As can be appreciated, the EOESC 610 of FIG. 6 may be arranged and configured differently from the example shown in FIG. 6, in other embodiments. For example, instead of the EO 630 passing the control parameter set $X_{opt}$ (the full set of control parameters found by a generalized optimization algorithm of the EO 630) to the HSC 640, the EO 630 can pass a subset of $X_{opt}$ to the HSC 640. Similarly, the EO 630 can pass $X_{opt}$ and additional control parameters to the HSC 640 that are not contained in $X_{opt}$. Likewise, the EO 630 can pass modified elements of $X_{opt}$ to the HSC 640. In one embodiment, the EO 630 finds a subset $X_x$ of the optimal X but then determines additional control parameters $X_{logic}$, and passes $X_{logic}$ together with $X_x$ to the HSC 640. In other words, in this example, the $X_x$ values are to be determined through an optimization process of the EO 630, and the $X_{logic}$ values can be determined from logic. An objective of the EO 630 is to determine the values for each control parameter whether using optimization and/or logic.

For brevity in this disclosure, keeping in mind embodiments where X consists of independent ($X_x$) parameters and dependent ($X_{logic}$) parameters, when describing optimization of a cost function versus X, what is meant is variation of the independent variables $X_x$ until an optimum (e.g., minimum) cost function value is determined. In this case, the resulting $X_{opt}$ will include the combined optimum $X_x$ parameters and associated $X_{logic}$ parameters.

In one embodiment, the EOESC 610 and one or more of its components are executed as software or firmware (for example, stored on non-transitory media, such as appropriate memory) by one or more processors. For example, the EO 630 may comprise one or more processors to process the inputs and generate the set of values for the control parameter set X. Similarly, the HSC 640 may comprise one or more processors to process the control parameter set X and the process variables and generate the control variables. The processors may be computers, microcontrollers, CPUs, logic devices, or any other digital or analog device that can operate on pre-programmed instructions. If more than one processor is used, they can be connected electrically, wirelessly, or optically to pass signals between one another. In addition, the control variables can be communicated to the electrical system components electrically, wirelessly, or optically or by any other means. The processor has the ability to store or remember values, arrays, and matrices, which can be viewed as multi-dimensional arrays, in some embodiments. This storage may be performed using one or more memory devices, such as read access memory (RAM, disk drives, etc.).

Figure 7A:
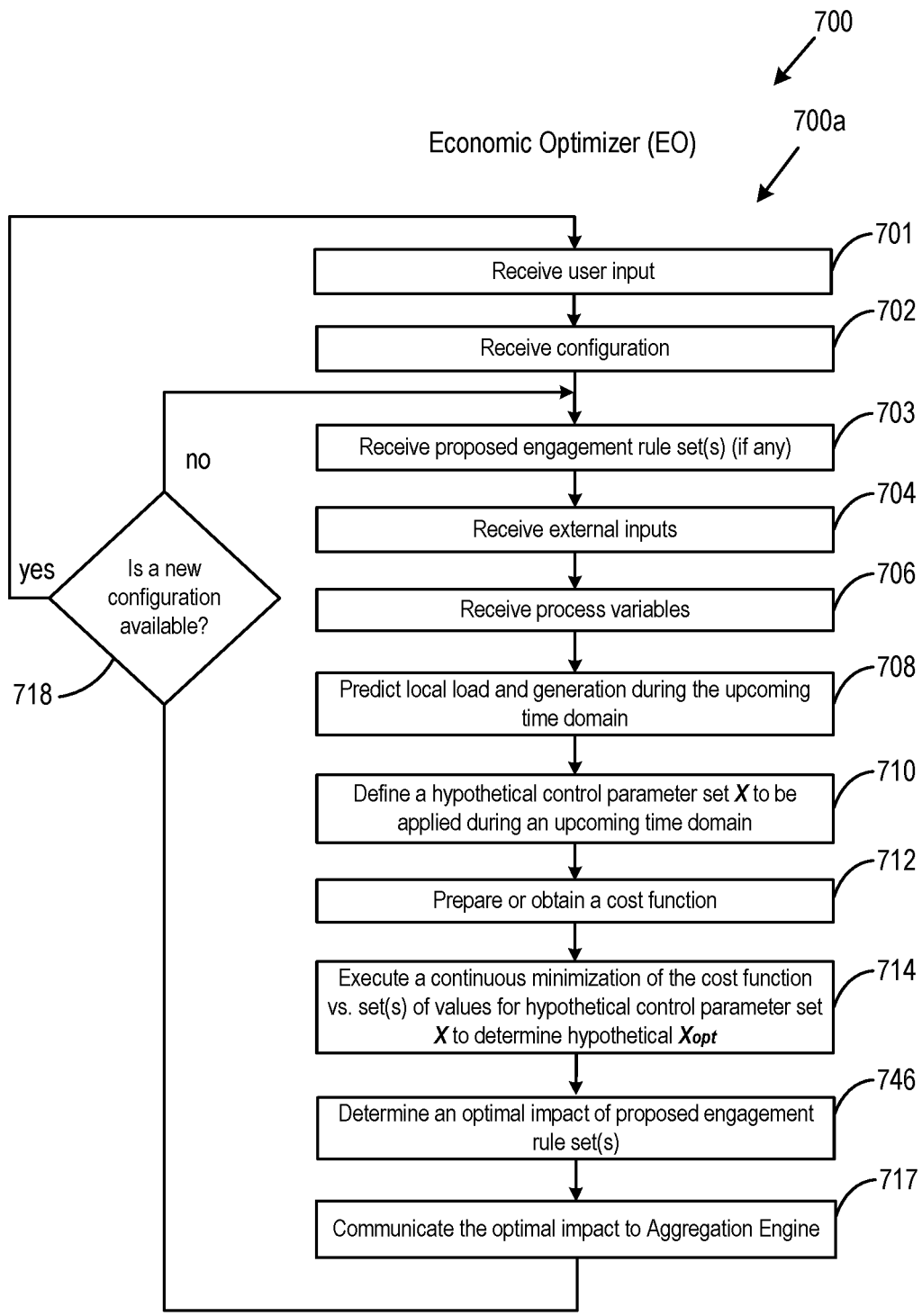
FIGS. 7A-7C are flow diagrams of a method or process of controlling an electrical system (e.g., a site including one or more DERs), according to one embodiment of the present disclosure.
Figure 7B:
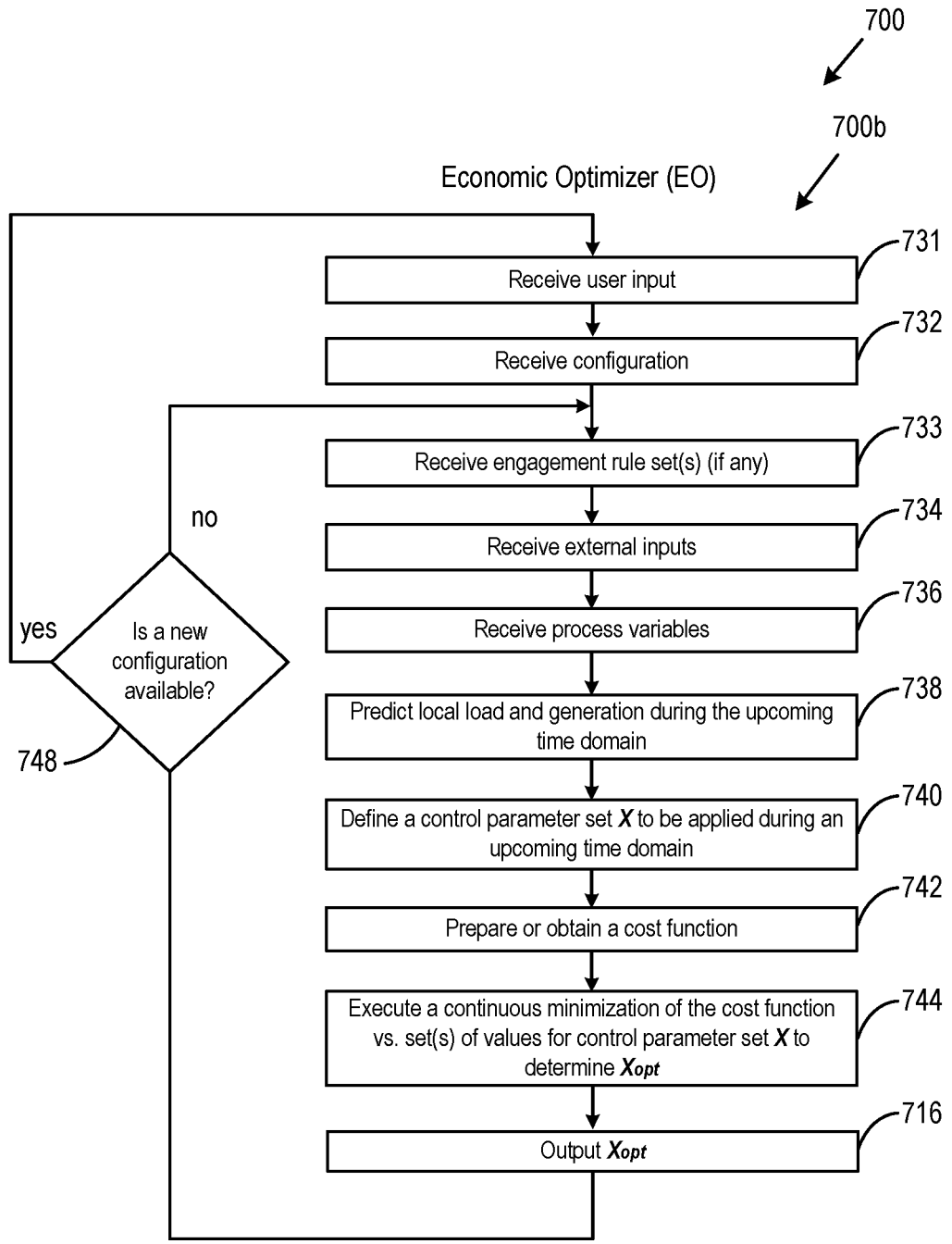
Figure 7C:
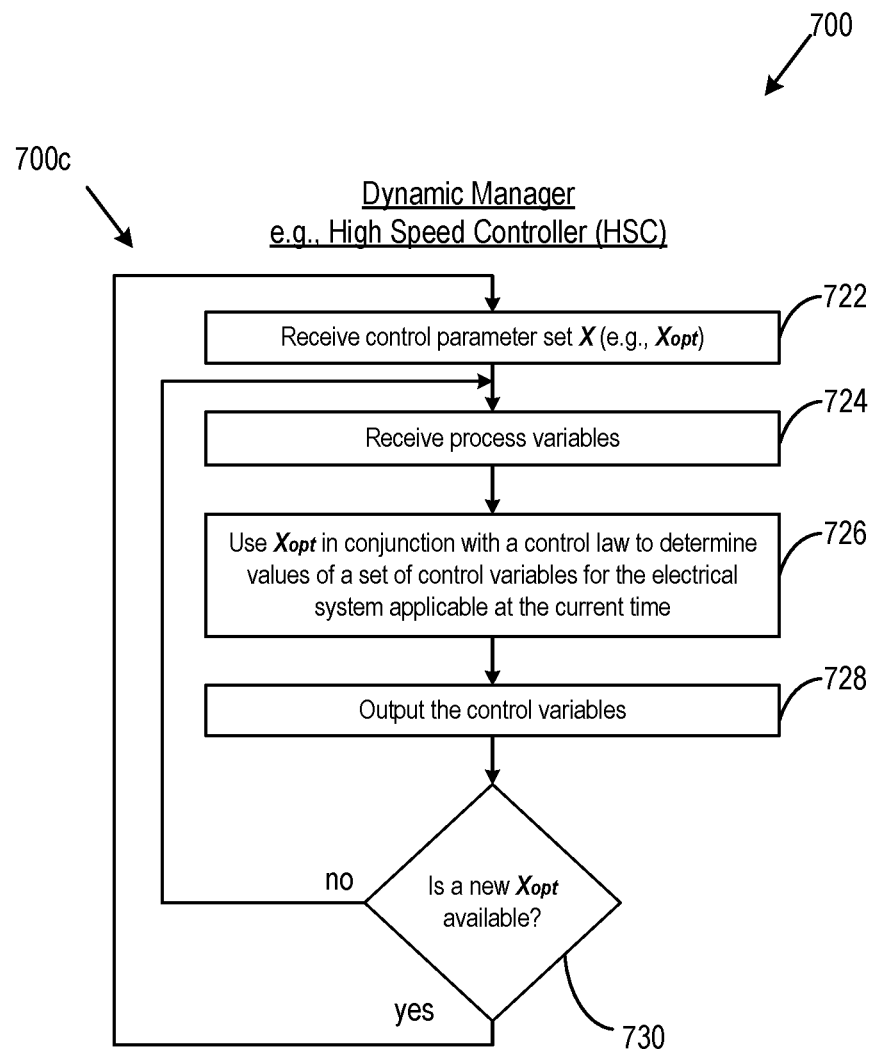

FIGS. 7A-7C are flow diagrams of a method 700 of controlling an electrical system of a site, according to one embodiment of the present disclosure. The method 700 may be implemented by a controller of an electrical system, such as the EOESC 610 of FIG. 6 controlling the electrical system 620 of the site 600 of FIG. 6. The method 700 includes three separate processes, namely an economic optimizer (EO) process 700a for proposed engagement rule sets (FIG. 7A), an EO process 700b for committed engagement rule sets (FIG. 7B), and a high speed controller (HSC) process 700c (FIG. 7C). The HSC process 700c of FIG. 7C may also be referred to herein as a dynamic manager process 700c. The HSC process 700c may utilize a control parameter set X determined by the EO process 700b. Nevertheless, the HSC process 700c may execute separate from, or even independent from, the EO processes 700a, 700b, based on a control parameter set X determined at an earlier time (e.g., by the EO process 700a, 700b). Because the EO processes 700a, 700b can run separate and distinctly from the HSC process 700c, the execution of these processes 700a, 700b, 700c may be co-located on a single system or isolated on remote systems.

The EO processes 700a, 700b may be computer-implemented processes executed by one or more computing devices, such as the EO 630 of FIG. 6. The EO process 700a is used to determine optimal impact of proposed engagement rule sets, and the process 700b is used to optimally implement committed engagement rule sets. Turning to the EO process 700a of FIG. 7A, the EO process 700a includes receiving 701 user input. The user input may be a site participation preference or other indication of availability and/or willingness to participate in a response event. The user input can enable an operator of or user affiliated with a site to provide a quantitative or nonquantitative input the EO can consider in optimizing operation of that site. For example, the user input may include a site participation preference that represents an actual or a figurative downtime cost during a period of time. The site participation preference may be entered as a non-numeric value. For example, the operator may indicate whether power to operate equipment at the site is critical, average, or low. If an operator of a manufacturing facility is attempting to fulfill an order and there is a penalty if the order is not completed that day, the operator may provide user input that full operation of the site is critical for the day. In some embodiments, the user input may indicate desired operability of specific equipment on the site for a period of time. The EO can then consider the user input at one or more points in the EO process 700a.

User input may be input provided by a user to a user input device. The provision of user input by a user may be manual, such as turning a dial, manipulating a graphical user interface, operating a switch or button. The provision of user input may also be by an automated process. For example, building management systems increasingly include greater automation and autonomy as artificial intelligence improves and evolves. A building management system (BMS) can provide sophisticated control of lighting, thermostat settings, audio/video systems, access control, etc. Based on settings and or configuration of a facility by a BMS, user input to the EO may be autogenerated by the BMS or by an independent process monitoring the facility and/or the BMS as configured by an operator of or user of the BMS. That autogenerated user input may be provided to the EO and received 701 by the EO process 700a.

the EO process 700a includes receiving 702 a configuration, or a set of configuration elements, of the electrical system. The configuration may specify one or more constants of the electrical system. The configuration may specify one or more cost elements associated with operation of the electrical system. The cost elements may include one or more of an electricity cost (e.g., an electricity supply charge, an electricity demand charge), a battery degradation cost, an equipment degradation cost, a tariff definition (e.g., an electricity supply tariff providing ToU supply rates and associated time windows, or an electricity demand tariff providing demand rates and associated time windows), a cost of local generation, penalties associated with deviation from an operating plan (e.g., a prescribed operating plan, a contracted operating plan), costs or benefits associated with a change in energy in the ESS such that adding energy between the beginning and the end of the future time domain is valued, costs or benefits (e.g., a payment) for contracted maneuvers, costs or benefits associated with the amount of energy stored in an ESS as a function of time, costs or benefits associated with reducing electrical power consumption of one or more loads, and a value of comfort that may be a function of other process variables such as building temperature.

In certain embodiments, the set of configuration elements define the one or more cost elements by specifying how to calculate an amount for each of the one or more cost elements. For example, the definition of a cost element may include a formula for calculating the cost element.

In certain embodiments, the cost elements specified by the configuration elements may include one or more incentives associated with operation of the electrical system. An incentive may be considered as a negative cost. The one or more incentives may include one or more of an incentive revenue, a demand response revenue, a value of reserve energy or battery capacity (e.g., for backup power as a function of time), a contracted maneuver, revenue for demand response opportunities, revenue for ancillary services, and revenue associated with deviation from an operating plan (e.g., a prescribed operating plan, a contracted operating plan).

In other embodiments, the configuration elements may specify how to calculate an amount for one or more of the cost elements. For example, a formula may be provided that indicates how to calculate a given cost element.

One or more proposed engagement rule sets may also be received 703, such as from an aggregation engine (e.g., the aggregation engine 602 of FIG. 6). A proposed engagement rule set is an engagement rule set that the aggregation engine is merely proposing in order to receive information regarding an impact expected from implementation of the proposed engagement rule set, which enables the aggregation engine to determine whether to commit to an aggregation opportunity and/or how to apportion site changes in power between various sites. The aggregation engine may later provide a committed engagement rule set, which will be implemented, as discussed below with reference to the EO process 700b of FIG. 7B.

The one or more proposed engagement rule sets may be received 703 in connection with an aggregation opportunity promulgated to the remote aggregation engine by a utility or other entity desiring to obtain a net change in power (e.g., additional power or reduction in consumption of power). For example, a utility or other entity may desire to obtain additional power resources or reduction in power consumption and may seek power from an aggregation of power provided or reduced by a plurality of sites. The proposed engagement rule sets may include one or more apportionment values, which may indicate a portion of a total requested power level or reduction of power consumption of an aggregation request, the portion indicating an amount that the aggregation engine can expect the site to provide or reduce toward meeting the aggregation opportunity. When an aggregation opportunity is not available, proposed engagement rule sets may not be available and/or received 703.

In certain embodiments, proposed engagement rule sets and/or apportionment values may be received as part of the configuration. Stated otherwise, in certain embodiments, receiving 702 a configuration may include receiving one or more apportionment values, if any, for participating in a corresponding aggregation opportunity. The EO process 700a could, accordingly, consider the engagement rule sets and/or apportionment values in a similar manner as other configuration elements received 702 as a configuration.

External inputs may also be received 704. The external inputs may provide indication of one or more conditions that are external to the controller and/or the electrical system. For example, the external inputs may provide indication of the temperature, weather conditions (e.g., patterns, forecasts), and the like.

Process variables are received 706. The process variables provide one or more measurements of a current state of the electrical system. The set of process variables can be used to determine progress toward meeting an objective for economical optimization of the electrical system. The process variables may be feedback in a control loop for controlling the electrical system.

The EO process 700a may include predicting 708 a local load and/or generation during an upcoming time domain. The predicted local load and/or local generation may be stored for later consideration. For example, the predicted load and/or generation may be used in a later process of evaluating the cost function during a minimization of the cost function.

A hypothetical control parameter set X may be defined 710 to be applied during an upcoming time domain. In defining the control parameter set X the meaning of each element of X is established. A first aspect in defining 710 the hypothetical control parameter set X may include selecting a control law. Then, for example, X may be defined 710 as a matrix of values such that each column of X represents a set of control parameters for the selected control law to be applied during a particular time segment of the future time domain. In this example, the rows of X represent individual control parameters to be used by the control law. Further to this example, the first row of X can represent the nominal ESS power during a specific time segment of the future time domain. Likewise, X may be further defined 710 such that the second row of X is the maximum demand limit (e.g., a maximum demand setpoint). A second aspect in defining 710 the control parameter set X may include splitting the upcoming time domain into sensible segments and selecting the meaning of the control parameters to use during each segment. The upcoming future time domain may be split into different numbers of segments depending on what events are coming up during the future time domain. For example, if there are no supply charges, and there is only one demand period, the upcoming time domain may be split into a few segments. But if there is a complicated scenario with many changing rates and constraints, the upcoming time domain may be split into many segments. (The engagement rule sets and/or apportionment values may be adjusted, both in number of values and in the magnitude of the values, based on the splitting of the time domain into segments.) Lastly, in defining 710 the control parameters X some control parameters $X_x$ may be marked for determination using optimization, and others $X_{logic}$ may be marked for determination using logic (for example logic based on constraints, inputs, other control parameters, mathematical formulas, etc.).

The EO process 700a may also prepare 712 or obtain a cost function. Preparing 712 the cost function may be optional and can increase execution efficiency by pre-calculating certain values that will be needed each time the cost function is evaluated. The cost function may be prepared 712 (or configured) to include or account for any constraints on the electrical system. In certain embodiments, the constraints may include the one or more apportionment values (if any) that may correspond to an aggregation opportunity. The cost function also includes or otherwise considers the user input received 701, which provides availability and/or willingness of the site to participate in a response event. Stated otherwise, the cost function is configured to account for user input (e.g., a site preference, availability, and/or willingness to participate response events), such that optimization of the cost function produces optimal control variables and/or an optimal control parameter set that considers the user input.

With the hypothetical control parameter set X defined 710 and the cost function prepared 712, the EO process 700a can execute 714 a minimization or optimization of the cost function resulting in the hypothetical optimal control parameter set $X_{opt}$. For example, a continuous optimization algorithm may be used to identify an optimal set of values for the hypothetical control parameter set $X_{opt}$ (e.g., to minimize the cost function) in accordance with the one or more constraints, the one or more cost elements, and any apportionment values. The continuous optimization algorithm may be one of many types. For example, it may be a generalized continuous optimization algorithm. The continuous optimization algorithm may be a multivariable continuous optimization algorithm. The continuous optimization algorithm may be a constrained continuous optimization algorithm. The continuous optimization algorithm may be a Newton-type algorithm. It may be a stochastic-type algorithm such as Covariance Matrix Adaption Evolution Strategy (CMAES). Other algorithms that can be used are BOBYQA (Bound Optimization by Quadratic Approximation) and COBYLA (Constrained Optimization by Linear Approximation).

To execute the optimization of the cost function, the cost function may be evaluated many times. Each time, the evaluation may include performing a simulation of the electrical system operating during the future time domain with a provided control parameter set X and then calculating the cost associated with that resulting simulated operation. The cost function may include or otherwise account for the one or more cost elements received 702 in the configuration. For example, the cost function may be a summation of the one or more cost elements (including any negative costs, such as incentives, revenues, and the like). In this example, the optimization step 714 would find a hypothetical $X_{opt}$ that minimizes the cost function. The cost function may also include or otherwise account for the one or more constraints on the electrical system. The cost function may include or otherwise account for any values associated with the electrical system that may be received 702 in the configuration.

The cost function may also evaluate another economic metric such as payback period, internal rate of return (IRR), return on investment (ROI), net present value (NPV), or carbon emission. In these examples, the function to minimize or maximize would be more appropriately termed an "objective function." In case the objective function represents a value that should be maximized, such as IRR, ROI, or NPV, the optimizer should be set up to maximize the objective function when executing 714, or the objective function could be multiplied by −1 before minimization. Therefore, as can be appreciated, elsewhere in this disclosure, "minimizing" the "cost function" may also be more generally considered for other embodiments as "optimizing" an "objective function."

The continuous optimization algorithm may execute the cost function (e.g., simulate the upcoming time domain) a plurality of times with various hypothetical control parameter sets X to identify an optimal set of values for the hypothetical control parameter set $X_{opt}$ to minimize the cost function. The cost function may include a summation of the one or more cost elements, and evaluating the cost function may include returning a summation of the one or more cost elements incurred during the simulated operation of the control system over the upcoming time domain.

Since the hypothetical control parameter set $X_{opt}$ is optimal to minimize/optimize the cost function, an impact of the proposed engagement rule set(s) is also minimized/optimized. Accordingly, an optimal impact of the proposed engagement rule set(s) may be determined 746 based on the hypothetical control parameter set $X_{opt}$. The optimal impact of operating according to the control parameter set $X_{opt}$ may also be communicated 717 to the aggregation engine. An optimal impact of participating in an aggregation opportunity, in accordance with one or more received 703 engagement rule sets, likely will be different than not participating. For example, the optimized impact may be evaluated as a cost, or a cost differential. The cost may be communicated 717 as a baseline cost (e.g., a cost if not participating in the aggregation opportunity) and a participation cost (e.g., a cost if participating in the aggregation opportunity). Alternatively or in addition, the cost may be communicated 717 as a cost differential, which may be a delta of the cost of not participating versus the cost of participating. The cost is communicated 717 to the aggregation engine such that the aggregation engine can determine an optimal aggregation of sites, and specifically an optimal set of sites to participate in a maneuver and at what proportion of the requested net change in power of the aggregation opportunity each individual participating site will provide a site change in power.

The EO process 700a repeats for a next upcoming time domain (a new upcoming time domain). A determination 718 is made whether a new configuration is available. If yes, then the EO process 700a receives 702 the new configuration. If no, then the EO process 700a may skip receiving 702 the configuration and simply receive 704 the external inputs.

As can be appreciated, in other embodiments an EO process may be configured differently, to perform operations in a differing order, or to perform additional and/or different operations. In certain embodiments, an EO process may determine values for a set of control variables to provide to the electrical system to effectuate a change to the electrical system toward meeting the controller objective for economical optimization of the electrical system during an upcoming time domain, rather than determining values for a set of control parameters to be communicated to a HSC process. The EO process may provide the control variables directly to the electrical system, or to an HSC process for timely communication to the electrical system at, before, or during the upcoming time domain.

As previously discussed, the EO process 700b of FIG. 7B is used to optimally implement committed engagement rule sets. The EO process 700b may operate at the same time or at different times as the EO process 700a. Also, separate portions of a controller or the same portions of the controller may be used to implement EO processes 700a and 700b.

Turning now to the EO process 700b of FIG. 7B, the EO process 700a includes receiving 731 user input. The user input may be a site participation preference or other indication of availability and/or willingness to participate in a response event. The user input can enable an operator of, or user affiliated with, a site to provide a quantitative or nonquantitative input the EO can consider in optimizing operation of that site. The EO process 700a and the EO process 700b may operate sufficiently close in time that the user input received 731 by the EO process 700b for committed engagement rule sets may be the same as the user input received 701 by the EO process 700a for proposed engagement rule sets. However, the user input received 731 may also be similar to or even different from user input previously received 701, because of a change in user input provided via a user input device.

The EO process 700b includes receiving 732 a configuration, or a set of configuration elements, of the electrical system. The configuration or set of configuration elements may be similar to those discussed above with reference to operation 702 of FIG. 7A.

One or more committed engagement rule sets may also be received 703, such as from an aggregation engine (e.g., the aggregation engine 602 of FIG. 6). A committed engagement rule set is an engagement rule set that the aggregation engine is assigning the site to execute. The aggregation engine may use impact representations from various sites to determine that the committed engagement rule sets are optimal. In other words, the aggregation engine optimally apportions committed engagement rule sets based on the impact representations to participate in an aggregation opportunity.

Similar to the proposed engagement rule sets and/or apportionment values, the committed engagement rule sets may be received as part of the configuration. Stated otherwise, in certain embodiments, receiving 732 a configuration may include receiving one or more apportionment values, if any, for participating in a corresponding aggregation opportunity. The EO process 700b could, accordingly, consider the committed engagement rule sets and/or apportionment values in a similar manner as other configuration elements received 732 as a configuration.

External inputs may also be received 734. The external inputs may provide indication of one or more conditions that are external to the controller and/or the electrical system. For example, the external inputs may provide indication of the temperature, weather conditions (e.g., patterns, forecasts), and the like.

Process variables are received 736. The process variables provide one or more measurements of a current state of the electrical system. The set of process variables can be used to determine progress toward meeting an objective for economical optimization of the electrical system. The process variables may be feedback in a control loop for controlling the electrical system.

The EO process 700b may include predicting 738 a local load and/or generation during an upcoming time domain. The predicted local load and/or local generation may be stored for later consideration. For example, the predicted load and/or generation may be used in a later process of evaluating the cost function during a minimization of the cost function.

A control parameter set X may be defined 740 to be applied during an upcoming time domain. The control parameter set X may be define similarly to the hypothetical control parameter set X (discussed above with reference to operation 710 of FIG. 7A).

The EO process 700b may also prepare 742 or obtain a cost function. Preparing 742 the cost function may be optional and can increase execution efficiency by pre-calculating certain values that will be needed each time the cost function is evaluated. The cost function may be prepared 742 (or configured) to include or account for any constraints on the electrical system. In certain embodiments, the constraints may include the one or more apportionment values (if any) that may correspond to an aggregation opportunity.

With the control parameter set X defined 740 and the cost function prepared 742, the EO process 700b can execute 744 a minimization or optimization of the cost function resulting in the optimal control parameter set $X_{opt}$. The executing 744 of the minimization or optimization of the cost function may be performed in a similar manner to that discussed above with reference to operation 714 of FIG. 7A.

The optimal control parameter set $X_{opt}$ is then output 716. In some embodiments, the output 716 of the optimal control parameter set $X_{opt}$ may be stored locally, such as to memory, storage, circuitry, and/or a processor disposed local to the EO process 700a. In some embodiments, the outputting 716 may include transmission of the optimal control parameter set $X_{opt}$ over a communication network to a remote computing device, such as the HSC 640 of FIG. 6. For example, if the engagement rule set received 703 previously is a committed engagement rule set, then the optimal control parameter set $X_{opt}$ may be transmitted to the HSC process 700b.

The HSC process 700c may be a computer-implemented process executed by one or more computing devices, such as the HSC 640 of FIG. 6. The HSC process 700c may receive 722 a control parameter set X such as the optimal control parameter set $X_{opt}$ output 716 by the EO process 700b. Process variables are also received 724 from the electrical system. The process variables include information, or feedback, about a current state or status of the electrical system and/or one or more components therein.

The HSC process 700c determines 726 values for a set of control variables for controlling one or more components of the electrical system at the current time. The HSC process 700c determines 726 the values for the control variables by using the optimal control parameter set $X_{opt}$ in conjunction with a control law. The control laws specify how to determine the control variables from X (or $X_{opt}$) and the process variables. Stated another way, the control law enforces the definition of X. For example, for a control parameter set X defined such that a particular element, X, is an upper bound on demand to be applied at the present time, the control law may compare process variables such as the unadjusted demand to X. If unadjusted building demand exceeds X, the control law may respond with a command (in the form of a control variable) to instruct the ESS to discharge at a rate that will make the adjusted demand equal to or less than X.

The control variables (including any newly determined values) are then output 728 from the HSC process 700c. The control variables are communicated to the electrical system and/or one or more components therein. Outputting 728 the control variables may include timely delivery of the control variables to the electrical system at, before, or during the upcoming time domain and/or applicable time segment thereof. The timely delivery of the control variables may include an objective to effectuate a desired change or adjustment to the electrical system during the upcoming time domain.

A determination 730 is then made whether a new control parameter set X (and/or values thereof), such as a new optimal control parameter set $X_{opt}$, is available. If yes, then the new control parameter set X (or simply the values thereof) is received 722 and HSC process 700c repeats. If no, then the HSC process 700c repeats without receiving 722 a new control parameter set X such as a new optimal control parameter set $X_{opt}$.

As can be appreciated, in other embodiments an HSC process may be configured differently, to perform operations in a differing order, or to perform additional and/or different operations. For example, in certain embodiments, an HSC process may simply receive values for the set of control variables and coordinate timely delivery of appropriate control variables to effectuate a change to the electrical system at a corresponding time segment of the upcoming time domain.

The example embodiment of a controller 610 in FIG. 6 and an embodiment of a control method 700 in FIGS. 7A-7C illustrate a two-piece or staged controller, which splits a control problem into two pieces (e.g., a low speed optimizer and a high speed dynamic manager (or high speed controller (HSC)). The two stages or pieces of the controller, namely an optimizer and a dynamic manager, are described more fully in the sections below. Nevertheless, as can be appreciated, in certain embodiments a single-stage approach to a control problem may be utilized to determine optimal control values to command an electrical system.

Economic Optimizer (EO)

Greater detail will now be provided about some elements of an EO, according to some embodiments of the present disclosure.

Predicting a Load/Generation of an Upcoming Time Domain

In many electrical system control applications, a load of the electrical system (e.g., a building load) changes over time. Load can be measured as power or as energy change over some specified time period, and is often measured in units of kW. As noted above with reference to FIG. 7, an EO process 700a may predict 708 a local load and/or generation during an upcoming time domain.

Figure 8:
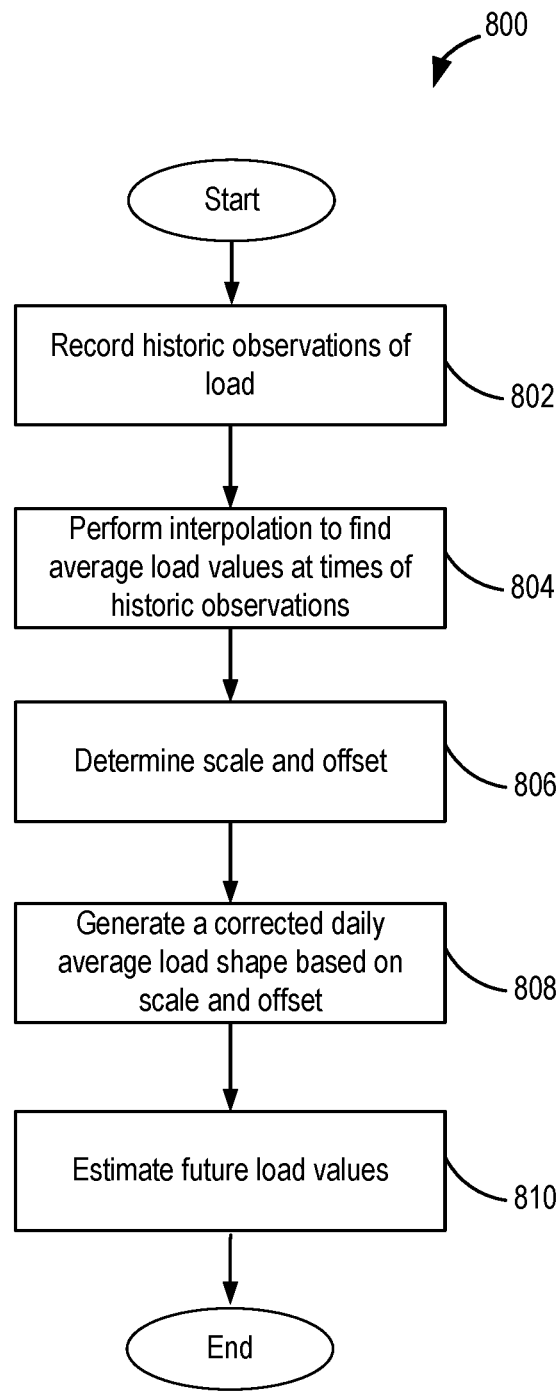
FIG. 8 is a flow diagram of a method of predicting load and/or generation of an electrical system during an upcoming time domain, according to one embodiment of the present disclosure.

FIG. 8 is a flow diagram of a method 800 of predicting load and/or generation of an electrical system during an upcoming time domain. A controller, according to some embodiments of the present disclosure, may have the ability to predict the changing load that may be realized during an upcoming time domain. These load and generation predictions may be used when the cost function is evaluated. To account for and reap a benefit from some types of value streams such as demand charge reduction, an accurate estimate of the upcoming load can be important. An accurate projection of a load during an upcoming time domain enables an EO to make better control decisions to capitalize on value streams such as demand charge reduction.

A method of predicting load, according to one embodiment of the present disclosure, may perform a load prediction considering historic periodic trends or shapes such as a daily trend or shape. The load prediction can execute every time an EO executes an EO process, or it can execute more or less frequently. The load prediction may be executed by performing a regression of a parameterized historic load shape against historic load data (typically less than or equal to 24 hours) in one embodiment. Regression algorithms such as least squares may be used. A compilation of historic trends may be recorded as a historic average (or typical) profile or an average load shape. The historic average profile or average load shape may be a daily (24-hour) historic average profile that represents a typical day. The compilation of historic observations and/or historic average profile may be received from another system, or may be gathered and compiled (or learned) as part of the method of predicting load, as will be explained below with reference to FIG. 8.

Referring to FIG. 8, historic observations of load are recorded 802.

An interpolation is performed 804 to find the avg_load_shape values at each of the times in historic_load_observed_time_of_day. In some embodiments, the interpolation is a linear interpolation. In other embodiments, the interpolation is a nonlinear interpolation.

A scale and offset are determined 806.

A corrected daily average load shape is generated 808 based on the scale and/or offset. The future load values can then be estimated 810, such as by interpolating. A future load value at any time of day in the future time domain can now be estimated by interpolating 810 to that time of day from the pair of arrays avg_load_shape_fit and avg_load_shape_time_of_day.

Define the Control Parameter Set X

Defining the Control Parameter Set X involves defining or otherwise specifying times at which each control parameter is to be applied during a future time domain, and the control law(s) that are to be applied at each time in the future time domain.

An EO, according to certain embodiments of the present disclosure, is configured to define the control parameter set X. While there are many ways to define a control parameter set X, three possible approaches are:

1. a single set of parameters of a control law to be applied during the entire upcoming time domain;

2. a sequence of parameter sets that are each to be applied to a single control law at different contiguous sequential time intervals throughout the upcoming time domain; and 3. a sequence of parameters that specifies different control laws to be applied at different contiguous sequential time intervals throughout the future time domain.

An example of Approach 1 above of a single set of parameters of the control parameter set X (and example values) for a four-parameter control law is shown in Table 2 below.

TABLE 2

| Parameter | Description | Example Value |
| --- | --- | --- |
| $P_{nom}$ | Nominal ESS power (or discharge power if negative) to be applied in the absence of other constraints or rules (such as those related to UB, $UB_0$, or LB below). | −40 W |
| UB | Upper bound on adjusted demand (e.g., an upper setpoint). Not to be exceeded unless the ESS is incapable of discharging at sufficient power. | 100 kW |
| $UB_0$ | Upper bound on electrical system adjusted demand (e.g., an upper setpoint) not to be actively exceeded (e.g., electrical system adjusted demand may exceed this value only with ESS power less than or equal to 0). | 80 kW |
| LB | Lower bound on adjusted net power (e.g., a lower setpoint). Sometimes referred to as "minimum import," or, if 0, "zero export." Adjusted net power will be kept above this value unless the ESS is incapable of charging at sufficient power and generators cannot be throttled sufficiently. | 0 kW |

Approaches 2 and 3 above utilize segmentation of the future time domain.

Figure 9:
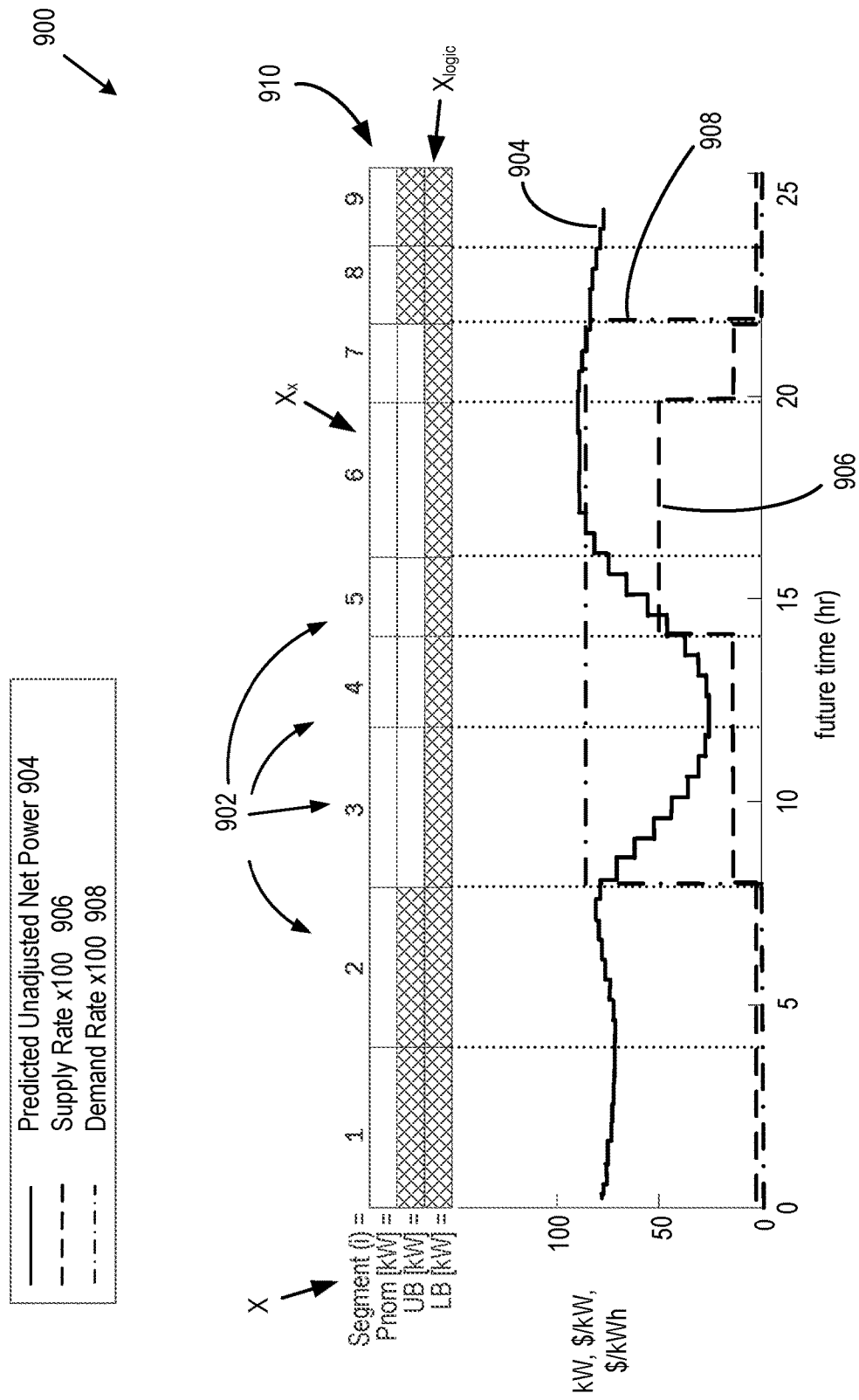
FIG. 9 is a graph illustrating one example of segmenting an upcoming time domain into multiple time segments.

FIG. 9 is a graph 900 illustrating one example of segmenting an upcoming time domain into a plurality of time segments 902. A plot 904 of predicted unadjusted net power (kW) versus future time (e.g., of an upcoming time domain) is provided. A plot 906 of energy supply rate ($/kWh) versus future time is also provided. A plot 908 of a demand rate ($/kW) versus future time is also provided. A 25-hour future time domain is segmented into nine discrete sequential time segments 902 (e.g., i=1, 2, 3, 4, 5, 6, 8, 8, 9). Each segment 902 will be assigned a single set of one or more parameters from the control parameter set X to be applied during that time segment.

Segmentation of the future time domain can be done in many ways. In one embodiment, segmentation is performed such that:

i. the electric rates (both supply and demand) are constant within each time segment, ii. the number of segments is minimized but large enough to provide a different segment for each region of the future time domain that is expected to have significantly different operating behavior or conditions, and iii. the segment length does not exceed a prescribed maximum segment length.

In cases where rates are changing very frequently (every hour for example), some minimum time segment length can be specified (every four hours for example) to reduce the number of time segments while still maintaining acceptable computational fidelity. Likewise, a maximum segment length (for example six hours) may also be prescribed to increase computational fidelity.

Smaller numbers of segments are less burdensome on the EO processor computationally, while large numbers of segments provide higher fidelity in the final optimized solution. A desirable segment length of between 0.5 and 6 hours in some embodiments has been found to provide a good balance between these criteria.

The time segments of the upcoming time domain may be defined such that one or more of supply rate cost elements and delivery rate cost elements are constant during each time segment. The time segments of the upcoming time domain may be defined such that one or more of contracted maneuvers, demand response maneuvers, and ancillary service maneuvers are continuous during each time segment.

FIG. 9 also illustrates a representation 910 of an example of control parameter set X that includes multiple sets of parameters. The control parameter set X is for a three-parameter control law, which may be defined similar to the set illustrated above in Table 2, but without $UB_0$. The values for the parameters are not initialized, but the cells of the table X in FIG. 9 represent a parameter for which a value may be associated. In this example, the un-shaded values ($X_x$) are to be determined through an optimization process of the EO and the shaded values ($X_{logic}$) can be determined from logic. An objective of the EO is to fill in the values for each control parameter that minimizes the cost of operating the electrical system of the site during the future time domain. As can be appreciated, different values may for control parameters may result depending on whether the site is participating in providing a portion of a requested net change in power of an aggregation opportunity.

In some instances, it may make sense for an EO (or an EOESC) to operate with a single control parameter (e.g., a single set with a single element in X such as $P_{nom}$) or with multiple control parameters (a single set of multiple elements in X, such as $P_{nom}$, UB, and LB) to be applied during the entire future time domain. In these two cases, the future time domain would be segmented into only one time segment 902. Correspondingly, the EO would only consider control parameters that are constant over the whole future time domain in this example.

Prepare the Cost Function

An EO, according to certain embodiments of the present disclosure, prepares or otherwise obtains a cost function. As already mentioned, the cost function $f_c(X)$ is a function that considers particular control parameters (e.g., control parameter set X) and returns the scalar net cost of operating the electrical system with X during the future time domain. This scalar net cost of operating the electrical system can be provided to an aggregation engine for optimization of apportionment among multiple sites for generation of a requested net change in power of an aggregation opportunity.

Figure 10:
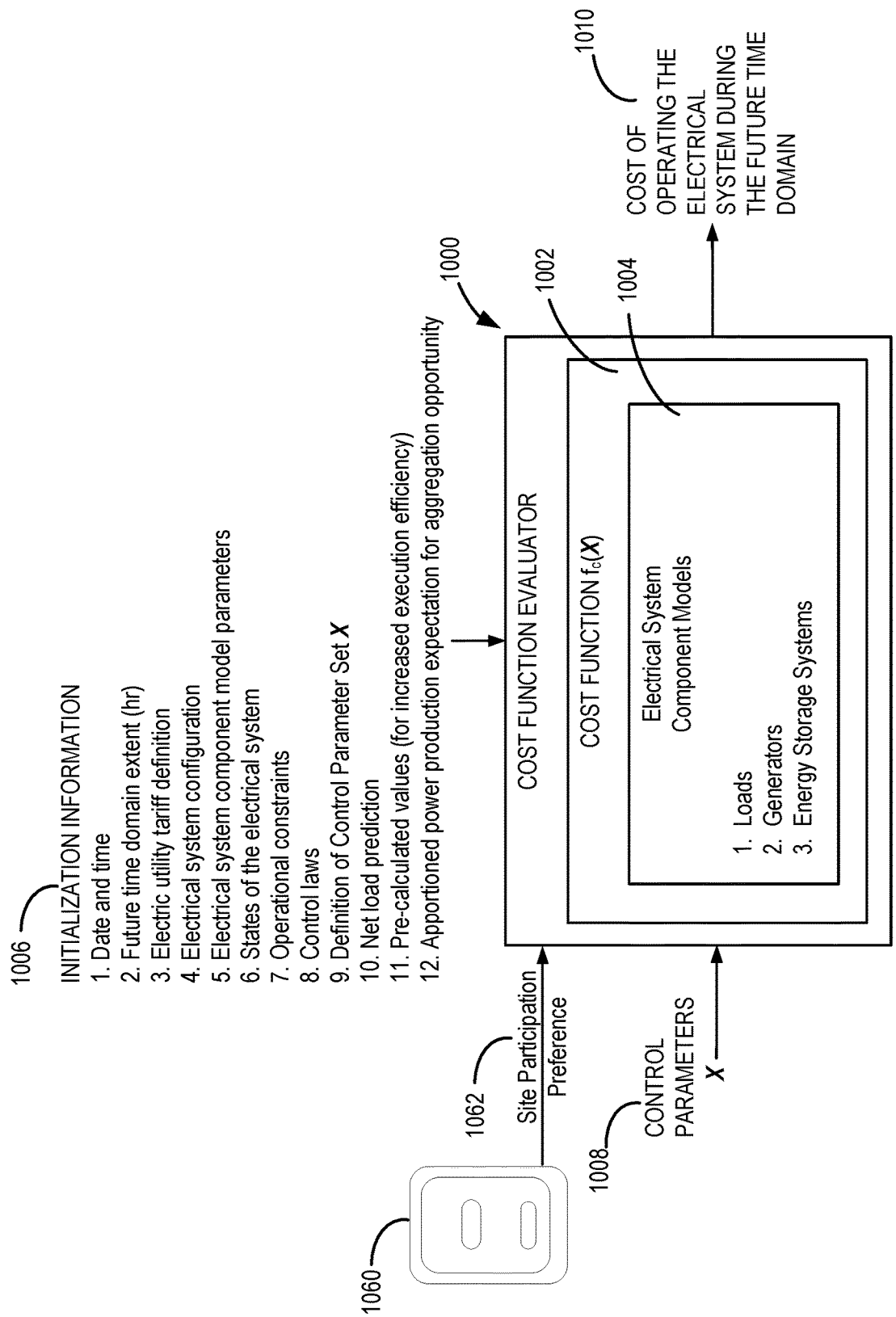
FIG. 10 is a diagrammatic representation of a cost function evaluation module of site controller, according to one embodiment of the present disclosure.

FIG. 10 is a diagrammatic representation of a cost function evaluation module 1000 (or cost function evaluator) that implements a cost function $f_c(X)$ 1002 that includes models 1004 for one or more electrical system components (e.g., loads, generators, ESSs). The cost function evaluation module 1000 may be included in a controller (e.g., an EO of a controller) of an electrical system of a site. The cost function $f_c(X)$ 1002 receives as inputs initialization information 1006 and control parameters 1008 (e.g., a control parameter set X). The cost function $f_c(X)$ 1002 may also accept or otherwise incorporate a site participation preference 1062 received at an input interface and from a configurable input device 1060. The cost function $f_c(X)$ 1002 provides as an output a scalar value 1010 representing a cost of operating the electrical system during the future time domain.

An example of a simple cost function for the Economic Cost of a Site may be:

Economic Cost of Site=$f_c(X)$=Cost of Demand Capping+Cost of Energy Arbitrage+Cost of Demand Response+Cost of Battery Degradation, where models of the various cost elements summed over the future time domain may include:

$$\text{Cost of Demand Capping} = \sum_{i=0}^{i=\text{Number of Demand Periods}} \max[\text{Commited } Demand_i, \text{Forecasted Peak Net Power during Demand } Period_i](kW) * Rate_i\left(\frac{\$}{kW}\right)$$

where $Rate_i$ is the applicable demand rate during demand period i $$\text{Cost of Energy Arbitrage} = \sum_{j=1}^{j=\text{Number of Timesteps in the Future Time Domain}} Energy_j (kWh) * Rate_j\left(\frac{\$}{kWh}\right)$$

where $Rate_j$ is the sum of energy applicable rates at timestep j $$\text{Cost of Demand Response} = \sum_{k=0}^{k=\text{Number of Contract Maneuver Costs}} \text{Contract Maneuver } Cost_k$$

$$\text{Cost of Battery Degradation} = \text{Capacity Loss} \times \frac{\text{Initial Cost of Battery}}{\text{Battery Nominal Capacity (kWh)}} \times \frac{\text{Battery Nominal Capacity (kWh)}}{1 - \text{Fraction of Battery Capacity at } EOL}$$

The scalar value 1010 representing the cost, which is the output of the cost function $f_c(X)$ 1002, can have a variety of different units in different examples. For example, it can have units of any currency. Alternately, the cost can have units of anything with an associated cost or value such as electrical energy or energy credits. The cost can also be an absolute cost, cost per future time domain, or a cost per unit time such as cost per day. In one embodiment, the units of cost are U.S. dollars per day.

Prior to using the cost function, several elements of it can be initialized. The initialization information that is provided, according to one embodiment, can include:

Date and time, which can be used for determining the applicable electric utility rates.

Future time domain extent, which can be used for defining the time extent of the cost calculation.

Electric utility tariff definition, which is a set of parameters that can define how the electrical utility calculates charges.

Electrical system configuration, which includes configuration elements that specify configuration (e.g., size, capacity, tolerances, thresholds, etc.) of the components of the electrical system. An example for a battery energy storage system is the energy capacity of the energy storage device.

Electrical system component model parameters, which include model parameters that can work in conjunction with analytic or numerical models to describe the physical and electrical behavior and relationships governing the operation of electrical components in the electrical system. For battery energy storage systems, a "battery model" is a component, and these parameters specify the properties of the battery such as its Ohmic efficiency, Coulombic efficiency, and degradation rate as a function of its usage.

States of the electrical system, which includes information that specifies the state of components in the electrical system that are important to the economic optimization. For battery energy storage systems, one example state is the SoC of the energy storage device.

Operational constraints, which can specify any additional operational constraints on the electrical system such as minimum import power. In some embodiments, the operational constraints may also include an indication of a portion of a total requested net change in power of an aggregation opportunity that the site is to provide in a maneuver of an aggregation opportunity in response to an aggregation request.

Control law(s), which include the control law(s) associated with the definition of X.

Definition of control parameter set X which can indicate the times at which each control parameter is to be applied during a future time domain. The definition of the control parameter set X may indicate which control law(s) are to be applied at each time in the future time domain.

Net load (or power) prediction, which can provide the predicted unadjusted net load (or predicted unadjusted net power) during the future time domain.

Pre-calculated values. While segments are defined, many values may be calculated that the cost function can use to increase execution efficiency (help it "evaluate" faster). Pre-calculation of these values may be a desirable aspect of preparing the cost function $f_c(X)$ 1002 to enable the cost function to be evaluated more efficiently (e.g., faster, with fewer resources).

Apportioned power production expectation for an aggregation opportunity. The apportioned power production may include a committed apportionment value, or other indication of a portion of a total requested net change in power of an aggregation opportunity that the site is to provide in a maneuver of an aggregation opportunity. In some embodiments, the apportioned power production expectation may be determined according to an engagement rule set.

The diagram of FIG. 10 depicts that the configurable input device 1060 can enable injection of a user-provided input, such as a site participation preference 1062, into the cost function $f_c(X)$ 1002 for consideration during an optimization. An example illustrates. As previously noted, a simple objective function (or cost function) may be:

$f_c(X)$=Cost of Demand Capping+Cost of Energy Arbitrage+Cost of Demand Response+Cost of Battery Degradation.

This example function $f_c(X)$ includes Cost of Demand Capping, Cost of Energy Arbitrage, Cost of Demand Response, and Cost of Battery Degradation as cost elements and does not include any user input or consideration thereof.

By contrast, user input received in the form of a site participation preference (SPP) from the input device 1060 may be injected or otherwise included into the cost function, thereby altering the cost function to be:

$$f_{cui}(X) = \text{Cost of Demand Capping} + \text{Cost of Energy Arbitrage } SPP \text{ (Cost of Demand Response)} + \text{Cost of Battery Degradation}.$$

This adjusted cost function considers the user input and can be optimized by the EO to generate control variables or a control parameter set X that can direct optimized operation of the electrical system. The SPP may be a multiplier on the Cost of Demand Response and is generally between 0 and 1. The higher the SPP value, the more resistant the system will be to participating in a demand response in the optimization. At high SPP values, the cost function favors preserving available demand response resources for use at the site (e.g., preserving battery SoC) more than current available value streams. At low SPP values, the cost function favors sacrificing resources to participate in demand response for current value streams. In the case where SPP is set to 0.2, for example, the optimal control plan would include very aggressive participation in demand response. In this case where SPP is set to 1, the optimal control plan has less aggressive participation in Demand Response. The input device 1060 allows the user to input the SPP 1062 as a manual lever to the optimization cost function—in this case, an SPP mode of the input device 1060 allows the user to dictate participation in demand response.

In another example, a site participation preference may be received from the input device 1060 in the form of a battery preservation factor (BPF), which may be injected or otherwise included into the cost function, thereby altering the cost function to be:

$$f_{cui} = \text{Cost of Demand Capping} + \text{Cost of Energy Arbitrage} + \text{Cost of Demand Response} + BPF \text{ (Cost of Battery Degradation)}.$$

The BPF is a multiplier on the battery degradation cost and may be generally between 0 and 1. The higher the BPF value, the more resistant the battery is to using its energy in the optimization. At high BPF values, the cost function favors preserving long term battery life more than current available value streams. At low BPF values, the cost function favors sacrificing battery life for current value streams. In the case where BPF is set to 0.3, we see the optimal control plan includes somewhat aggressive battery behavior, doing some energy arbitrage during the highest energy rate and discharging for a demand response event. In a case where BPF is set to 0.9, or 1, or 1.1+, the optimal control plan has less aggressive battery behavior. The battery may continue to do a similar amount of demand capping and energy arbitrage. However, the battery may contribute less energy towards a demand response event. The input device 1060 allows the user to input a site participation preference (e.g., the BPF) as a manual lever to the optimization cost function—in this case, the input device in a BPF mode allows the user to dictate battery preservation.

As can be appreciated, a user input device may be configured or otherwise configurable to provide a plurality of different types of site participation preferences, each of which may be incorporated into a cost function as appropriate to allow consideration of such site participation preference(s) in optimization to determine an optimized control plan for the electrical system.

Preparing the cost function $f_c(X)$ 1002 can increase execution efficiency of the EO because values that would otherwise be re-calculated each time the cost function is evaluated (possibly thousands of times per EO iteration) are pre-calculated a single time.

Figure 11:
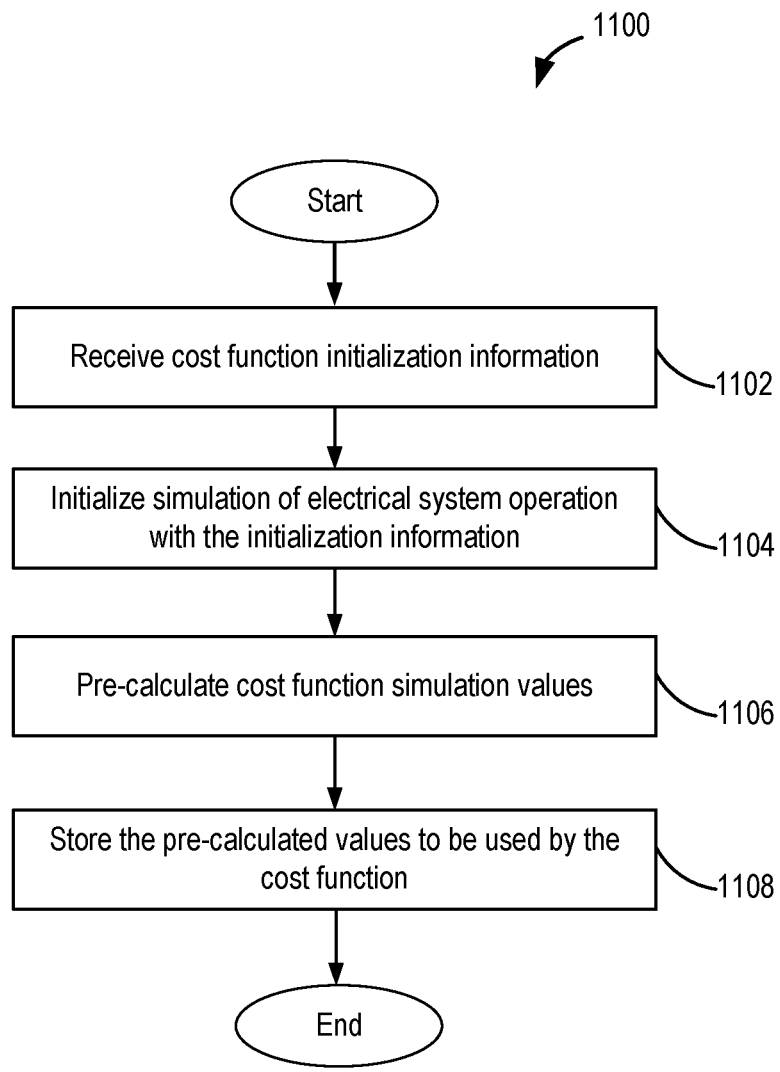
FIG. 11 is a flow diagram of a method of preparing a cost function WO, according to one embodiment of the present disclosure.

FIG. 11 is a flow diagram of a process 1100 of preparing a cost function $f_c(X)$, according to one embodiment of the present disclosure. Cost function initialization information may be received 1102. A simulation of electrical system operation is initialized 1104 with the received 1102 cost function initialization information. Cost function values may be pre-calculated 1106. The pre-calculated values may be stored 1108 for later use during evaluation of the cost function.

In certain embodiments, defining a control parameter set X and preparing a cost function $f_c(X)$ may be accomplished in parallel.

Evaluation of the Cost Function

During execution of an EO, according to some embodiments of the present disclosure, the cost function is evaluated. During evaluation of the cost function, operation of the electrical system with the control parameter set X is simulated. The simulation may be an aspect of evaluating the cost function. Stated otherwise, one part of evaluating the cost function for a given control parameter set X may be simulating operation of the electrical system with that given control parameter set X. In the simulation, the previously predicted load and generation are applied. The simulation takes place on the future time domain. As time advances through the future time domain in the simulation, costs and benefits (as negative costs) can be accumulated. What is finally returned by the simulation is a representation of how the electrical system state may evolve during the future time domain with control X and what costs may be incurred during that time.

In some embodiments, the cost function, when evaluated, returns the cost of operating the electrical system with some specific control parameter set X. As can be appreciated, the cost of operating an electrical system may be very different, depending on X. So evaluation of the cost function includes a simulated operation of the electrical system with X first. The result of the simulation can be used to estimate the cost associated with that scenario (e.g., the control parameter set X).

As noted previously, some of the costs considered by the cost function in one embodiment are:
1. Electricity supply charges (both flat rates and ToU rates)
2. Electricity demand charges
3. Battery degradation cost
4. Reduction of energy stored in the energy storage system
5. Incentive maneuver benefits (as a negative number)
6. User input—e.g., a site participation preference Electricity supply and demand charges have already been described. For monthly demand charges, the charge may be calculated as an equivalent daily charge by dividing the charge by approximately 30 days, or by dividing by some other number of days, depending on how many days are remaining in the billing cycle. Battery degradation cost is described in a later section. Reduction in energy stored in an ESS accounts for the difference in value of the storage energy at the beginning of the future time domain compared to the end. Incentive maneuver benefits such as demand response can be calculated as the benefit on a per day basis, but as a negative number. The incentive maneuver benefits, in some embodiments, may include a portion of an upshot of an aggregation opportunity. The portion of the upshot may be a portion that is proportional to the site change in power provided by the site compared to the total requested net change in power of the aggregation opportunity.

During the cost function's electrical system simulation, several variables can be tracked and stored in memory. These include control variables, electrical power consumed by or supplied from various electrical systems, and the states of charge of any energy storage systems. Other variables can also be tracked and stored to memory. Any of the variables stored to memory can be output by the cost function.

Figure 12:
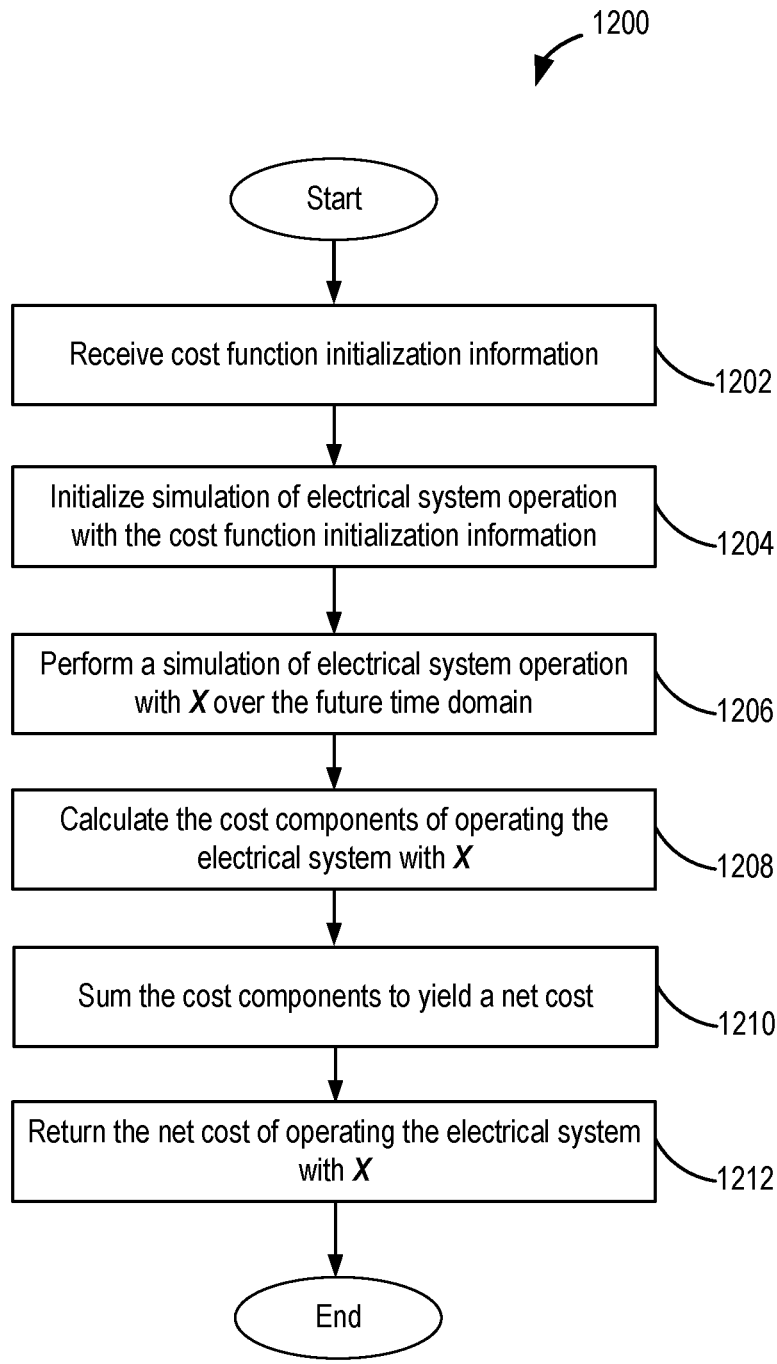
FIG. 12 is a flow diagram of a method of evaluating a cost function that is received from an external source or otherwise unprepared, according to one embodiment of the present disclosure.

FIG. 12 is a flow diagram of a method 1200 of evaluating a cost function that is received from an external source or otherwise unprepared, according to one embodiment of the present disclosure. Cost function initialization information may be received 1202. A simulation of electrical system operation is initialized 1204 with the received 1202 cost function initialization information. The simulation of the electrical system operation is performed 1206 with X over the future time domain. A calculation 1208 of the cost components of operating the electrical system with X is performed. The cost components are summed 1210 to yield a net cost of operating the electrical system with X. The net cost of operating the electrical system with X is returned 1212 or otherwise output.

Figure 13:
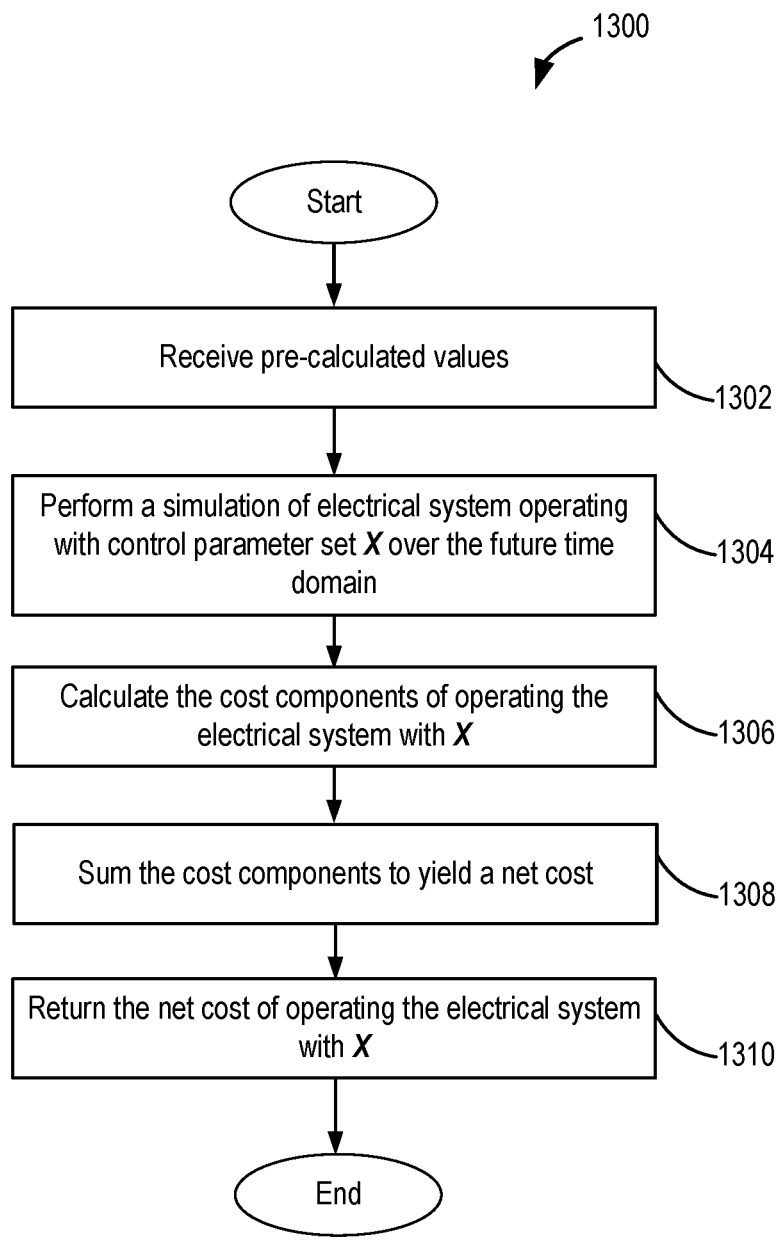
FIG. 13 is a flow diagram of a method of evaluating a prepared cost function, according to one embodiment of the present disclosure.

FIG. 13 is a flow diagram of a method 1300 of evaluating a prepared cost function, according to one embodiment of the present disclosure. The cost function may be prepared according to the method 100 of FIG. 11. Pre-calculated values can be received 1302 as inputs to the method 1300. The values may be pre-calculated during an operation to prepare the cost function, such as the method 1100 of FIG. 11. A simulation is performed 1304 of the electrical system operating with a control parameter set X over the future time domain. A calculation 1306 of the cost components of operating the electrical system with X is performed. The cost components are summed 1307 to yield a net cost of operating the electrical system with X. The net cost of operating the electrical system with X is returned 1310 or otherwise output.

In some embodiments, rather than returning the net cost of operating the electrical system with X during the future time domain, what is returned is the net cost of operating the electrical system with X as a cost per unit time (such as an operating cost in dollars per day). Returning a per day cost can provide better normalization between the different cost elements that comprise the cost function. The cost per day for example can be determined by multiplying the cost of operating during the future time domain by 24 hours and dividing by the length (in hours) of the future time domain.

Execute Continuous Minimization of the Cost Function

With a prediction of load and generation made, the control parameter set X defined, and the cost function obtained and initialized and/or prepared, minimization of cost can be performed.

Minimization of the cost function may be performed by an optimization process and/or an optimization module that is based on an optimization algorithm. Minimization (or optimization) may include evaluating the cost function iteratively with different sets of values for the control parameter set X (e.g., trying different permutations from an initial value) until a minimum cost (e.g., a minimum value of the cost function) is determined. In other words, the algorithm may iteratively update or otherwise change values for the control parameter set X until the cost function value (e.g. result) converges at a minimum (e.g., within a prescribed tolerance, or satisfying termination criteria). The iterative updating or changing of the values may include perturbing or varying one or more values based on prior one or more values.

Termination criteria (e.g., a prescribed tolerance, a delta from a prior value, a prescribed number of iterations) may aid in determining when convergence at a minimum is achieved and stopping the iterations in a finite and reasonable amount of time. The number of iterations that may be performed to determine a minimum could vary from one optimization cycle to a next optimization cycle. The set of values of the control parameter set X that results in the cost function returning the lowest value may be determined to be the optimal control parameter set $X_{opt}$.

In one embodiment, a numerical or computational generalized constrained nonlinear continuous optimization (or minimization) algorithm is called (e.g., executed or invoked) by a computing device.

Figure 14:
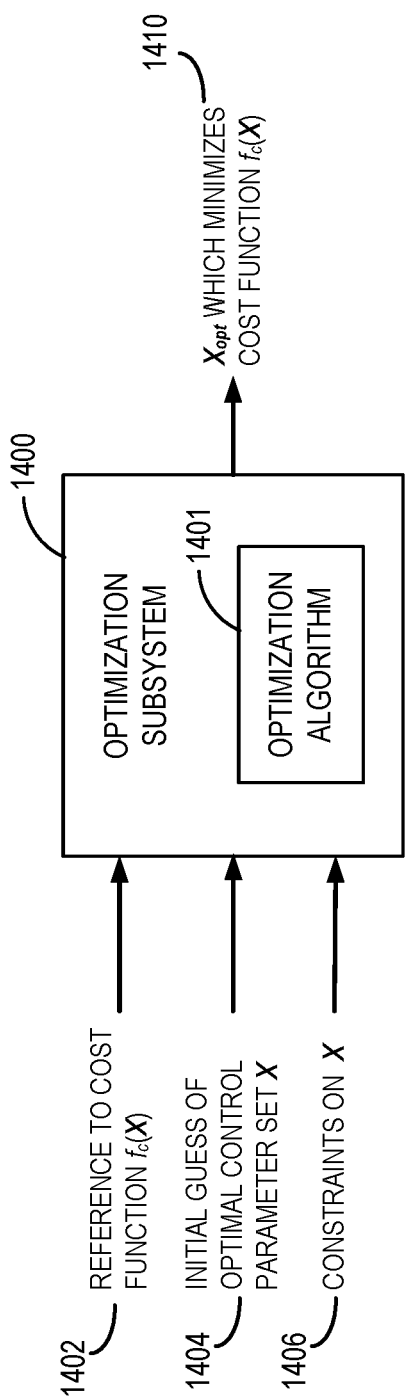
FIG. 14 is a diagrammatic representation of an optimizer that utilizes an optimization algorithm to determine an optimal control parameter set.

FIG. 14 is a diagrammatic representation of an optimization subsystem 1400 that utilizes or otherwise implements an optimization algorithm 1401 to determine an optimal control parameter set $X_{opt}$ 1410, which minimizes the cost function $f_c(X)$. In the embodiment of FIG. 14, the optimization algorithm 1401 utilized by the optimization subsystem 1400 may be a generalized constrained multivariable continuous optimization (or minimization) algorithm. A reference 1402 to the cost function $f_c(X)$ is provided to the optimization subsystem 1400.

The optimization algorithm can be implemented in software, hardware, firmware, or any combination of these. The optimization algorithm may be implemented based on any approach from descriptions in literature, pre-written code, or developed from first principles. The optimization algorithm implementation can also be tailored to the specific problem of electrical system economic optimization, as appropriate in some embodiments.

Some algorithms for generalized constrained multivariable continuous optimization include:

Trust-region reflective
Active set
SQP
Interior Point
Covariance Matrix Adaption Evolution Strategy (CMAES)
Bound Optimization by Quadratic Approximation (BOBYQA)
Constrained Optimization by Linear Approximation (COBYLA)

The optimization algorithm may also be a hybrid of more than one optimization algorithm. For example, the optimization algorithm may use CMAES to find a rough solution, then Interior Point to converge tightly to a minimum cost. Such hybrid methods may produce robust convergence to an optimum solution in less time than single-algorithm methods.

Regardless of the algorithm chosen, it may be useful to make an initial guess of the control parameter set X 1404. This initial guess enables an iterative algorithm such as those listed above to more quickly find a minimum. In one embodiment, the initial guess is derived from the previous EO execution results.

Any constraints 1406 on X can also be defined or otherwise provided. Example constraints include any minimum or maximum control parameters for the electrical system.

An Example EO Result

Figure 15:
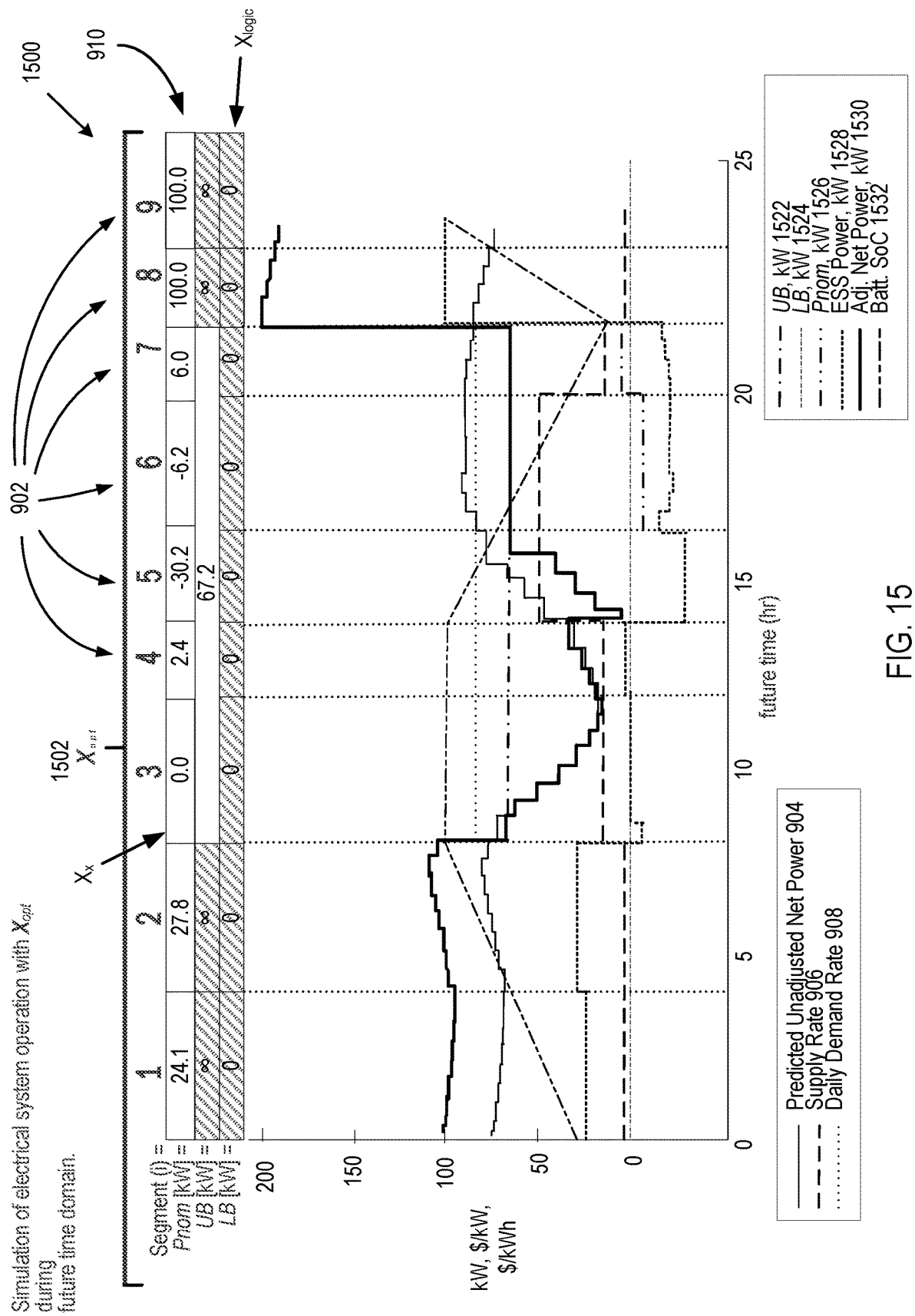
FIG. 15 is a graph illustrating an example result from an economic optimizer (EO) for a battery ESS.

FIG. 15 is a graph 1500 illustrating an example result from an EO for a small battery energy storage system, using the same example upcoming time domain, segmentation of the upcoming time domain into a plurality of segments 902, predicted unadjusted net power plot 904, supply rate plot 906, daily demand rate plot 908, and representation 910 of the control parameter set X as in FIG. 9.

The graph 1500 also includes plots for UB (kW) 1522, LB (kW) 1524, Pnom (kW) 1526, ESS power (kW) 1528, adjusted net power (kW) 1530, and battery SoC 1532.

In FIG. 15, as in FIG. 9, the future time domain is split into nine segments 902, and nine optimal sets of parameters 1502 were determined (e.g., a control parameter set $X_{opt}$ 910 that includes values for nine optimal sets of parameters, one optimal set of parameters for each segment 902). Daily demand charges are applicable and a net export of energy (e.g., to the grid) is not allowed in the illustrated example. An objective of the controller is to find an optimal sequence of electrical system control parameters.

The control parameter set X in this case is defined to include three parameters: Pnom, UB, and LB as described above. In this example, during execution of the optimization algorithm, the optimal values in the unshaded boxes (X) of the representation 910 of X are determined, Pnom 1502 which is the battery inverter power (where charge values are positive and generation/discharge values are negative) during each time segment 902, and UB 1502 which is the upper limit on demand during each time segment 902). The date and time to apply each specific control parameter is part of the definition of X. The shaded values ($X_{logic}$, which includes LB and some UB values) in the representation 910 of X are determined by logic. For example, when no demand charge is applicable, the UB can be set to infinity. And since net export of power is not permitted in this example, LB can be set to zero. There is no need to determine optimal values for these shaded parameters when executing the optimization because their values are dictated by constraints and logic.

Applying the optimal values of X the expected cost per day of operating the electrical system in the example of FIG. 15 is $209.42 per day. This total cost is the sum of the ToU supply cost ($248.52), the daily demand cost ($61.52), the cost of battery energy change ($−115.93), and the cost of battery degradation ($15.32).

As can be appreciated, in other embodiments, the EO may determine a set of control values for a set of control variables, instead of a control parameter set X. The EO may determine the set of control values to effectuate a change to the electrical system toward meeting a controller objective for economical optimization of the electrical system. The EO may then output the control values or the set of control variables for delivery directly to the electrical system. In such embodiment, the EO may be a primary component of the controller and the controller may not include a dynamic manager (e.g., a high speed controller).

Dynamic Manager or High Speed Controller (HSC)

Greater detail will now be provided about some elements of a dynamic manager, or an HSC, according to some embodiments of the present disclosure. Because the control parameter set X is passed to the high speed controller, the definition of the control parameter set X may be tightly linked to the HSC's control law. The interaction between an example HSC and control parameter set X is described below.

Storing a Control Plan

As already mentioned, the control parameter set X can contain multiple sets of parameters and dates and times that those sets of parameters are to be applied by the HSC. One embodiment of the present disclosure takes this approach. Multiple sets of parameters are included in X each set of parameters with a date and time the set is intended to be applied to the electrical system being controlled. Furthermore, each controllable system within the electrical system can have a separate set of controls and date and time on which the set of controls is intended to be applied. The HSC commits the full control parameter set X to memory and applies each set of parameters therein to generate control variables to deliver to, and potentially effectuate a change to, the electrical system at the specified times. Stated differently, the HSC stores and schedules a sequence of optimal sets of parameters, each to be applied at an appropriate time. In other words, the HSC stores a control plan. This first task of storing and scheduling a sequence of optimal control parameter sets (e.g., a control plan) by the high speed controller provides distinct advantages over other control architectures.

For example, storing of a control plan by the HSC reduces the frequency that the computationally intensive (EO) portion of the controller is executed. This is because even if the first sequential time interval expires before the EO executes again, the HSC will switch to the next sequential control set at the appropriate time. In other words, the EO does not have to execute again before the first sequential time interval expires since multiple optimal control sets can be queued up in sequence.

As another example, storing of a control plan by the HSC enables operation (e.g., control of the electrical system) for significant periods of time without additional EO output. This may be important for example if the EO is executing in a remote processor such as a cloud computing environment and the HSC is running on a processor local to a building. If communication is lost for a period of time less than the future time domain, the HSC can continue to use the already-calculated optimal control parameter sets at the appropriate times. Although operation in such a manner during outage may not be optimal (because fresh EO executions are desirable as they take into account the latest data), this approach may be favored compared with use of a single invariant control set or shutting down.

Application of Presently Applicable Control Parameters

A second task of the HSC, according to one embodiment, is to control some or all of the electrical system components within the electrical system based on the presently applicable control parameter set. In other words, the HSC applies each set of parameters of a control parameter set X in conjunction with a control law to generate control variables to deliver to, and potentially effectuate a change to, the electrical system at appropriate times.

For an electrical system with a controllable battery ESS, this second task of the HSC may utilize four parameters for each time segment. Each of the four parameters may be defined as in Table 2 above. In one embodiment, these parameters are used by the HSC to control the battery inverter to charge or discharge the energy storage device. For a battery ESS, the typical rate at which the process variables are read and used by the HSC and new control variables are generated may be from 10 times per second to once per 15 minutes. The control variables (or the set of values for the set of control variables) for a given corresponding time segment may be provided to the electrical system at (e.g., before or during) the given corresponding time segment of the upcoming time domain.

As can be appreciated, in other embodiments, an entire control plan (e.g., a control parameter set X comprising a set of sets) may be processed by the HSC to determine a plurality of sets of control variables, each set of control variables for a corresponding time segment. The plurality of sets of control variables may be provided at once (e.g., before the upcoming time domain or no later than during a first time segment of the upcoming time domain). Or, each set of the plurality of sets may be provided individually to the electrical system at (e.g., before or during) the given corresponding time segment.

Another aspect of the HSC, according to one embodiment, is that the HSC can also be used to curtail a generator (such as a photovoltaic generator) if necessary to maintain the lower bound on electrical system power consumption specified by LB.

Figure 16:
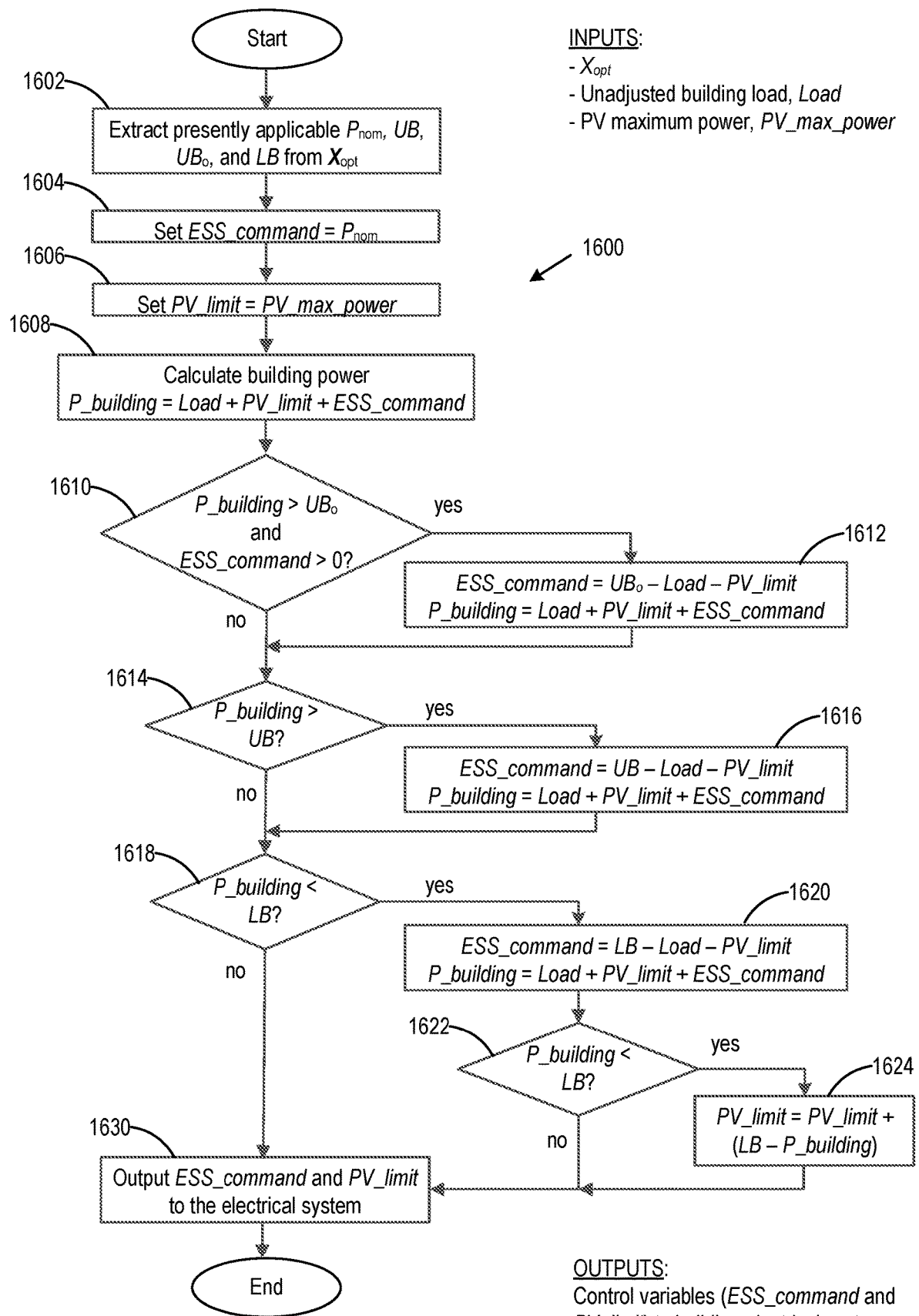
FIG. 16 is a method of a dynamic manager, according to one embodiment of the present disclosure.

FIG. 16 is a method 1600 of a dynamic manager, or HSC, according to one embodiment of the present disclosure, to use a set of optimal control parameters $X_{opt}$ in conjunction with a control law to determine values of a set of control variables to command the electrical system. A set of optimal control parameters ($X_{opt}$), a measurement of unadjusted building load (Load), and PV maximum power (PV_max_power) are received or otherwise available as inputs to the method 1600. The dynamic manager processes $X_{opt}$ to determine a set of control values to effectuate a change to the electrical system toward meeting an objective for economical optimization of the electrical system during an upcoming time domain. The output control variables are the ESS power command (ESS_command) and the photovoltaic limit (PV_limit), which are output to the building electrical system to command an ESS and a photovoltaic subsystem.

The presently applicable $P_{nom}$, UB, $UB_0$, and LB are extracted 1602 from $X_{opt}$. The ESS power command, ESS_command, is set 1604 equal to $P_{nom}$. The photovoltaic limit, PV_limit, is set 1606 equal to PV maximum power, PV_max_power. The building power, P_building, is calculated 1608 as a summation of the unadjusted building load, the photovoltaic limit, and the ESS power command (P_building=Load+PV_limit+ESS_command).

A determination 1610 is made whether the building power is greater than $UB_0$ (P_building>$UB_0$) and whether the ESS_command is greater than zero (ESS_command>0). If yes, then variables are set 1612 as:

ESS_command=$UB_0$-Load-PV_limit

P_building=Load+PV_limit+ESS_command.

A determination 1614 is made whether building power is greater than UB (P_building>UB). If yes, then variables are set 1616 as:

ESS_command=UB-Load-PV_limit

P_building=Load+PV_limit+ESS_command.

A determination 1618 is made whether building power is less than LB (P_building<LB). If yes, then variables are set 1620 as:

ESS_command=LB-Load-PV_limit

P_building=Load+PV_limit+ESS_command, and another determination 1622 is made whether building power remains less than LB (P_building<LB). If yes, then the photovoltaic limit PV_limit is set 1624 as:

PV_limit+(LB-P_building).

Then the control variables ESS_command and PV_limit are output 1630 to the electrical system.

An Example HSC Result

Figure 17:
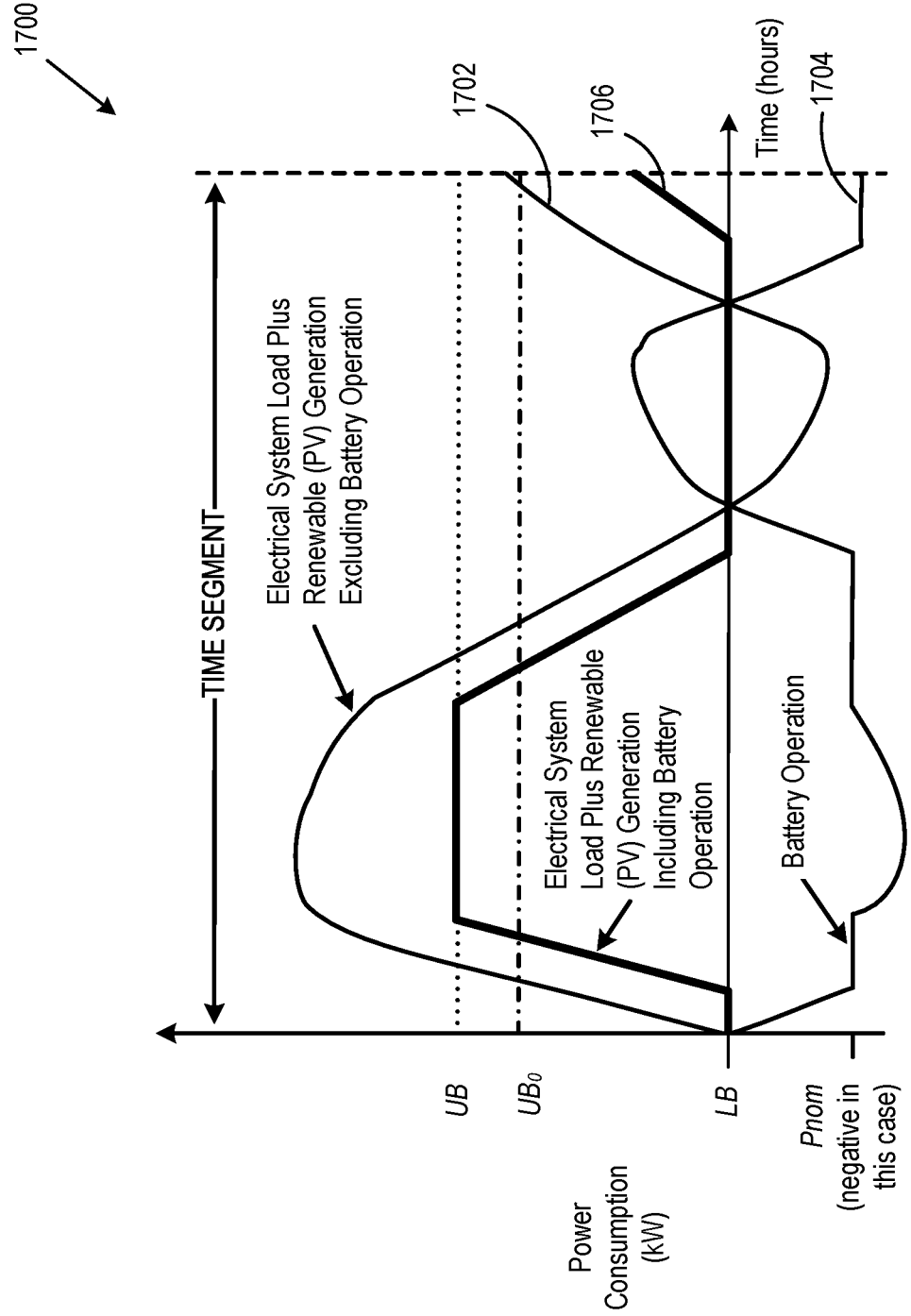
FIG. 17 is a graph showing plots for an example of application of a particular four-parameter control set during a time segment.

FIG. 17 is a graph 1700 showing plots for an example of application of a particular four-parameter control set during a time segment. The graph 1700 shows a value for each of UB, $UB_0$, LB, and $P_{nom}$, which are defined above in Table 2. A vertical axis is the power consumption (or rate of energy consumed), with negative values being generative. A first plot 1702 provides unadjusted values of power consumption (kW) for the electrical system load plus renewable (photovoltaic) generation and excluding battery operation, over the time segment. In other words, the first plot 1702 shows operation of the electrical system without benefit of a controllable ESS (battery) that is controlled by a controller, according to the present disclosure. A second plot 1704 provides values of power consumption (kW) for battery operation over the time segment. The second plot 1704 may reflect operation of an ESS as commanded by the controller. In other words, the second plot 1704 is the control variable for the ESS. The battery operation value may be the value of the control variable to be provided by the HSC to command operation of the ESS. A third plot 1706 provides values of power consumption (kW) for the electrical system load plus renewable (photovoltaic) generation and including battery operation, over the time segment. The third plot 1706 illustrates how the controlled ESS (or battery) affects the power consumption of the electrical system from the grid. Specifically, the battery in this example is controlled (e.g., by the battery operation value) to discharge to reduce the load of the electrical system on the grid and limit peak demand to the UB value when desired. Furthermore, this example shows LB being enforced by commanding the ESS to charge by an amount that limits the adjusted net power to be no less than LB when necessary. Furthermore, this example shows that the nominal ESS power (Pnom) is commanded to the extent possible while still meeting the requirements of UB, $UB_0$, and LB.

In other embodiments, the control parameter set X may have fewer or more parameters than the four described for the example embodiment above. For example, the control parameter set X may be comprised of only three parameters: Pnom, UB, and LB. Alternately, the control parameter set X may be comprised of only two parameters: Pnom and UB. Alternately, the control parameter set X may include only of UB or only of Pnom. Or, it may include any other combination of four or fewer parameters from the above list.

Battery Models

In a battery ESS, battery cost can be a significant fraction of the overall system cost of a site and in many instances can be greater than 60% of the cost of the system (site). The cost of the battery per year is roughly proportional to the initial cost of the battery and inversely proportional to the lifetime of the battery. Also, any estimated costs of system downtime during replacement of a spent battery may be taken into account. A battery's condition, lifetime, and/or state of health (SoH) may be modeled and/or determined by its degradation rate (or rate of reduction of capacity and its capacity at end of life). A battery's degradation rate can be dependent upon many factors, including time, SoC, discharge or charge rate, energy throughput, and temperature of the battery. The degradation rate may consider capacity of the battery (or loss thereof). Other ways that a battery's condition, lifetime, and/or SoH may be evaluated may be based on a maximum discharge current of the battery or the series resistance of the battery.

Battery models may be based on battery degradation as a function of battery capacity as compared to initial capacity or capacity at the beginning of life of the battery. Stated otherwise, battery models may consider battery condition or state of health according to the battery capacity lost from the capacity at the beginning of life of the battery. As can be appreciated, other battery models may model battery condition according to another way, such as maximum discharge current of the battery, the series resistance of the battery, or the like.

In one embodiment, the battery degradation and its associated cost is included as a cost element in the cost function. By including battery degradation cost in the cost function, as the EO executes to find the minimum cost, the EO can effectively consider the contribution of battery degradation cost for each possible control parameter set X. In other words, the EO can take into account a battery degradation cost when determining (e.g., from a continuum of infinite control possibilities) an optimal control parameter set $X_{opt}$. To accomplish this, a parameterized model of battery performance, especially its degradation rate, can be developed and used in the cost function during the simulation of potential control solutions (e.g., sets of control parameters X). The battery parameters (or constants) for any battery type can be determined that provide a closest fit (or sufficiently close fit within a prescribed tolerance) between the model and the actual battery performance or degradation. Once the parameters are determined, the cost function can be initialized with configuration information containing those parameters so that it is able to use the model in its control simulation in some implementations.

In one embodiment, battery degradation is written or otherwise represented in the form of a time or SoC derivative that can be integrated numerically as part of the cost function control simulation to yield battery degradation during the future time domain. In one embodiment, this degradation derivative can be comprised of two components: a wear component (or throughput component) and an aging component. The components can be numerically integrated vs. time using an estimate of the battery SoC at each time step in one embodiment.

Apparatus Architectures

Figure 18:
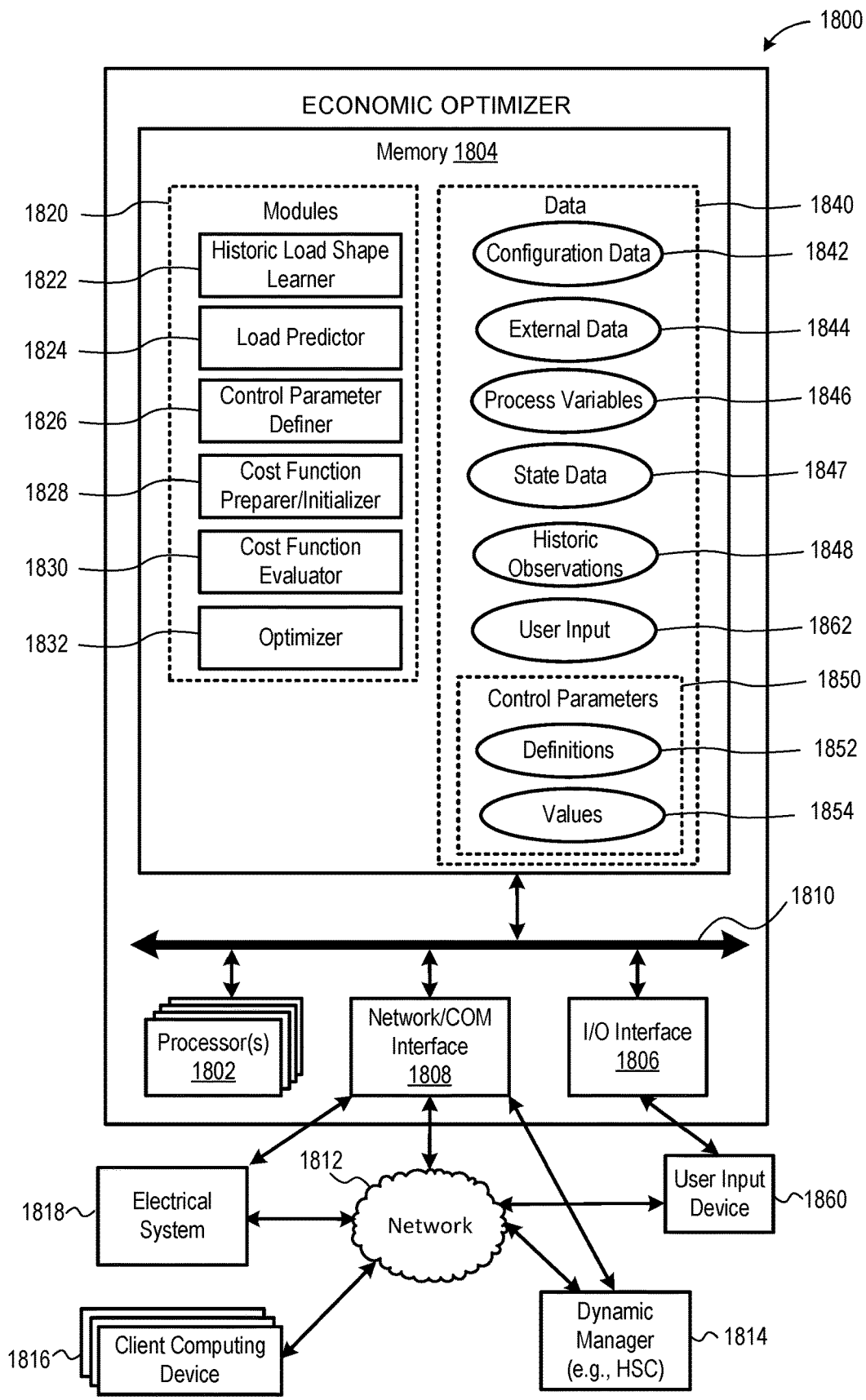
FIG. 18 is a diagram of an economic optimizer, according to one embodiment of the present disclosure.

FIG. 18 is a diagram of an EO 1800 according to one embodiment of the present disclosure. The EO 1800 may determine a control plan for managing control of an electrical system 1818 of a site during an upcoming time domain and provide the control plan as output. The determined control plan may include a plurality of sets of parameters each to be applied for a different time segment within an upcoming time domain. The EO 1800 may determine the control plan based on a set of configuration elements specifying one or more constraints of the electrical system 1818 and defining one or more cost elements associated with operation of the electrical system. The EO 1800 may also determine the control plan based on a set of process variables that provide one or more measurements of a state of the electrical system 1818. The EO 1800 may include one or more processors 1802, memory 1804, an input/output interface 1806, a network/COM interface 1808, and a system bus 1810.

The one or more processors 1802 may include one or more general purpose devices, such as an Intel®, AMD®, or other standard microprocessor. The one or more processors 1802 may include a special purpose processing device, such as ASIC, SoC, SiP, FPGA, PAL, PLA, FPLA, PLD, or other customized or programmable device. The one or more processors 1802 perform distributed (e.g., parallel) processing to execute or otherwise implement functionalities of the present embodiments. The one or more processors 1802 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 1804 may include static RAM, dynamic RAM, flash memory, one or more flip-flops, ROM, CD-ROM, DVD, disk, tape, or magnetic, optical, or other computer storage medium. The memory 1804 may include a plurality of program modules 1820 and a data 1840.

The program modules 1820 may include all or portions of other elements of the EO 1800. The program modules 1820 may run multiple operations concurrently or in parallel by or on the one or more processors 1802. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems and/or the like.

The system memory 1804 may also include the data 1840. Data generated by the EO 1800, such as by the program modules 1820 or other modules, may be stored on the system memory 1804, for example, as stored program data 1840. The data 1840 may be organized as one or more databases.

The input/output interface 1806 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 1808 may facilitate communication or other interaction with other computing devices (e.g., a dynamic manager 1814) and/or networks 1812, such as the Internet and/or other computing and/or communications networks. The network/COM interface 1808 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 1808 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth. The network/COM interface 1808 may be any appropriate communication interface for communicating with other systems and/or devices.

The system bus 1810 may facilitate communication and/or interaction between the other components of the system, including the one or more processors 1802, the memory 1804, the input/output interface 1806, and the network/COM interface 1808.

The modules 1820 may include a historic load shape learner 1822, a load predictor 1824, a control parameter definer 1826, a cost function preparer/initializer 1828, a cost function evaluator 1830, and an optimizer 1832.

The historic load shape learner 1822 may compile or otherwise gather historic trends to determine a historic profile or an average load shape that may be used for load prediction. The historic load shape learner 1822 may determine and update and an avg_load_shape array and an avg_load_shape_time_of_day array by recording load observations and using an approach to determine a suitable average of the historic load observations after multiple periods of time. The historic load shape learner 1822 may utilize a process or an approach to determining the historic average profile such as described above with reference to FIG. 8.

The load predictor 1824 may predict a load on the electrical system 1818 during an upcoming time domain. The load predictor 1824 may utilize a historic profile or historic load observations provided by the historic load shape learner 1822. The load predictor 1824 may utilize a load prediction method such as described above with reference to FIG. 8.

The control parameter definer 1826 may generate, create, or otherwise define a control parameter set X, in accordance with a control law. The created control parameters 1850 may include a definition 1852 and a value 1854 and may be stored as data 1840.

The cost function preparer/initializer 1828 prepares or otherwise obtains a cost function to operate on the control parameter set X. The cost function may include the one or more constraints and the one or more cost elements associated with operation of the electrical system 1818. The cost function preparer/initializer 1828 pre-calculates certain values that may be used during iterative evaluation of the cost function involved with optimization.

The cost function evaluator 1830 evaluates the cost function based on the control parameter set X. Evaluating the cost function simulates operation of the electrical system for a given time period under a given set of circumstances set forth in the control parameter set X and returns a cost of operating the electrical system during the given time period.

The optimizer 1828 may execute a minimization of the cost function by utilizing an optimization algorithm to find the set of values for the set of control variables. Optimization (e.g., minimization) of the cost function may include iteratively utilizing the cost function evaluator 1830 to evaluate the cost function with different sets of values for a control parameter set X until a minimum cost is determined. In other words, the algorithm may iteratively change values for the control parameter set X to identify an optimal set of values in accordance with one or more constraints and one or more cost elements associated with operation of the electrical system.

The data 1840 may include configuration data 1842, external data 1844, process variables 1846, state data 1847, historic observations 1848, user input 1862, and control parameters 1850 (including definitions 1852 and values 1854).

The configuration data 1842 may be provided to, and received by, the EO 1800 to communicate constraints and characteristics of the electrical system 1818.

The external data 1844 may be received as external input (e.g., weather reports, changing tariffs, fuel costs, event data), which may inform the determination of the optimal set of values.

The process variables 1846 may be received as feedback from the electrical system 1818. The process variables 1846 are typically measurements of the electrical system 1818 state and are used to, among other things, determine how well objectives of controlling the electrical system 1818 are being met.

The state data 1847 would be any EO state information that may be helpful to be retained between one EO iteration and the next. An example is avg_load_shape.

The historic observations 1848 are the record of process variables that have been received. A good example is the set of historic load observations that may be useful in a load predictor algorithm.

As noted earlier, the control parameter definer may create control parameters 1850, which may include a definition 1852 and a value 1854 and may be stored as data 1840. The cost function evaluator 1830 and/or the optimizer 1832 can determine values 1854 for the control parameters 1850.

The EO 1800 may provide one or more control parameters 1850 as a control parameter set X to the dynamic manager 1814 via the network/COM interface 1808 and/or via the network 1812. The dynamic manager 1814 may then utilize the control parameter set X to determine values for a set of control variables to deliver to the electrical system 1818 to effectuate a change to the electrical system 1818 toward meeting one or more objectives (e.g., economic optimization) for controlling the electrical system 1818.

In other embodiments, the EO 1800 may communicate the control parameter set X directly to the electrical system 1818 via the network/COM interface 1808 and/or via the network 1812. In such embodiments, the electrical system 1818 may process the control parameter set X directly to determine control commands, and the dynamic manager 1814 may not be included.

In still other embodiments, the EO 1800 may determine values for a set of control variables (rather than for a control parameter set X) and may communicate the set of values for the control variables directly to the electrical system 1818 via the network/COM interface 1808 and/or via the network 1812.

One or more client computing devices 1816 may be coupled via the network 1812 and may be used to configure, provide inputs, or the like to the EO 1800, the dynamic manager 1814, and/or the electrical system 1818.

A user input device 1860, such as a dial, button, mobile computing device, home automation device, etc. may provide user input 1862 for consideration in the optimization process.

Figure 19:
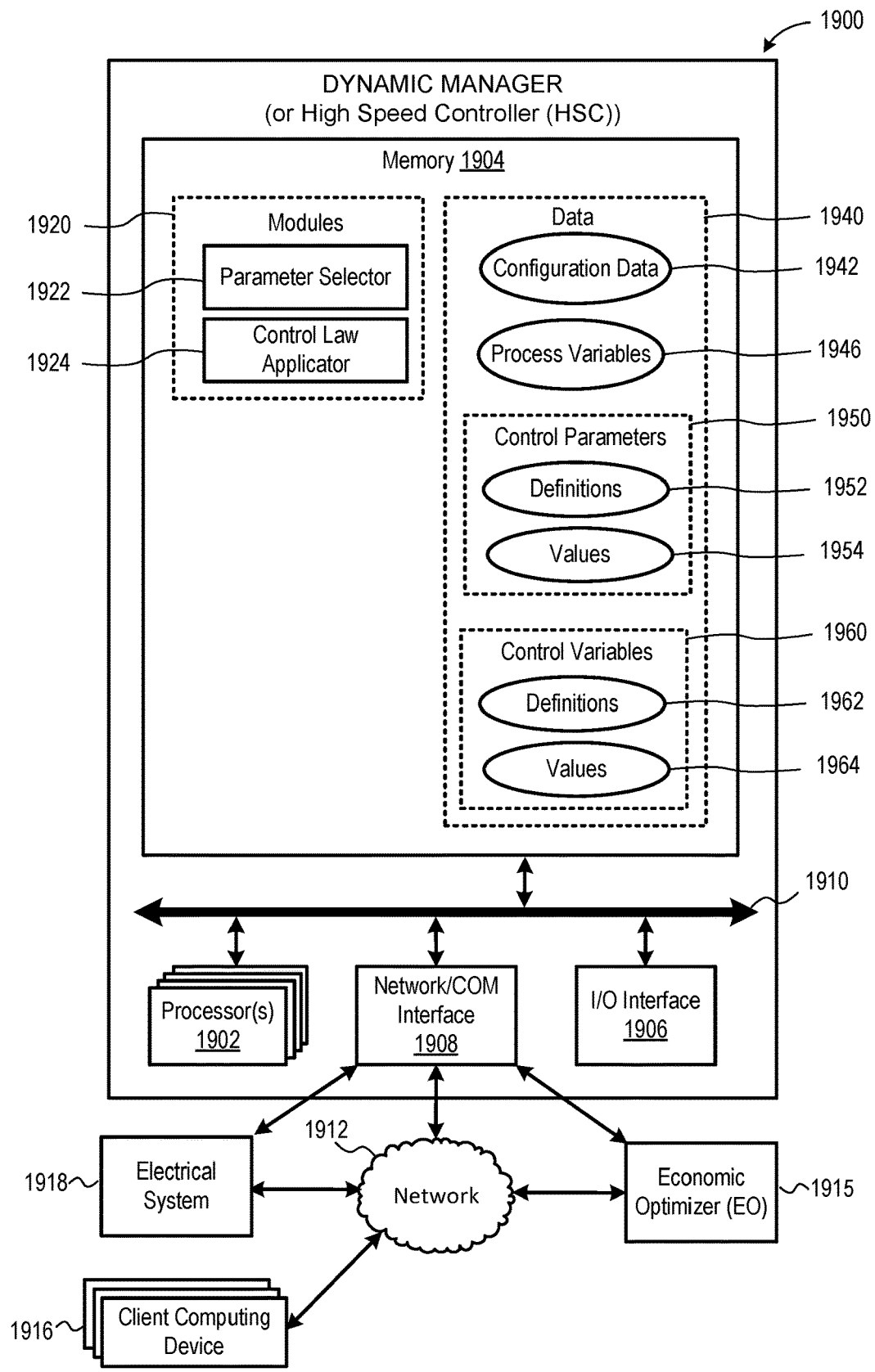
FIG. 19 is a diagram of a dynamic manager, according to one embodiment of the present disclosure.

FIG. 19 is a diagram of a dynamic manager 1900, according to one embodiment of the present disclosure. The dynamic manager 1900, according to one embodiment of the present disclosure, is a second computing device that is separate from an EO 1915, which may be similar to the EO 2100 of FIG. 21. The dynamic manager 1900 may operate based on input (e.g., a control parameter set X) received from the EO 1915. The dynamic manager 1900 may determine a set of control values for a set of control variables for a given time segment of the upcoming time domain and provide the set of control values to an electrical system 1918 of a site to effectuate a change to the electrical system 1918 toward meeting an objective (e.g., economical optimization, participation in an aggregation opportunity event) of the electrical system 1918 during an upcoming time domain. The dynamic manager 1900 determines the set of control values based on a control law and a set of values for a given control parameter set X. The dynamic manager 1900 may include one or more processors 1902, memory 1904, an input/output interface 1906, a network/COM interface 1908, and a system bus 1910.

The one or more processors 1902 may include one or more general purpose devices, such as an Intel®, AMD®, or other standard microprocessor. The one or more processors 1902 may include a special purpose processing device, such as ASIC, SoC, SiP, FPGA, PAL, PLA, FPLA, PLD, or other customized or programmable device. The one or more processors 1902 perform distributed (e.g., parallel) processing to execute or otherwise implement functionalities of the present embodiments. The one or more processors 1902 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 1904 may include static RAM, dynamic RAM, flash memory, one or more flip-flops, ROM, CD-ROM, DVD, disk, tape, or magnetic, optical, or other computer storage medium. The memory 1904 may include a plurality of program modules 1920 and a program data 1940.

The program modules 1920 may include all or portions of other elements of the dynamic manager 1900. The program modules 1920 may run multiple operations concurrently or in parallel by or on the one or more processors 1902. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The system memory 1904 may also include data 1940. Data generated by the dynamic manager 1900, such as by the program modules 1920 or other modules, may be stored on the system memory 1904, for example, as stored program data 1940. The stored program data 1940 may be organized as one or more databases.

The input/output interface 1906 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 1908 may facilitate communication with other computing devices and/or networks 1912, such as the Internet and/or other computing and/or communications networks. The network/COM interface 1908 may couple (e.g., electrically couple) to a communication path (e.g., direct or via the network) to the electrical system 1918. The network/COM interface 1908 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 1908 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 1910 may facilitate communication and/or interaction between the other components of the system, including the one or more processors 1902, the memory 1904, the input/output interface 1906, and the network/COM interface 1908.

The modules 1920 may include a parameter selector 1922 and a control law applicator 1924.

The parameter selector may pick which set of parameters to be used from the control parameter set X, according to a given time segment.

The control law applicator 1924 may process the selected set of parameters from the control parameter set X and convert or translate the individual set of parameters into control variables (or values thereof). The control law applicator 1924 may apply logic and/or a translation process to determine a set of values for a set of control variables based on a given set of parameters (from a control parameter set X) for a corresponding time segment. For example, the control law applicator 1924 may apply a method and/or logic as shown in FIG. 16.

The data 1940 may include configuration data 1942, process variables 1946, control parameters 1950 (including definitions 1952 and values 1954), and/or control variables 1960 (including definitions 1962 and values 1964).

The configuration data 1942 may be provided to, and received by, the dynamic manager 1900 to communicate constraints and characteristics of the electrical system 2118.

The process variables 1946 may be received as feedback from the electrical system 1918. The process variables 1946 are typically measurements of the electrical system 1918 state and are used to, among other things, determine how well objectives of controlling the electrical system 1918 are being met. Historic process variables 1946 may be utilized by the HSC for example to calculate demand which may be calculated as average building power over the previous 15 or 30 minutes. The dynamic manager 1900 can determine the set of control values for the set of control variables based on the process variables 1946.

The control parameters 1950 may comprise a control parameter set X that includes one or more sets of parameters each for a corresponding time segment of an upcoming time domain. The control parameters 1950 may additionally, or alternately, provide a control plan for the upcoming time domain. The control parameters 1950 may be received from an EO 1915 as an optimal control parameter set $X_{opt}$.

The control variables 1960 may be generated by the parameter interpreter 1922 based on an optimal control parameter set $X_{opt}$.

The dynamic manager 1900 may receive the optimal control parameter set $X_{opt}$ from the EO 1915 via the network/COM interface 1908 and/or via the network 1912. The dynamic manager 1900 may also receive the process variables from the electrical system 1918 via the network/COM interface 1908 and/or via the network 1912.

The dynamic manager 1900 may provide the values for the set of control variables to the electrical system 1918 via the network/COM interface 1908 and/or via the network 1912.

One or more client computing devices 1916 may be coupled via the network 1912 and may be used to configure, provide inputs, or the like to the EO 1915, the dynamic manager 1900, and/or the electrical system 1918.

Site Controller Examples

Figure 20:
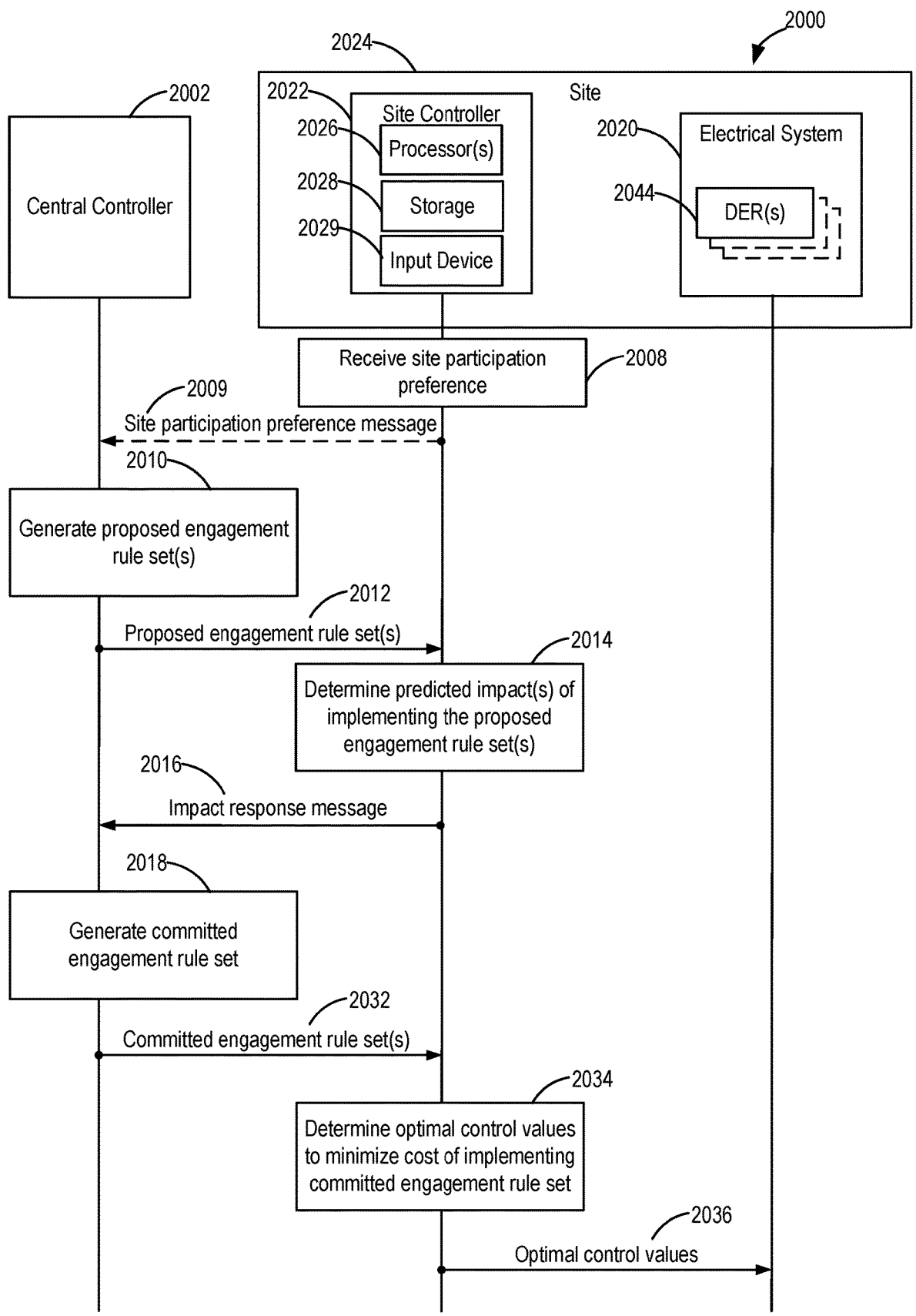
FIG. 20 is a simplified signal flow diagram of an electrical power control system, according to some embodiments.

FIG. 20 is a simplified signal flow diagram of an electrical power control system 2000, according to some embodiments. The electrical power control system 2000 includes a central controller 2002, a site controller 2022, and one or more DERs 2044 of an electrical system 2020 located at a site 2024. The site controller 2022 includes one or more processors 2026 operably coupled to one or more data storage devices 2028 and an input device 2029. The processors 2026 are configured to perform functions of the site controller 2022 as will be discussed in more detail below. In some embodiments the site controller 2022 is similar to the controllers 122, 142, 162 (FIG. 1), 216 (FIG. 2), 410 (FIG. 4), and 610 (FIG. 6) discussed above. The site controller 2022 may include a control interface configured to communicate with the DERs 2044. The DERs 2044 may be electrically controllable by one or more control values of one or more control variables delivered to the DERs 2044 through the control interface. The DERs 2044 may include one or more ESSs, one or more electrical power generators, one more loads, or combinations thereof.

The site controller 2022 is configured to optimally control operation of the DERs 2044, and in some embodiments, other electrical equipment (not shown) of the electrical system 2020 in an optimal manner, as discussed above with reference to FIGS. 8-22. Accordingly, at any given moment in time during operation, the site controller 2022 is controlling the electrical equipment of the electrical system 2020 in a way that the site controller 2022 has determined to be optimal (e.g., economically optimal).

The central controller 2002 is configured to determine whether and how much to commit the site 2024 to participation in incentive maneuvers. Since the site controller 2022 already controls the electrical system 2020 in a manner that the site controller 2022 has determined to be optimal, deviation in this optimal operation to participate in incentive maneuvers presumably has a negative or undesirable impact (e.g., an increase in an economic cost, equipment wear and tear, etc.) on the operation of the electrical system 2020. The central controller 2002, however, is not privy to the computations performed by the site controller 2022 in determining how to optimally control the electrical system 2020. In other words, without receiving some information from the site controller 2022, the central controller 2002 may not be able to determine whether the upshot of participating in the incentive maneuver justifies the cost of the site controller 2022 deviating operation of the electrical system 2020 from the optimal operation. As a result, the central controller 2002 and the site controller 2022 are configured to communicate with each other to enable the central controller 2002 to propose, to the site controller 2022, participation in incentive maneuvers and learn, from the site controller 2022, a predicted impact of the proposed participation. Communication between the central controller 2002 and the site controller 2022 also enables the central controller 2002 to communicate committed participation of the site 2024 in incentive maneuvers to the site controller 2022 once the central controller 2002 has determined if and to what extent the site 2024 should participate in the incentive maneuvers.

The site controller 2022 may receive a site participation preference 2008 via the input device 2029. The input comprises an assessment from the user of an ability/cost of a site to be included in a response event during a period of time. In some embodiments, the site participation preference 2008 may be sent via a site participation preference message 2009 to the central controller 2002. The site participation preference 2008 may be used when the central controller 2002 generates 2010 one or more proposed engagement rule sets and/or by the site controller 2022 when determining 2014 costs associated with a predicted impact.

In operation, the central controller generates 2010 one or more proposed engagement rule sets identifying one or more levels of participation, by the site 2024, in an incentive maneuver. In some embodiments, information regarding the incentive maneuver may have been received by the central controller 2002 from a utility entity (e.g., a power company, etc.). In some embodiments, the central controller 2002 may itself be the utility entity.

In some embodiments the proposed engagement rule sets correspond to an incentive maneuver that the site 2024 is to participate in on its own. In some such embodiments the proposed engagement rule sets include a requested site change in power (e.g., a value of provided power, a value of reduced consumption of power, or combinations thereof) that the site 2024 is proposed to provide in order to participate in the incentive maneuver. In some embodiments the incentive maneuver includes various levels of participation (e.g., an incentive that is a function of a total site change in power). In such embodiments the proposed engagement rule sets include multiple values corresponding to various levels of proposed participation in the incentive maneuver.

In some embodiments the levels of participation may be adjusted for sites based on the site participation preference. For example, a site that has a site participation preference indicating that the site does not wish to participate in the incentive maneuver may be removed from proposed engagement rule set, and the amount that would be apportioned to that site may be apportioned to willing participants. In some embodiments, the central controller may provide incentives to sites who are willing participants for the incentive maneuver. For example, in a future incentive maneuver, the sites who are willing participants may have a smaller apportionment of a future incentive maneuver assigned to them by the central controller 2002. Conversely, in some embodiments, the sites who are unwilling to participate may have a larger apportionment of a future incentive maneuver assigned to them by the central controller 2002.

In some embodiments the proposed engagement rule sets correspond to an incentive maneuver that the site 2024 is to participate in with at least one other site (not shown). In such embodiments the central controller 2002 includes an aggregation engine such as the aggregation engines 102 (FIG. 1), 202 (FIG. 2), 402 (FIG. 4), 602 (FIG. 6) discussed above.

Also, in such embodiments the proposed engagement rule sets include one or more proposed apportionment values corresponding to portions of the total requested net change in power of the incentive maneuver (e.g., an apportionment opportunity) that the site 2024 is proposed to implement.

The central controller 2002 transmits the one or more proposed engagement rule sets 2012 to the site controller 2022. The site controller 2022 is configured to store the engagement rule sets 2012 on the storage 2028. The site controller 2022 determines 2014 a predicted impact of implementing the proposed engagement rule sets. In some embodiments the site controller 2022 determines 2014 the predicted impact by computing a predicted difference in cost (e.g., an economic cost, a cost from the cost function used to optimize operation of the electrical system 2020, a degradation cost of operating equipment of the electrical system 2020 such as an ESS, etc.) between implementing the proposed engagement rule sets and not implementing the proposed engagement rule sets. By way of non-limiting example, the predicted impact may include a predicted difference in an economic cost between implementing the proposed engagement rule sets and not implementing the proposed engagement rule sets. In some embodiments the site controller 2022 determines 2014 the predicted impact by merely computing the predicted cost of implementing the proposed engagement rule sets and the predicted cost of not implementing the proposed engagement rule sets. By way of non-limiting example, the predicted impact may include a predicted economic cost of implementing the proposed engagement rule sets and a predicted economic cost of not implementing the proposed engagement rule sets.

In some embodiments, the predicted impact may be adjusted based on the site participation preference. For example, a variable that is controlled by the site participation preference may be multiplied with the predicted impact. For instance if the site participation preference indicates that the site is neutral to participation, the variable may be one; if the site participation preference indicates that the site is opposed to participation, the variable may be more than one; and if the site participation preference indicates that the site desires to participate, the variable may be less than one.

In some embodiments, the site participation preference may be added to the predicted impact as an additional cost element of a cost function. In some embodiments, the site controller 2022 may determine a cost based on a non-numeric input. The cost may be a numerical value based on the site participation preference and the site. Thus, the cost may be site specific. For example, if a first site consumes more power than a second site, the cost associated with a preference of the first site can be larger than a preference of the second site. The cost can be a numerical value within a range defined by configuration elements of a site.

In some embodiments the predicted impact determined 2014 by the site controller 2022 is an optimal predicted impact. An optimal predicted impact, in one embodiment, is an optimal predicted economic impact, which is an operating cost of optimized operation of the site with the proposed site change in power. An optimal predicted economic impact can be the difference between the operating cost of optimized operation with and without the proposed site change in power. In other words, the site controller 2022 may optimize the predicted cost of implementing the proposed engagement rule sets in determining 2014 the predicted impact. In some embodiments the site controller 2022 constructs a cost function in determining the optimal predicted impact. The cost function may include a sum of predicted economic costs of operating the electrical system 2020. By way of non-limiting example, the cost function may include a sum of predicted ToU supply charges and predicted demand charges. Also by way of non-limiting example, the cost function may include summing the predicted ToU supply charges and the predicted demand charges with equipment degradation costs associated with degradation of at least one of the DERs 2044 (e.g., degradation of an ESS, a generator, etc.). The site controller 2022 may optimize the cost function. The site controller 2022 transmits an impact response message 2016 indicating the predicted impact to the central controller 2002.

In some embodiments the site controller 2022 determines predicted impacts of implementing a plurality of different proposed engagement rule sets and generates impact response messages 2018 to report the predicted impacts to the central controller 2002. By way of non-limiting example, the site controller 2022 may receive the plurality of different proposed engagement rule sets one at a time, and the corresponding impact response messages 2016 may be transmitted to the central controller 2002 one at a time after reception of each corresponding one of the engagement rule sets is received. In other words, the generating 2010, transmitting of the proposed engagement rule sets 2012, determining 2014, and transmission of impact response message 2016 may be repeated until each of the plurality of proposed engagement rule sets 2012 has been accounted for. Also by way of non-limiting example, the plurality of different engagement rule sets 2012 may be received together (e.g., in the same transmission from the central controller 2002). In this example the impact responses may, after reception of all the plurality of different engagement rule set values, be transmitted to the central controller 2002 together (e.g., in the same impact response message 2016 or in multiple impact response messages 2016).

The central controller 2002 determines whether and/or to what extent the site 2024 should participate in the incentive maneuver based on information from the proposed engagement rule sets 2012, the impact response message 2016, and the upshot of the incentive maneuver. The central controller generates 2018 a committed engagement rule set 2032 based on the determination of whether and/or to what extent the site 2024 should participate in the incentive maneuver. The committed engagement rule set 2032 indicates a committed site change in power, by the electrical system 2020, during a committed period of time. By way of non-limiting example, the committed engagement rule set 2032 may be the same as one of the proposed engagement rule sets 2012. Also by way of non-limiting example, the committed engagement rule set 2032 may not be the same as one of the proposed engagement rule sets 2012 (e.g., the central controller may predict impacts of other engagement rule sets not proposed to the site controller 2022 based on received impact responses corresponding to the proposed engagement rule sets 2012). The central controller 2018 transmits the committed engagement rule set 2032 to the site controller 2022.

The site controller 2022 determines 2034 optimal control values 2036 for the one or more control variables that control the DERs 2044. By way of non-limiting example, the optimal control values 2036 may be selected to minimize an economic cost of implementing the committed engagement rule set 2032. The site controller 2022 provides the optimal control values 2036 to the DERs 2044 to control operation of the DERs 2044 to implement the committed engagement rule set 2032.

It should be noted that although FIG. 20 illustrates the site controller 2022 as being at the site 2024, in some embodiments the site controller 2022 may be located remotely from the site 2024 and may communicate with the electrical system 2020 through one or more networks to provide the optimal control values 2036 to the DERs 2044.

Input Devices

Figure 21A:
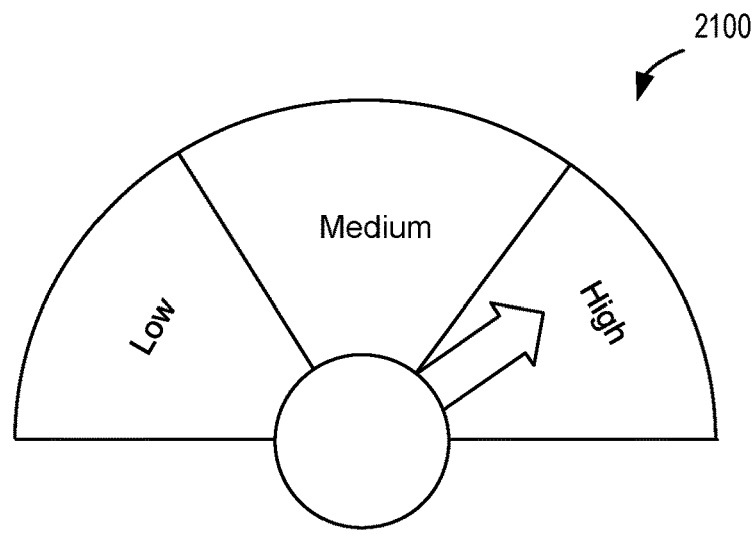
FIG. 21A illustrates a dial that may be rotated by a user to provide user input (e.g., a participation preference) to indicate a cost to implement an aggregation.
Figure 21B:
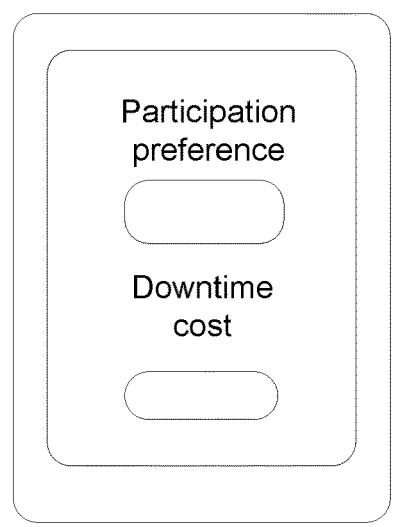
FIG. 21B illustrates GUI that may be used to provide a participation preference.
Figure 21C:
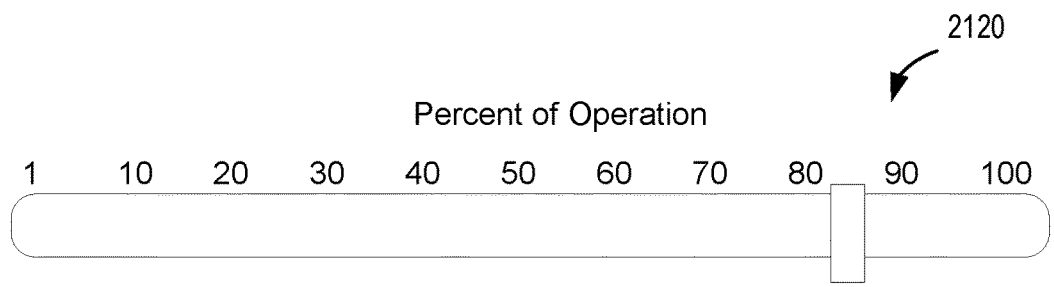
FIG. 21C illustrates a slider that may be used to provide a participation preference.

FIGS. 21A-21C illustrate three embodiments of a user input device, or more specifically a configurable input device for a site controller. In some embodiments, the configurable input devices (e.g., dial 2100, GUI 2110, slider 2120) may be used to manipulate operating costs associated with a site.

The user input provided by the configurable input device may alter the predicted impact associated with participation in a response event. In some embodiments, a site may have multiple input devices. For example, there may be multiple control points for a site. As another example, individual equipment at the site can have an associated input device. In these embodiments, a site may indicate critical equipment and the site controller can determine a minimum amount of power that the site would need to maintain to run the critical equipment and participate in a response event.

In some embodiments, the predicted impact may be adjusted based on the site participation preference. For example, a variable that is controlled by the site participation preference may be multiplied with the predicted impact. For instance if the site participation preference indicates that the site is neutral to participation, the variable may be one; if the site participation preference indicates that the site is opposed to participation, the variable may be more than one; and if the site participation preference indicates that the site desires to participate, the variable may be less than one.

In some embodiments, the site participation preference may be added to the predicted impact as an additional cost element of a cost function. In some embodiments, the site controller may determine a cost based on a non-numeric input. The cost may be a numerical value based on the site participation preference and the site. Thus, the cost may be site specific. For example, if a first site consumes more power than a second site, the cost associated with a preference of the first site can be larger than a preference of the second site. The cost can be a numerical value within a range defined by configuration elements of a site.

FIG. 21A illustrates a dial 2100 (e.g., a "value dial") that may be rotated by a user to provide user input (e.g., a site participation preference) to indicate a cost to implement an aggregation. As shown, in some embodiments, the dial 2100 may have non-numeric variables that a user may select to give indications to an aggregation system concerning costs associated with participation in an aggregation opportunity. A user can manually adjust the value dial 2100 between low, medium, and high. The value dial 2100 provides a nonquantitative input that a site controller and/or an aggregation engine can consider in optimizing operation of a site and/or a plurality of sites. A "low" setting on the dial may indicate a low interest or ability to participate in a demand response or similar response event. A "low" setting may provide user input that incorporates into the cost function of an optimization that the site would prefer not (or has minimal low availability) to participate in a response event, whether as an individual site response or as part of an aggregated response. A "medium" setting may indicate a medium or neutral interest or ability to participate in a demand response or similar event. A "medium" setting may provide user input that incorporates into the cost function of an optimization that the site is neutral or impartial about participating in a response event, whether as an individual site response or as part of an aggregated response. Similarly, a "high" setting may indicate a high interest or ability to participate in a demand response or similar event. A "high" setting may provide user input that incorporates into the cost function of an optimization that the site is partial toward or has high availability for participating in a response event, whether as an individual site response or as part of an aggregated response.

A site controller may convert the non-numeric variable to a cost element of a cost function based on the position of the dial and the site configuration. The cost element may be a scaler value to multiply the predicted impact or may be an additional cost to add to the predicted impact. In some embodiments, a central controller may decide to dismiss or reduce the cost element from the dial 2100 based on previous user input. For example, if the dial has been on a high position for a threshold period of time (e.g., a day, week, month), the central controller may ignore the cost element.

FIG. 21B illustrates GUI 2110 that may be used to provide a site participation preference. A user may enter a numeric or non-numeric variable in the site participation preference field or enter a cost in a downtime cost field to indicate a cost to implement an aggregation. As discussed with respect to FIG. 21A, a site controller may convert the non-numeric variable to a cost element of a cost function based on the position of the dial and the site configuration. The cost element may be a scaler value to multiply the predicted impact or may be an additional cost to add to the predicted impact. In some embodiments, a central controller may decide to dismiss or reduce the cost element from the GUI 2110 based on previous user input. For example, if the dial has been on a high position for a threshold period of time (e.g., a day, week, month), the central controller may ignore the cost element.

FIG. 21C illustrates a slider 2120 that may be used to provide a site participation preference. A user may adjust the slider to indicate a desired minimum site operation. For example, the slider placed at 85% would be a request from the user that the site is able to remain powered for at least 85% of the time or powered to at least 85% of standard operating power. In another embodiment, the slider placement would represent a request to maintain power within a specified range of the current power. For example, the slider placed at 85% would be a request to continue to receive at least 85% of the current power drawn by the site during a response event. As discussed with respect to FIG. 21A, a site controller may convert the non-numeric variable to a cost element of a cost function based on the position of the slider and the site configuration. The cost element may be a scaler value to multiply the predicted impact or may be an additional cost to add to the predicted impact. In some embodiments, a central controller may decide to dismiss or reduce the cost element from the slider 2120 based on previous user input. For example, if the dial has been on a high position for a threshold period of time (e.g., a day, week, month), the central controller may ignore the cost element.

Figure 22:
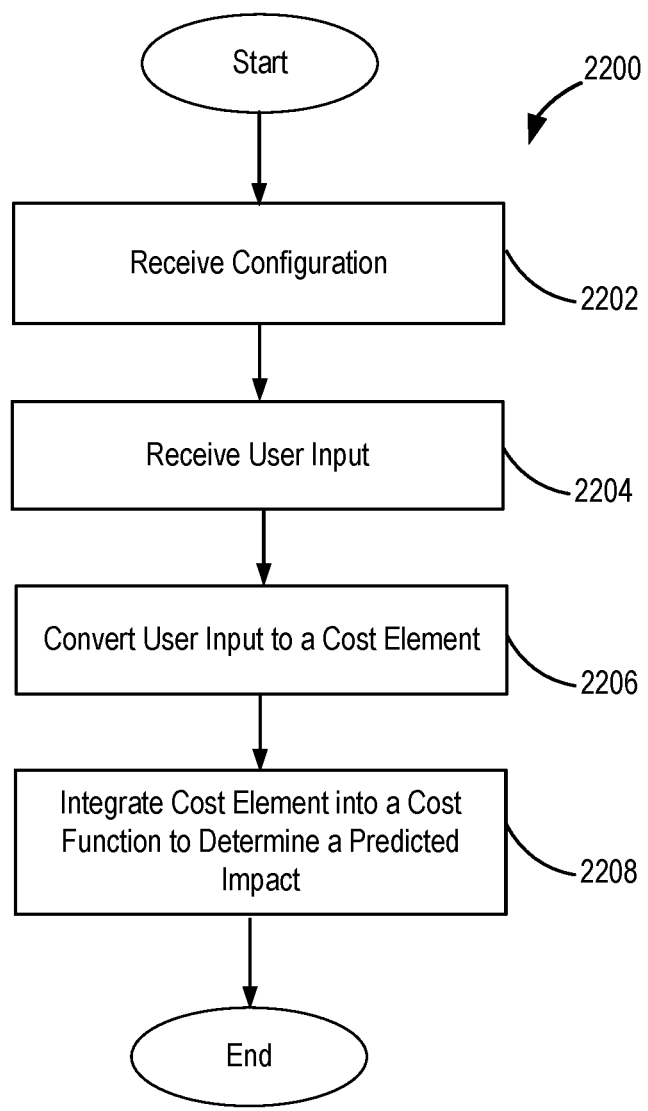
FIG. 22 is a flow diagram of a method for incorporating user input into a cost function.

FIG. 22 is a flow diagram of a method 2200 for incorporating user input into a cost function. The method 2200 may be implemented by a controller of an electrical system, such as the controller 410 that is controlling the electrical system 420 of the site 400 of FIG. 4. The controller may read or otherwise receive 2202 a configuration (e.g., a set of configuration elements) of the electrical system of the site. As previously described, the configuration elements may provide information as to the configuration of the electrical system.

The controller may read or otherwise receive 2204 user input from the electrical system of the site. The user input may include a site participation preference. The user input may be received by an input device of a site controller (e.g., configurable input devices in FIGS. 21A-21O). The site participation preference may be a non-numerical variable. For example, the site participation preference may be set to "high," "medium," or "low" for a user to indicate a cost to the site if equipment is shut down during a response event. In some embodiments, the site participation preference may be a numeric value. For example, the site participation preference may be a cost value or a percentage. Potential values for the site participation preference may be discrete values or continuous values. The site participation preference may be used to manipulate a cost function to determine a predicted impact as described below.

In some embodiments, the controller (e.g., site controller or central controller) may convert 2206 or determine the user input to a cost element. The controller may convert 2206 the user input by associating a value with the site participation preference. For example, when the site participation preference is a non-numerical variable, the controller may determine a cost element associated with the site participation preference based on the site participation preference and the received site configuration elements. For example, a range of possible values for the site participation preference may be limited based on the site configuration elements. For instance, configuration elements may include a site's potential revenue for a day. The potential revenue may provide a maximum limit for the range of possible values for the site participation preference. Further, the site participation preference may be used to select a value within that range. For instance, if a user selects "high" as the site participation preference, the controller may associate a value near the maximum limit with the site participation preference.

In some embodiments, the cost element converted from the user input may be integrated 2208 into a cost function to determine a predicted impact. For example, a variable that is controlled by the site participation preference may be multiplied with the predicted impact. For instance if the site participation preference indicates that the site is neutral to participation, the variable may be one; if the site participation preference indicates that the site is opposed to participation, the variable may be more than one; and if the site participation preference indicates that the site desires to participate, the variable may be less than one.

In some embodiments, the site participation preference may be added to the predicted impact as an additional cost element of a cost function. In some embodiments, the site controller may determine a cost based on a non-numeric input. The cost may be a numerical value based on the site participation preference and the site. Thus, the cost may be site specific. For example, if a first site consumes more power than a second site, the cost associated with a preference of the first site can be larger than a preference of the second site. The cost can be a numerical value within a range defined by configuration elements of a site.

The cost function may be determined as discussed in reference to FIGS. 10-14. In some embodiments, the site participation preference may be an additional cost element. In some embodiments, the site participation preference may be a scaler variable that is multiplied with one or more cost elements. In some embodiments, the site participation preference may adjust cost elements associated with other configuration elements. In some embodiments, a central controller may be able to identify the site participation preference and may choose to include or exclude the site participation preference in a determination to participate in an aggregation opportunity.

In some embodiments, each site may include multiple input devices or multiple interfaces to receive a preference for multiple pieces of equipment on the site and/or for multiple control points of the site. For instance, an input device comprises a first interface and a second interface, wherein the first interface receives a first site participation preference for a first piece of equipment and the second interface receives a second site participation preference for a second piece of equipment. In some embodiments, the site participation preference comprises multiple downtime costs for multiple periods of time.

Example Embodiments

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1. A site controller of an electrical system of a site, the site controller comprising: a control interface configured to communicate with one or more distributed energy resources (DERs) of an electrical system of a site; an input interface to receive a site participation preference for participating in response events; and one or more processors configured to: determine a set of control values for a set of control variables to effectuate a change to the one or more DERs of the electrical system, the set of control values determined by the one or more processors utilizing an optimization algorithm to identify the set of control values in accordance with the site participation preference, one or more constraints, and one or more cost elements associated with operation of the one or more DERs of the electrical system, the optimization algorithm comprising a cost function including a sum of the plurality of cost elements; automatically control operation of the one or more DERs of the electrical system, through the control interface, based on the set of control values.

Example 2. The site controller of Example 1, wherein the site participation preference is a downtime cost during a period of time.

Example 3. The site controller of Example 1, wherein the site participation preference is a non-numerical variable.

Example 4. The site controller of Example 3, wherein the one or more processors determine the set of control values in accordance with the site participation preference by determining an additional cost element based on the site participation preference.

Example 5. The site controller of Example 4, wherein the cost element is a numerical value based on the site participation preference and the site.

Example 6. The site controller of Example 5, wherein the cost element is a numerical value within a range, wherein the range is based on a site configuration.

Example 7. The site controller of Example 1, further comprising a central interface configured to communicate with a central controller (e.g., an aggregation engine, wherein the one or more processors are configured to:

process a proposed engagement rule set received from the central controller through the central interface, the proposed engagement rule set configured to indicate a proposed site change in power by the one or more DERs for the response event; determine a predicted impact of implementing the proposed site change in power; and generate an impact response message to be transmitted to the central controller through the central interface, the impact response message indicating a predicted impact of implementing the proposed site change in power.

Example 8. The site controller of Example 7, wherein the one or more processors are further configured to: process a committed engagement rule set received from the central controller through the central interface, the committed engagement rule set configured to indicate a committed site change in power by the one or more DERs for the response event; and determine the set of control values in accordance with the committed site change in power (e.g., as a constraint of the one or more constraints).

Example 9. The site controller of Example 7, wherein the central controller is further to determine a cost element associated with the site participation preference.

Example 10. The site controller of Example 1, wherein the site participation preference is determined by an observer (e.g., a machine/non-human; a third party system).

Example 11. The site controller of Example 1, wherein the input interface is to receive the site participation preference from a human user of the input interface.

Example 12. The site controller of Example 1, wherein the site participation preference indicates multiple downtime costs for multiple equipment on the site during a period of time.

Example 13. A method of a controller of an electrical system of a site, comprising: receiving, via a user interface, a site participation preference for participating in response events; determining, by one or more processors, values for a set of control variables for configuring one or more distributed energy resources (DERs) of the electrical system of the site, wherein the values are determined utilizing an optimization algorithm and based on the site participation preference, one or more constraints, and one or more cost elements associated with operation of the one or more DERs of the electrical system; and control the electrical system based on the determined values for the set of control variables.

Example 14. The method of Example 13, wherein the site participation preference is a downtime cost during a period of time.

Example 15. The method of Example 13, wherein the site participation preference is a non-numerical variable.

Example 16. The method of Example 13, wherein the one or more processors determine the set of control values in accordance with the site participation preference by determining an additional cost element based on the site participation preference.

Example 17. The site controller of Example 16, wherein the cost element is a numerical value based on the site participation preference and the site.

Example 18. The site controller of Example 16, wherein the cost element is a numerical value within a range, wherein the range is based on a site configuration.

Example 19. A site controller of an electrical system of a site, the site controller comprising: a control interface configured to communicate with one or more distributed energy resources (DERs) of an electrical system of a site; a user interface to receive site information from a user, wherein the site information comprises an indication of a site participation preference for participating in response events; and one or more processors configured to: determine a proposed site change in power by the one or more DERs for a response event; determine a predicted impact of implementing the proposed site change in power; determine a set of control values for a set of control variables to effectuate a change to the one or more DERs of the electrical system, the set of control values determined by the one or more processors utilizing an optimization algorithm to identify the set of control values and in accordance with the site participation preference, the predicted impact, one or more constraints, and one or more cost elements associated with operation of the one or more DERs of the electrical system; and automatically control operation of the one or more DERs of the electrical system, through the control interface, based on the set of control values.

Example 20. The site controller of Example 19, wherein the one or more processors determine the set of control values by: comparing the site participation preference and the predicted impact to determine to participate in the response event; if participating in the response event, utilizing the optimization algorithm to optimize a cost function that includes the one or more constraints and the one or more cost elements according to the predicted impact; and if not participating in the response event, utilizing the optimization algorithm to optimize a cost function that includes the one or more constraints and the one or more cost elements absent the predicted impact.

Example 21. A method to aggregate distributed energy resources (DERs), comprising: receiving at an aggregation engine an aggregation opportunity to participate in a response event, the aggregation opportunity specifying a requested power level production over a period of time of the response event; receiving from a user a site participation preference via an input interface; determining at a plurality of site optimization engines a site impact of a corresponding site operating during a given time period in accordance with one or more constraints and one or more cost elements associated with operation of the corresponding site, wherein one of the cost elements is at least partially based on the site participation preference; determining at the aggregation engine to participate in the response event, based on a total impact to the plurality of sites; and determining at each of the plurality of site optimization engines a set of control variables to effectuate a change to the corresponding site to participate in the response event by producing a portion of the requested power level production for the period of time of the response event.

Example 22 The method of Example 21, wherein the site participation preference is an downtime cost during a period of time.

Example 23. The method of Example 21, wherein the site participation preference is a non-numerical variable, and wherein the method further comprises determining a cost element associated with the site participation preference, wherein the cost element is a numerical value within a range, wherein the range is based on a site configuration.

Example 24. A method to incorporate site user feedback into an aggregation opportunity response event, the method comprising: receiving site configuration details for a plurality of sites; receiving input from a user via a site controller user interface, wherein the input comprises an assessment from the user of an ability a site of the plurality of sites to be included in a response event during a period of time; converting the input into a user defined cost element based on the site configuration details; receiving at an aggregation engine an aggregation opportunity to participate in a response event, the aggregation opportunity specifying a requested power level production over the period of time of the response event; determining a cost function representing a total impact to all of the plurality of site controllers, wherein the cost function comprises the user defined cost element; determining at the aggregation engine to participate in the response event, based on the total impact to the plurality of sites; and determining at each of a plurality of site controllers a set of control variables to effectuate a change to the corresponding site to participate in the response event by producing a portion of the requested power level production for the period of time of the response event.

Example 25. A system of aggregated distributed energy resources (DERs), comprising: a plurality of site controllers each corresponding to and controlling a site of a plurality of sites each comprising one or more corresponding DERs of a plurality of DERs, each site controller comprising: an input device to receive site information from a user, wherein the site information comprises an indication from the user of a site participation preference for a response event for an aggregation opportunity, and one or more processors to: determine a set of control values for a set of control variables to effectuate a change to the corresponding one or more DERs, and determine a site impact indicating a predicted impact of participating in the response event; an aggregation engine to aggregate the plurality of DERs, the aggregation engine to: receive the site impact and the site participation preference from each site controller of the plurality of site controllers; determine a committed apportionment value for each site controller of the plurality of site controllers based on the site impact and the site participation preference received from each site controller of the plurality of site controllers; sum the site impacts of the plurality of site controllers to obtain a total participation impact; determine whether to participate in the response event by comparing the total participation impact with the upshot specified by the response event; and if the determination is to participate, instruct the plurality of site controllers to schedule the plurality of DERs for participation in the response event.

Example 26. The system of aggregated DERs of Example 25, wherein the site participation preference represents a downtime cost during a period of time.

Example 27. The system of aggregated DERs of Example 25, wherein the site participation preference is a non-numerical variable.

Example 28. The system of aggregated DERs of Example 27, wherein the one or more processors are further to determine a cost element associated with the site participation preference.

Example 29. The system of aggregated DERs of Example 28, wherein the cost element is a numerical value based on the site participation preference and the site.

Example 30. The system of aggregated DERs of Example 28, wherein the cost element is a numerical value within a range, wherein the range is based on a site configuration.

Example 31. The system of aggregated DERs of Example 27, wherein the aggregation engine is further to determine a cost element associated with the site participation preference.

Example 32. The system of aggregated DERs of Example 25, wherein input device comprises a first interface and a second interface, wherein the first interface receives a first site participation preference for a first piece of equipment (e.g., a first DER) and the second interface receives a second site participation preference for a second piece of equipment (e.g., a second DER).

Example 33. The system of aggregated DERs of Example 25, wherein the site participation preference comprises multiple downtime costs for multiple periods of time.

Example 34. A site controller of an electrical system of a site, the site controller comprising: a central interface configured to communicate with a central controller; a control interface configured to communicate with one or more distributed energy resources (DERs) of an electrical system of a site, the one or more DERs controllable by one or more control values of one or more control variables delivered to the one or more DERs through the control interface; an input interface to receive site information from a user, wherein the site information comprises an indication from the user of a site participation preference for a response event for an aggregation opportunity; and one or more processors configured to: process a proposed engagement rule set received from the central controller through the central interface, the proposed engagement rule set configured to indicate a proposed site change in power by the one or more DERs for the response event; determine a predicted impact of implementing the proposed site change in power, as indicated by the proposed engagement rule set, over the proposed period of time based at least in part on the site participation preference; and generate an impact response message to be transmitted to the central controller through the central interface, the impact response message indicating the predicted impact.

Example 35. The site controller of Example 34, wherein the site participation preference is a downtime cost during a period of time.

Example 36. The site controller of Example 34, wherein the site participation preference is a non-numerical variable.

Example 37. The site controller of Example 36, wherein the one or more processors are further to determine a cost element associated with the site participation preference.

Example 38. The site controller of Example 37, wherein the cost element is a numerical value based on the site participation preference and the site.

Example 39. The site controller of Example 37, wherein the cost element is a numerical value within a range, wherein the range is based on a site configuration.

Example 40. The site controller of Example 36, wherein the aggregation engine is further to determine a cost element associated with the site participation preference.

Example 41. The site controller of Example 34, wherein the site participation preference is determined by an observer (e.g., machine/non-human or a person; a third party system).

Example 42. The site controller of claim 24, wherein the site participation preference indicates multiple downtime costs for multiple equipment on the site during a period of time.

Example 43. A method to aggregate distributed energy resources (DERs), comprising: receiving at an aggregation engine an aggregation opportunity to participate in a response event, the aggregation opportunity specifying a requested power level production over a period of time of the response event; receiving from a user a site participation preference via an input interface; determining at a plurality of site optimization engines a site impact of a corresponding site operating during a given time period in accordance with one or more constraints and one or more cost elements associated with operation of the corresponding site, wherein one of the cost elements is at least partially based on the site participation preference; determining at the aggregation engine to participate in the response event, based on a total impact to the plurality of sites; and determining at each of the plurality of site optimization engines a set of control variables to effectuate a change to the corresponding site to participate in the response event by producing a portion of the requested power level production for the period of time of the response event.

Example 44. The method of Example 43, wherein the site participation preference is an downtime cost during a period of time.

Example 45. The method of Example 43, wherein the site participation preference is a non-numerical variable, and wherein the method further comprises determining a cost element associated with the site participation preference, wherein the cost element is a numerical value within a range, wherein the range is based on a site configuration.

Example 46. A method to incorporate site user feedback into an aggregation opportunity response event, the method comprising: receiving site configuration details for a plurality of sites; receiving input from a user via a site controller user interface, wherein the input comprises an assessment from the user of an ability a site of the plurality of sites to be included in a response event during a period of time; converting the input into a user defined cost element based on the site configuration details; receiving at an aggregation engine an aggregation opportunity to participate in a response event, the aggregation opportunity specifying a requested power level production over the period of time of the response event; determining a cost function representing a total impact to all of the plurality of site controllers, wherein the cost function comprises the user defined cost element; determining at the aggregation engine to participate in the response event, based on the total impact to the plurality of sites; and determining at each of a plurality of site controllers a set of control variables to effectuate a change to the corresponding site to participate in the response event by producing a portion of the requested power level production for the period of time of the response event.

The described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

Principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component (e.g., engine, system, subsystem) may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure.

The scope of the present invention should, therefore, be determined only by the following claims.

The invention claimed is:

1. A site controller of an electrical system of a site, the site controller comprising:
   a control interface configured to communicate with one or more distributed energy resources (DERs) of an electrical system of a site;
   an input interface to receive a site participation preference for participating in response events; and
   one or more processors configured to:
      determine a set of control values for a set of control variables to effectuate a change to the one or more DERs of the electrical system, the set of control values determined by the one or more processors utilizing an optimization algorithm to identify the set of control values in accordance with the site participation preference, one or more constraints, and one or more cost elements associated with operation of the one or more DERs of the electrical system; and
      automatically control operation of the one or more DERs of the electrical system, through the control interface, based on the set of control values;
   wherein the one or more processors determine the set of control values by:
      comparing the site participation preference and a predicted impact of implementing a site change in power to determine whether to participate in a response event;
      if participating in the response event, utilizing the optimization algorithm to optimize a cost function that includes the one or more constraints and the one or more cost elements according to the predicted impact; and
      if not participating in the response event, utilizing the optimization algorithm to optimize a cost function that includes the one or more constraints and the one or more cost elements absent the predicted impact.

2. The site controller of claim 1, wherein the site participation preference is a downtime cost during a period of time.

3. The site controller of claim 1, wherein the site participation preference is a non-numerical variable.

4. The site controller of claim 3, wherein the one or more processors determine the set of control values in accordance with the site participation preference by determining an additional cost element based on the site participation preference.

5. The site controller of claim 4, wherein the additional cost element is a numerical value based on the site participation preference and the site.

6. The site controller of claim 4, wherein the additional cost element is a numerical value within a range, wherein the range is based on a site configuration.

7. The site controller of claim 1, further comprising a central interface configured to communicate with a central controller,
wherein the one or more processors are configured to:
process a proposed engagement rule set received from the central controller through the central interface, the proposed engagement rule set configured to indicate a proposed site change in power by the one or more DERs for the response event;
determine a predicted impact of implementing the proposed site change in power; and
generate an impact response message to be transmitted to the central controller through the central interface, the impact response message indicating a predicted impact of implementing the proposed site change in power.

8. The site controller of claim 7, wherein the one or more processors are further configured to:
process a committed engagement rule set received from the central controller through the central interface, the committed engagement rule set configured to indicate a committed site change in power by the one or more DERs for the response event; and
determine the set of control values in accordance with the committed site change in power.

9. The site controller of claim 7, wherein the central controller is further to determine a cost element associated with the site participation preference.

10. The site controller of claim 1, wherein the site participation preference is determined by an observer.

11. The site controller of claim 1, wherein the input interface is to receive the site participation preference from a human user of the input interface.

12. The site controller of claim 1, wherein the site participation preference indicates multiple downtime costs for multiple equipment on the site during a period of time.

13. A method of a controller of an electrical system of a site, comprising:
receiving, via a user interface, a site participation preference for participating in response events;
determining, by one or more processors, values for a set of control variables for configuring one or more distributed energy resources (DERs) of the electrical system of the site, wherein the values are determined utilizing an optimization algorithm and based on the site participation preference, one or more constraints, and one or more cost elements associated with operation of the one or more DERs of the electrical system; and
controlling the electrical system based on the values for the set of control variables;
wherein determining, by the one or more processors, the set of control variables includes:
comparing the site participation preference and a predicted impact of implementing a site change in power to determine whether to participate in a response event;
if participating in the response event, utilizing the optimization algorithm to optimize a cost function that includes the one or more constraints and the one or more cost elements according to the predicted impact; and
if not participating in the response event, utilizing the optimization algorithm to optimize a cost function that includes the one or more constraints and the one or more cost elements absent the predicted impact.

14. The method of claim 13, wherein the site participation preference is a downtime cost during a period of time.

15. The method of claim 13, wherein the site participation preference is a non-numerical variable.

16. The method of claim 13, wherein the one or more processors determine the values for the set of control variables in accordance with the site participation preference by determining an additional cost element based on the site participation preference.

17. The method of claim 16, wherein the additional cost element is a numerical value based on the site participation preference and the site.

18. The method of claim 16, wherein the additional cost element is a numerical value within a range, wherein the range is based on a site configuration.

19. A site controller of an electrical system of a site, the site controller comprising:
a control interface configured to communicate with one or more distributed energy resources (DERs) of an electrical system of a site;
a user interface to receive site information from a user, wherein the site information comprises an indication of a site participation preference for participating in response events; and
one or more processors configured to:
determine a proposed site change in power by the one or more DERs for a response event;
determine a predicted impact of implementing the proposed site change in power;
determine a set of control values for a set of control variables to effectuate a change to the one or more DERs of the electrical system, the set of control values determined by the one or more processors utilizing an optimization algorithm to identify the set of control values and in accordance with the site participation preference, the predicted impact, one or more constraints, and one or more cost elements associated with operation of the one or more DERs of the electrical system; and
automatically control operation of the one or more DERs of the electrical system, through the control interface, based on the set of control values;
wherein the one or more processors determine the set of control values by:
comparing the site participation preference and a predicted impact of implementing a site change in power to determine whether to participate in the response event;
if participating in the response event, utilizing the optimization algorithm to optimize a cost function that includes the one or more constraints and the one or more cost elements according to the predicted impact; and
if not participating in the response event, utilizing the optimization algorithm to optimize a cost function that includes the one or more constraints and the one or more cost elements absent the predicted impact.

20. The site controller of claim 19, wherein the site participation preference is a downtime cost during a period of time.

\* \* \* \* \*